United States Patent [19]

Scott et al.

[11] Patent Number: 5,675,752

[45] Date of Patent: Oct. 7, 1997

[54] INTERACTIVE APPLICATIONS GENERATOR FOR AN INTERACTIVE PRESENTATION ENVIRONMENT

[75] Inventors: Edward W. Scott, Anaheim Hills; Richard Sagey, Laguna Niguel, both of Calif.; Toshiharu Fukui, Kanagawa-ken, Japan; Hussein F. Akasheh, Costa Mesa, Calif.; Kunjan Zaveri, Arcadia, Calif.; Marc Booth, La Habra, Calif.

[73] Assignees: Sony Corporation, Tokyo, Japan; Sony Trans Com Inc., Irvine, Calif.

[21] Appl. No.: 307,941

[22] Filed: Sep. 15, 1994

[51] Int. Cl.$^6$ .................................................. G06F 3/14
[52] U.S. Cl. ................... 395/333; 395/334; 395/335; 395/356; 395/972; 395/328; 395/967; 395/807
[58] Field of Search ..................... 395/155, 161, 395/154, 160, 157, 159, 156, 147, 148, 145, 700, 333–335, 327, 328, 972, 967, 342, 353, 356, 357, 806, 807, 762, 776, 777, 779, 782, 792, 936, 942, 943, 704, 710, 712, 326, 340, 348, 352, 701

[56] References Cited

U.S. PATENT DOCUMENTS

| | | | |
|---|---|---|---|
| 5,191,645 | 3/1993 | Carlucci et al. | 395/159 |
| 5,317,732 | 5/1994 | Gerlach, Jr. et al. | 395/159 X |
| 5,363,482 | 11/1994 | Victor et al. | 395/157 |
| 5,428,731 | 6/1995 | Powers, III | 395/154 |
| 5,430,872 | 7/1995 | Dahod et al. | 395/600 |
| 5,500,936 | 3/1996 | Allen et al. | 395/156 |
| 5,519,828 | 5/1996 | Rayner | 395/161 |
| 5,539,871 | 7/1996 | Gibson | 395/154 |
| 5,544,302 | 8/1996 | Nguyen | 395/161 |
| 5,544,305 | 8/1996 | Ohmaye et al. | 395/161 |
| 5,555,369 | 9/1996 | Menendez et al. | 395/161 |

FOREIGN PATENT DOCUMENTS 0513553  11/1992  European Pat. Off. .

OTHER PUBLICATIONS

The Visual Computer, "Environment for rapidly creating interactive design tools", Brad A. Myers and Brad Vander Zanden, vol. 8, No. 2, pp. 94–116, Feb. 1992.

*Primary Examiner*—Raymond J. Bayerl
*Attorney, Agent, or Firm*—Blakely, Sokoloff, Taylor & Zafman

[57] ABSTRACT

An interactive applications generator is utilized to generate an interactive application environment for use on a single server multi-client network computer system. The interactive applications generator permits a user to define a graphical user interface (GUI), that contains one or more display screens, for a customized interactive application environment. The interactive applications generator contains a screen template editor, a media frame editor, a screen editor, and an interactive presentation editor. The screen template editor is utilized to create generic screen templates, that contain generic screen template elements. The media frame editor is utilized to generate media frames by combining multimedia component elements in a time synchronized manner. The screen editor is utilized to generate the display screens including assigning functionality. In order to create a unique instance for each display screen for a particular interactive applications environment, the screen editor references generic screen templates and media frames. The interactive presentation editor is utilized to create the hierarchical structures that defines presentation of the display screens for the particular interactive presentation environment.

64 Claims, 52 Drawing Sheets

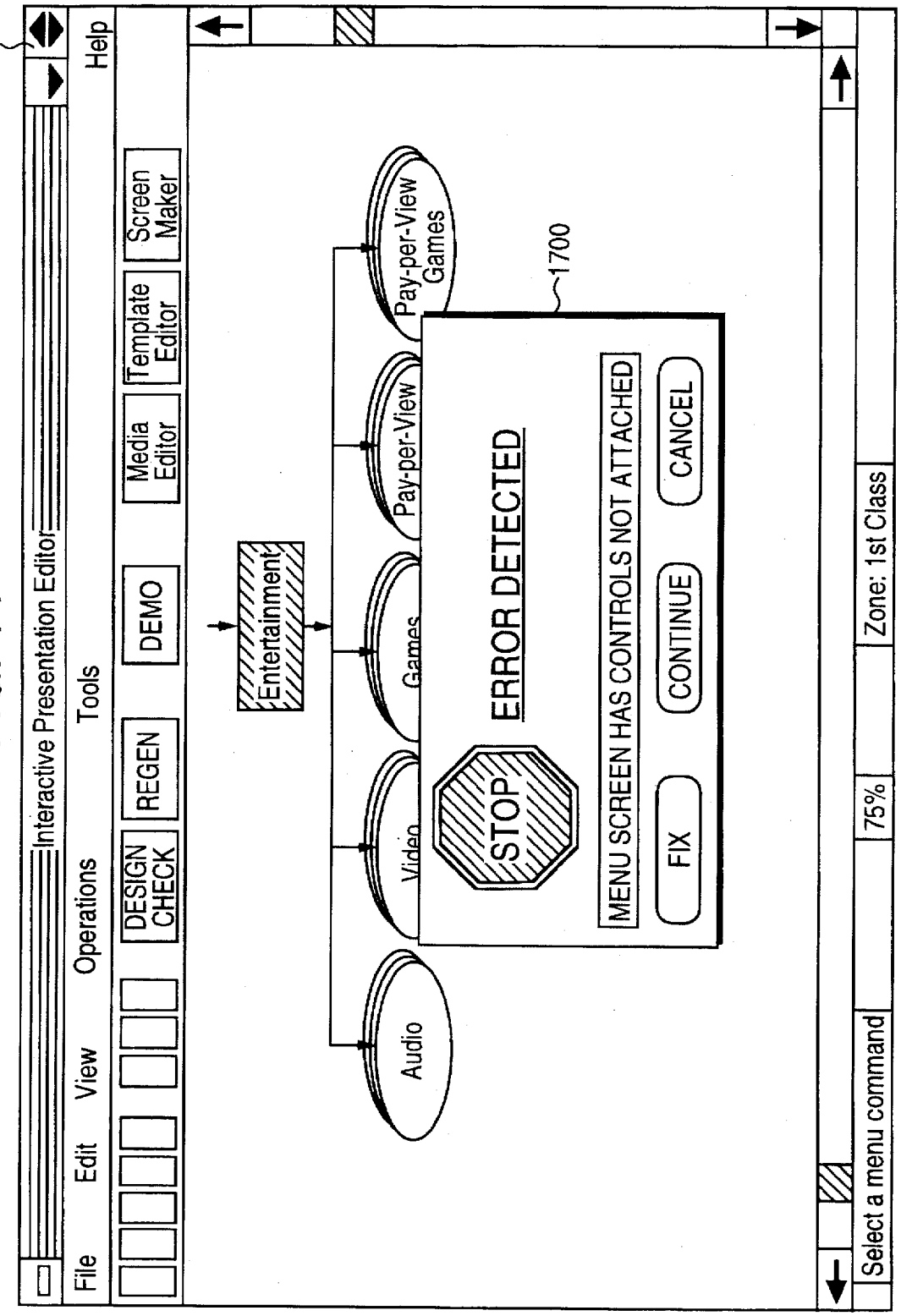

INTERACTIVE APPLICATIONS GENERATOR FOR AN INTERACTIVE PRESENTATION ENVIRONMENT

FIELD OF THE INVENTION

The present invention relates to the field of automated software generation tools, and more particularly, the present invention relates to an interactive applications generator for use in an interactive presentation environment.

BACKGROUND OF THE INVENTION

In general, interactive applications software is developed for use in an interactive applications environment. Typically, interactive applications software involves the manipulation of media and the presentation of a graphical user interface. The interactive applications environment permits a user to select various media elements via the graphical user interface. For example, in a cable television interactive system, the customer may be presented with a user interface consisting of one or more menu screens. The menu screens permit the user to select various media elements, such as movies, music videos and television programming. Preferably, the menu screens are customized for a particular audience. In addition, it is desirable to update the menu screens over a period of time. Upon entering a selection via the user interface menu screen, the user is presented with the appropriate media element. It is necessary to update the available media elements as new media elements become available.

The creation, modification, and maintenance of interactive applications software is difficult and time consuming. For example, each application for the interactive application software involves development of a unique user interface so that each customer receives a customized product having a unique look and feel. Therefore, for each application, the developer of the interactive applications software must specialize each display screen in the graphical user interface for each customer. Consequently, it is desirable to develop tools to facilitate the development of customized display screens for a user interface. Furthermore, the presentation of menu screens to create the user interface is dependent upon the particular application. Therefore, for each application, the developer of the interactive applications software must specialize the software to accommodate the appropriate presentation of menu screens. Consequently, it is desirable to develop tools to facilitate in the development of the presentation of screens to create customized interactive applications environments.

In addition to the development of interactive applications software, the maintenance and updating of interactive applications software is typically difficult. For example, in any interactive applications environment, as new media elements become available, the interactive applications software requires updating to accommodate selection and access to the new media elements. In addition, it is desirable to update the customized user interface without the need to update each individual display screen used by an interactive application program. Consequently, it is desirable to separate the user interface portion of multimedia display screens from the interactive media portion. As will be described, the present invention provides methods and apparatus for an interactive applications generator to develop and maintain interactive applications software for use in an interactive presentation environment.

SUMMARY AND OBJECTS OF THE INVENTION

Therefore, it is an object of the present invention to provide an interactive applications software generation tool that minimizes the cost and difficulty in creating large amounts of custom interactive software involving media.

It is a further object of the present invention to decouple the user interface portion of multimedia display screens from the interactive media portion.

It is another object of the present invention to permit generation of customized look and feel user interfaces while maintaining a generic base of interactive media.

It is another object of the present invention to permit updating the customized user interface without the need to update each individual display screen used by an interactive application program.

It is another object of the present invention to provide an automated method to interconnect display screens into interactive application programs utilizing a drag and drop operation.

It is another object of the present invention to utilize interactive application object libraries to insert functionality into the interactive applications generator.

These and other objects of the present invention are realized in an arrangement that includes an interactive applications generator that generates interactive application programs for operation in an interactive application environment. In a preferred embodiment, the interactive application environment is implemented on a single server multi-client network computer system. The application programs permit users, accessing the single server multi-client network, to interact with multimedia presentations. The single server multi-client network computer system includes a graphical user interface (GUI) that defines the interactive application environment. In general, the interactive application environment permits a user to access selective multimedia presentations. The interactive application environment contains one or more display screens. In general, the display screens are either menu screens or application screens. The menu screens permit selection of additional menu screens or application screens, and the application screens constitute a GUI for a particular application program.

The GUI look and feel of the multi-client network computer system, including the presentation of display screens, is generated by the interactive applications generator of the present invention. The interactive applications generator may be executed on any computer system equipped to handle multi-media applications. In order to generate a customized interactive application environment for a particular application, the interactive applications generator contains a screen template editor, a media frame editor, a screen editor, and an interactive presentation editor. The screen template editor is utilized to create generic screen templates, that contain a plurality of generic screen template elements. The media frame editor is utilized to generate media frames by combining multimedia component elements in a time synchronized manner. The screen editor is utilized to generate the display screens including assigning functionality. In order to create a unique instance for each display screen for a particular interactive applications environment, the screen editor references generic screen templates and media frames. The interactive presentation editor is utilized to create the hierarchical structures that defines the presentation of the display screens for the particular interactive presentation environment.

The screen template editor contains a screen template editor graphical user interface (GUI) that displays a plurality of tool dialog boxes on an output display to permit a user to select the generic screen template elements. The screen template editor GUI also contains a screen template build window for designing the screen template. The tool dialog boxes include a logos dialog box, a backgrounds and borders dialog box, controls dialog box and a media frame window dialog box. The controls dialog box permits selection of buttons, sliders and indicators. The borders dialog box, the logos dialog box, and the media frame windows dialog box contain a list box, for providing options to define a graphical look of the screen template, and a thumbnail sketch window for displaying a corresponding highlighted selection in the list box. In addition, a select button permits a user to select the corresponding highlighted selection in the list box. The borders dialog box permits a user to specify background color, background texture, border color, border style, drop boxes and lines, and the logos dialog box permit a user to select from a number of available logos. The media frame windows dialog box permits a user to select a media frame window location within the generic screen template, such that a dotted border comprising size and aspect ratio of said media frame selected is displayed in the screen template build window.

The media frame editor permits a user to generate media frames comprising images, graphics, animations, video clips, text, and sound clips. The media frame editor includes a media frame editor graphical user interface (GUI) that displays a timeline window consisting of media tracks, a time scale and a vertical cursor. The media frame editor GUI contains a media selection window, including a list box and buttons, to permit a user to attach media frames to a media track. The media selection window further includes a thumbnail sketch window for displaying viewable media elements selected via the list box. A run window, contained within the media frame editor GUI, permits a user to view selected media frames. In order to run selected media flames, breakpoints are set so that the run window displays successive media frames on a selected media track between adjacent breakpoints. The media frame editor GUI also contains time line transition special effect functions including a cut, fade in, fade out, dissolve, horizontal wipe, vertical wipe, and digital wipe. Furthermore, the media frame editor GUI includes pan, zoom and complex pan and zoom functions to generate media frames that incorporates panning and zooming of a media element.

The screen editor contains a screen editor graphical user interface (GUI) that displays a screen layout including a graphical representation of the generic screen template referenced. In addition to the borders and logos, the generic screen template includes outlines of media frame windows and controls. The screen editor GUI contains a media frame catalogue comprising a separate window that permits a user to scroll through a catalogue of media frames. Utilizing the media frame catalogue, the user assigns, via a drag and drop operation, a media frame to a media frame area on the screen layout. A function library catalog contains a separate window that permits a user to scroll through a library of predefined functions. The function library catalog is also a drag and drop operation that permits the user to assign functionality to a control on the screen layout.

The interactive presentation editor contains an interactive presentation editor graphical user interface (GUI) that displays screen identifier icons on an output display. The screen identifiers correspond to the display screens, and the interactive presentation editor GUI permits a user to place the screen identifiers in a hierarchical structure. The interactive presentation editor GUI includes a screen catalog to permit a user to scroll through a library of display screens. The screen catalog contains windows and controls to permit selection of a display screen for placement in the interactive applications environment.

The interactive presentation editor GUI contains dialog boxes corresponding to each display screen that allows a user to enter specific display screen information such as a text description, a screen identifier to link a display screen to a media frame and a screen template, a list of each control on the display screen, and a link to either an application screen or menu screen. In addition, grouping information, to classify display screens in a group level, may be entered. In order to create a hierarchical structure of display screens, drag and drop menu screen and application screen operations are provided to place a corresponding screen identifier, representing a display screen selected, in any level of the hierarchical structure. If a child display screen is dropped within a parent display screen, then a forward link from the parent menu screen to the child display screen is created. Alternatively, a forward link command is provided to establish a link from a control in a parent menu screen to a child display screen. In addition, the interactive presentation editor GUI contains a back path command to establish link from a child display screen to exit to a screen other than a parent display screen.

BRIEF DESCRIPTION OF THE DRAWINGS

The objects, features, and advantages of the present invention will be apparent from the following detailed description of the preferred embodiment of the invention with references to the following drawings.

FIG. 14 illustrates an example of a screen hierarchical structure during the design check process.

NOTATION AND NOMENCLATURE

Figure 1:
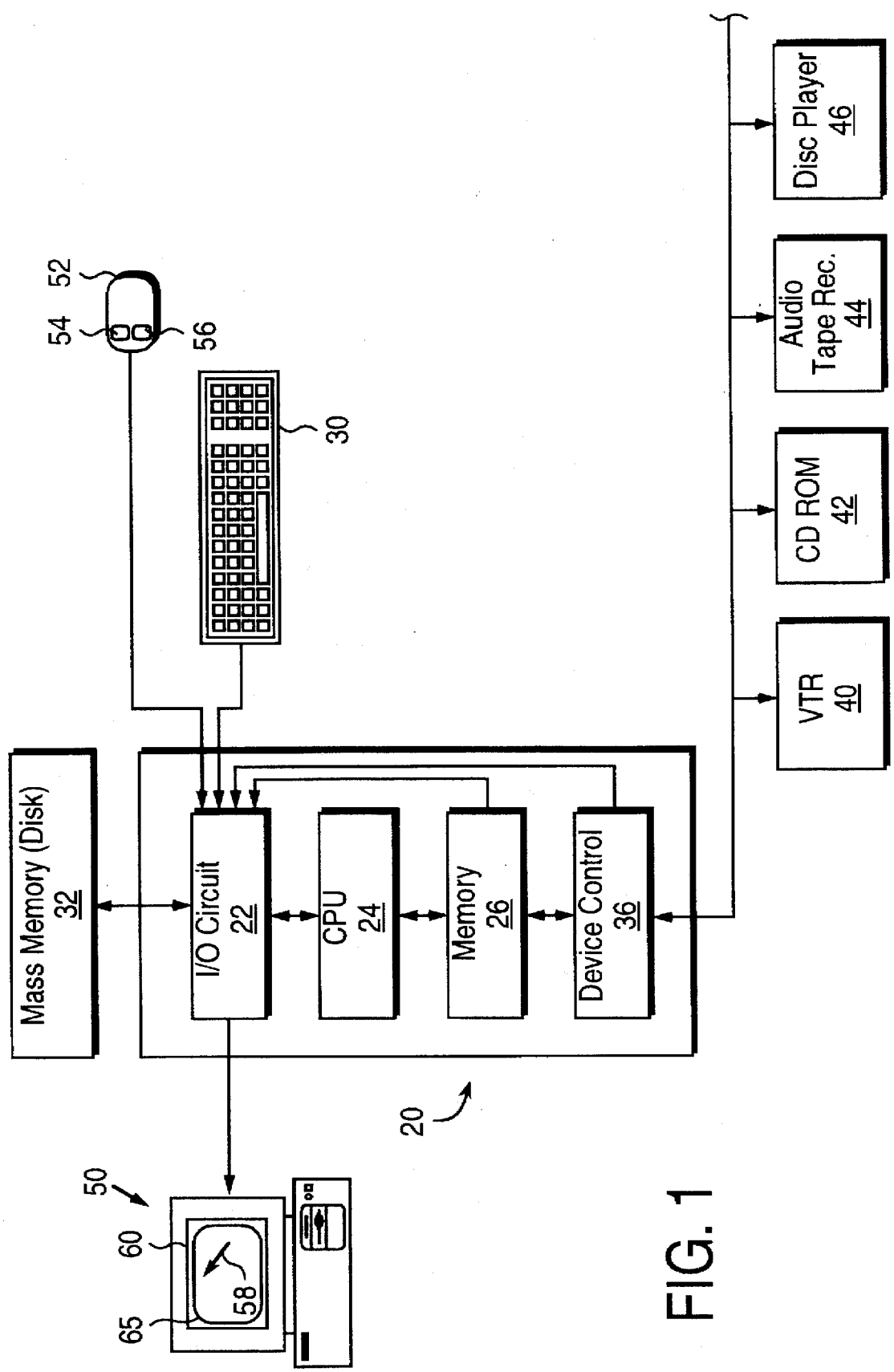
FIG. 1 illustrates a computer system for generating a window-based graphic user interface in accordance with the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by Sony Trans Com, as well as other manufacturers of computer systems.

DETAILED DESCRIPTION

The present invention discloses apparatus and methods for an interactive applications generator. In the following description, numerous specific details are set forth such as computer system configurations, window elements, icons, desktop sizes, metaphors, window configurations and arrangements, etc. in order to provide a thorough understanding of the present invention. However, it will be apparent to one skilled in the art that the present invention may be practiced without these specific details. In other instances, well known circuits, structures and the like are not described in detail so as not to obscure the present invention unnecessarily.

Referring to FIG. 1, the hardware configuration of the present invention is conceptually illustrated. FIG. 1 illustrates a computer system for generating a window-based graphic user interface in accordance with the teachings of the present invention. As illustrated, the computer system includes a computer 20 which comprises four major components. The first of these is an input/output (I/O) circuit 22, which is used to communicate information in appropriately structured form to and from other portions of the computer 20. In addition, computer 20 includes a central processing unit (CPU) 24 coupled to the I/O circuit 22 and to a memory 26. These elements are those typically found in most computers and, in fact, computer 20 is intended to be representative of a broad category of data processing devices.

Also shown in FIG. 1 is a keyboard 30 for inputting data and commands into computer 20 through the I/O circuit 22, as is well known. It will be appreciated that additional devices may be coupled to the computer 20 for storing data, such as magnetic tape drives, and the like. A device control 36 is coupled to both the memory 26 and the I/O circuit 22, to permit the computer 20 to communicate with multi-media system resources. The device control 36 controls operation of the multi-media resources to interface the multi-media resources to the computer 20. For example, in an interactive applications generator environment utilizing video, the computer 20 may be coupled through the device control 36 to a video tape recorder 40, compact disc read only memory (CD ROM) 42, an audio tape recorder 44, and a disc player 46. The device control 36 may comprise an independent control and interface device or a software process for execution by the CPU 24.

A display monitor 50 is coupled to the computer 20 through the I/O circuit 22. Any well known variety of cathode ray tube (CRT), liquid crystal or other displays may be utilized as display monitor 50. A cursor control device 52 includes switches 54 and 56 for signaling the CPU 24 in accordance with the teachings of the present invention. Cursor control device 52 (commonly referred to as a "mouse") permits a user to select various command modes, modify graphic data, and input other data utilizing switches 56 and 54. More particularly, the cursor control device 52 permits a user to selectively position a cursor 58 at any desired location on a display screen 60 of the display 50. As illustrated in FIG. 1, the cursor 58 is disposed within a window 65 in the present invention's graphic user interface, to be described more fully below. Moreover, in the presently preferred embodiment, the present invention's window-based user interface is generated and displayed using software stored in either memories 26, 32 or CD ROM 34, and executed by the CPU 24.

In the presently preferred embodiment, the cursor control 52 utilizes well known apparatus and methods for signaling CPU 24 of position changes of cursor 58 by movement of the cursor control over a surface. However, it will be appreciated by one skilled in the art that a variety of well known cursor control devices may be utilized by the present invention, including other control devices such as mechanical mice, trackballs, joy sticks, graphic tablets, other keyboard inputs. The cursor control 52 in FIG. 1 is intended to encompass all such equivalent devices.

The methods and apparatus of the present invention are utilized to generate application programs for operation in an interactive applications environment. An interactive applications environment may be implemented on any single server multi-client network computer system. In a preferred embodiment, the application programs permit users, accessing the single server multi-client network, to interact with multimedia presentations. The interactive applications enviroment includes a graphical user interface (GUI) that permits a user to interact with multimedia presentations. The graphical user interface contains one or more display screens. In general, the display screens are either menu screens or application screens. The menu screens permit selection of additional menu screens or application screens, and the application screens constitute a GUI for a particular application program.

The present invention permits generation of customized interactive applications environments through use of an interactive applications generator. The interactive applications generator provides a means for a user to create a customized interactive applications environment for a particular application. For example, an interactive applications environment may be generated for an airline passenger entertainment system. Specifically, the interactive applications generator permits generation of customized logos, background colors and textures, graphical design style of controls including buttons and sliders, and a generalized look and feel of a graphical user interface for a particular application.

The graphical user interface elements are derived from a generic screen template and are created through use of a screen editor. The generic elements of a screen template include a background, controls, corporate logos, and display windows for displaying text and graphical information. Each display screen contains a corresponding screen template. In addition to screen templates, a display screen may also contain a media frame. The media frame is displayed over a portion of the display screen or over the entire display screen. The screen templates contain all of the graphical user interface elements required to customize a display screen for a particular application. The controls located on the screen templates provide functionality for the interactive applications environment.

The media frames are generated by the interactive applications generator via a media frame editor. The media utilized in the media frames may consist of any multimedia subject matter. For example, in an airline passenger entertainment system, the multimedia subject matter may include duty free shopping product advertisements, photographs of a destination city, and destination city maps. In addition to the multimedia subject matter, each media frame may comprise one or more types of multimedia. For example, a media frame may comprise a graphical image, a video clip, an animation sequence, a sound clip, graphics, and blocks of text with display attributes. As will be explained more fully below, all multimedia subject matter associated with a particular media frame is loosely synchronized to a common time line so that each media frame contains exactly one time line.

Each display screen has a unique existence within a particular interactive applications environment. However, both screen templates and media frames may be shared by multiple instances of display screens. For example, in the airline passenger entertainment application, a catalog shopping application program is constructed to randomly change sequences of screen templates to create multiple unique instances of display screens. For media frames, an image of a product may be used with multiple instances of display screens, wherein each display screen contains separate text targeted at different audiences.

The airline passenger entertainment system provides one example of an interactive applications environment generated by the interactive applications generator of the present invention. Although the airline interactive passenger entertainment system is provided as an example of an interactive applications environment, many other possible applications exist that share component elements similar to the airline interactive passenger entertainment system. Such interactive applications environments include business training systems, educational systems for schools, library information systems, interactive cable or satellite home delivery of multimedia and television, on line equipment repair information systems, health information systems, hospital patient entertainment systems, cruise ship passenger entertainment systems, bus and commuter train interactive multimedia delivery systems. In addition, applications exist that require screen templates and or media frames as defined in the present invention.

In a preferred embodiment, the interactive applications generator of the present invention is a software tool for creating and modifying application programs for use in an integrated interactive applications environment. The interactive applications generator contains an interactive presentation editor, a display screen editor, a screen template editor, and a media frame editor. In addition, the interactive applications generator includes components for testing and checking the operation of the interactive applications environment prior to generation of a target output for the application programs. In general, the interactive presentation editor allows the user to create hierarchical structures of screens. The screen editor permits the user to reference a screen template and or media frames to create a unique instance of a display screen. The screen editor also permits the user to attach controls to a particular screen display. The screen template editor permits a user to create screen template definitions. The media frame editor permits a user to combine multimedia component elements in a time synchronized fashion to produce a media frame. The four editors within the interactive applications generator also permit modification of existing application programs and screens.

In a preferred embodiment, a design rules checker and an application tester are utilized. The design rules checker providers a user with a means for logically testing an interactive applications environment to verify that the internal links and attributes are consistent throughout the interactive applications environment. For example, the design rules checker identifies one way cul-de-sac paths or completely unlinked screens. The applications tester provides a demonstration for the user so that the user may check the aesthetic functionality of an interactive applications environment. Specifically, the applications tester allows an operator to identify a confusing screen sequence, timing problems or inappropriate labeling of controls.

The interactive applications generator provides a means for organizing work created in "projects", wherein each project identifies a separate interactive applications environment. A new project is opened to begin creating a new interactive applications environment. Opening a new project creates a set of files to store the component elements of a project. Each editor, within the interactive applications generator, contains a file for the project. All of the files for a project have a common name, but each of the files has a unique file extension. A user of the interactive applications generator can open only one instance of the interactive presentation editor. However, multiple instances of the screen editor, screen template editor, and media frame editor may be opened simultaneously. This configuration permits flexibility such that a user may work on the component elements of a single project but the user is precluded from opening more than one project at a time. The interactive applications generator permits a user to begin at any category block except for the design rules checker and the applications tester.

Figure 2:
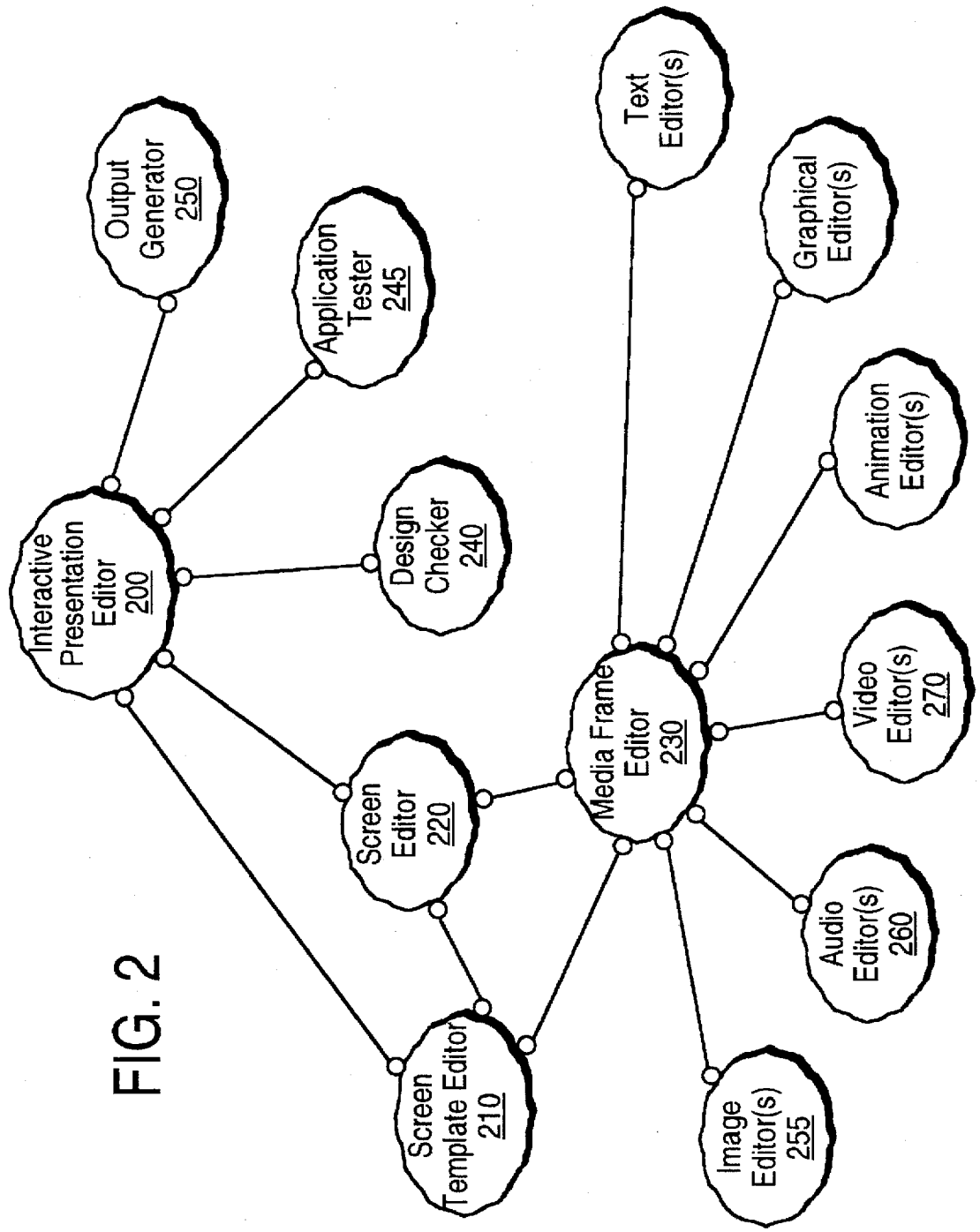
FIG. 2 illustrates a program hierarchy for the interactive applications generator configured in accordance with the present invention.

FIG. 2 illustrates, in Booch notation, a program hierarchy for the interactive applications generator configured in accordance with the present invention. The interactive applications generator contains four primary component programs: an interactive presentation editor 200; a screen template editor 210; a screen editor 220; and a media frame editor 230. The interactive presentation editor 200 is shown in FIG. 2 as a top layer for the interactive applications generator. In order to create an interactive applications environment for a particular application, a user may begin a project utilizing a top to down design methodology by beginning with the interactive presentation editor 200. In general, the interactive presentation editor 200 permits a user to build a skeleton to define a screen hierarchy. Alternatively, a user may begin a project utilizing a bottom to top design methodology by first creating the screen templates and media frames. The interactive applications generator provides menu selections for each of the four primary component programs to allow: invoking an instance; returning to an existing instance; or returning to any of the other primary component programs. A windows group box with icons for each of the four primary component programs provides flexible entry access to the interactive applications generator.

The interactive presentation editor of the present invention provides the capability to link together a set of menus and application screens to create a particular interactive applications environment. Specifically, the interactive presentation editor permits the operator to organize and display screens in a screen hierarchy. In the interactive presentation editor, the screens are represented as symbols for manipulation by the user. The screen hierarchy establishes paths for the display screens to define an interactive applications environment. The screen hierarchy is organized in hierarchical levels, such that a user selects a screen at one level of the hierarchy to permit entry into subsequently more detailed levels of the hierarchy. For purposes of explanation, child display screens are defined as those display screens having a parent display screen located in the next higher hierarchical level. In order to establish the screen hierarchy for a particular interactive applications environment, each child display screen is linked to a control on the respective parent display screen. In addition, paths, known as back paths, for exiting the display screen are also created. These back paths typically return the user to a higher level in the hierarchy.

Figure 3:
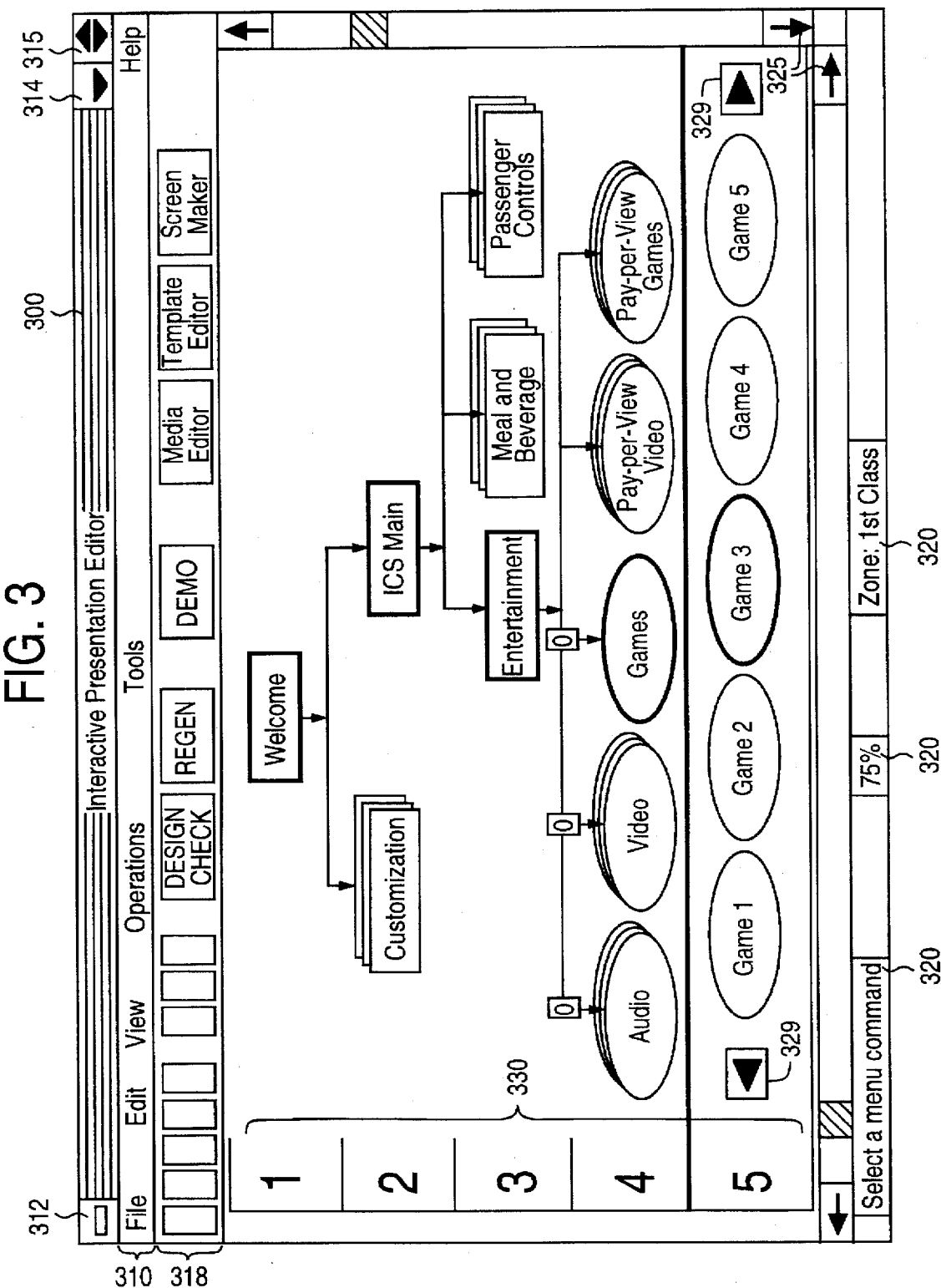
FIG. 3 illustrates a graphical user interface for an interactive presentation editor configured in accordance with the present invention.

FIG. 3 illustrates a graphical user interface (GUI) for an interactive presentation editor configured in accordance with the present invention. In a preferred embodiment of the present invention, a GUI is generated on the computer system via operation in the Microsoft™ Windows operating system environment. The GUI for the interactive presentation editor 200 contains a title bar 300, menu bar 310, system menu button 312, and minimize and maximize buttons 314 and 315, respectively. In addition, the GUI for the interactive presentation editor contains a tool bar 318 containing a number of icons. The icons are used to represent commonly used functions such as the rules checker and the applications tester. The display of the tool bar 318 is toggled either to an "on" or "off" state. A status bar 320 is used to display informational messages to aid the operator. For the GUI shown in FIG. 3, a description for the icon under the cursor control device, the current zoom ratio, and zone restrictions are shown. In addition, scroll bars 325 permit panning of the graphical display in both horizontal and vertical directions. A depth ruler 330 displays the hierarchical level in the screen hierarchy for the corresponding display screens.

The interactive presentation editor 200 utilizes display screen identifiers to graphically represent display screens for arrangement by a user to create a particular interactive applications environment. Generally, display screens consist of menu screens and application screens. A menu display screen permits selection of another menu display screen or an application display screen. An application screen is a GUI for a particular application program. A rectangular display screen identifier represents a menu screen, and an oval display screen identifier represents an application display screen. In order to select a display screen from the interactive presentation editor 200, the user selects the respective display screen identifier through use of a cursor control device. When a particular display screen is selected, a dialog box for the corresponding display screen is invoked. For a menu display screen, the dialog box permits a user to enter specific display screen information. For example, a user may enter: the text description of the screen; a screen identifier linking the screen to a media frame and a screen template; a list of each control; and a link to either an application or sub-menu screen. In addition, other attributes defining classifications for use of the display screen may be entered. Furthermore, information may be automatically entered into the database without use of the dialog box if a display screen is selected from a screen catalog. The operation and use of a screen catalog is described more fully below.

If the menu or application display screen is linked to additional menu and/or display screens, then the menu or applications display screen identifier contains "a three dimensional shadow". For example, the meal and beverage menu display screen identifier illustrated in FIG. 3 contains additional menu and application display screens. When viewing the screen hierarchy via the interactive presentation editor, one interactive presentation path is highlighted. For the example screen hierarchy illustrated in FIG. 3, the display screens: "welcome", "ICS main", "entertainment", and "games", that comprise the active interactive presentation path, are highlighted.

If a user selects an application screen, a dialog box is invoked, permitting entry of application specific information. The interactive presentation editor 200 allows a user to link menu screens to application screens. FIG. 3 illustrates an example of a four level screen hierarchy for an airline passenger entertainment interactive environment. The hierarchical path begins with a "welcome" menu display screen. The "welcome" menu display screen permits a user to select the "ICS main" menu or the "customization" menu. From the ICS main menu, the entertainment, meal and beverage and passenger menu screens are selectable. From the entertainment menu display screen, a number of application display screens are selectable. For the example shown in FIG. 3, an audio, video, games, pay-per-view video and pay-per-view games application screens are shown associated with the entertainment menu display screen. If the user, via a cursor control device, double-clicks on the games application display screen, a list box, showing one or more screen identifiers describing a set of screens for the selected application, are displayed.

FIG. 3 illustrates screen identifiers for the games applications in a fifth hierarchical level. Also shown in the fifth level are arrows, labeled 327 and 329, that permit the user to scroll through the screen identifiers in either a right or left direction, respectively. For groups of selected menu and or application screens, double-clicking on any of the selected display screens permits a user to enter information pertaining to a group level. For example, a user may set restrictions or availability of certain screens based on a group level classification. For the airline passenger entertainment system, restricted access may be categorized by area zone, flight phase, age restriction, and special passenger information.

The interactive presentation editor of the present invention determines the association of child screens to menu parent display screens automatically. The determination is based on the left to right ordering of the application screens in the hierarchy, and the ordering set forth for each control when the corresponding screen template is created. If too many controls or too many child screens are associated with a parent screen, the operator of the interactive applications generator is prompted to correct the error during the design check phase.

Figure 4A:
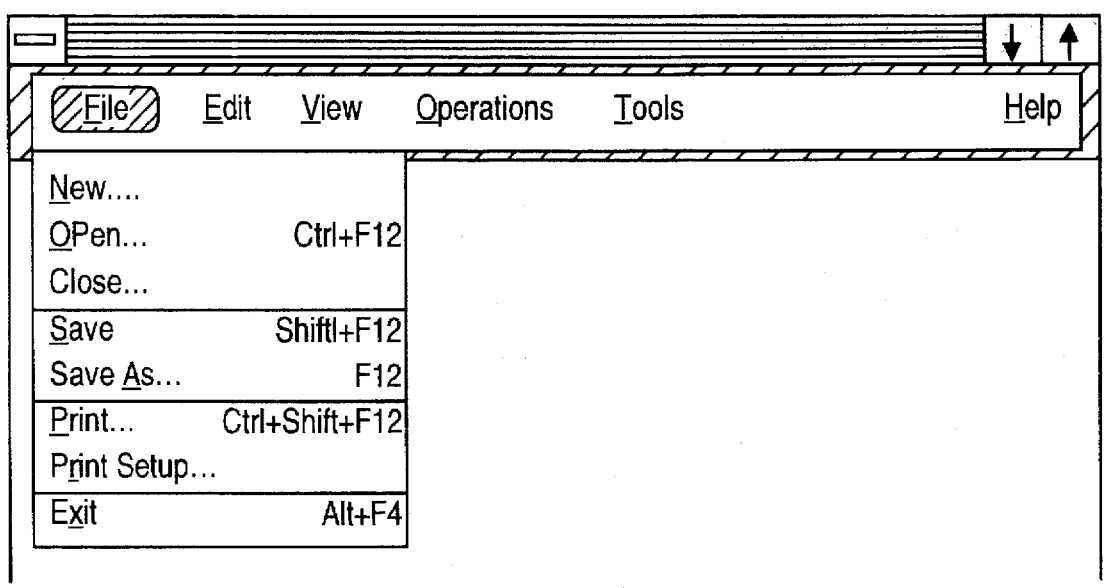
FIG. 4a illustrates a file menu for the interactive presentation editor configured in accordance with the present invention.

FIG. 4a illustrates a file menu for the interactive presentation editor configured in accordance with the present invention. The file menu selection on the interactive presentation editor GUI permits a user to open a new file. Upon invocation of the "new" function, a windows common dialog box is invoked to open a new file. An "open" function permits a user to open a new or existing file within the screen hierarchy. The interactive presentation editor files are given the file extension ".IPE". When the file open function is selected, only files ending with the ".IPE" extension are displayed for selection by the user. A "close" function in the file menu closes the active file currently opened. In order to avoid discarding updated information during an editing session, a user is prompted to save changes if edits were made to the file subsequent to the last save operation. A "save" function permits a user to save the currently opened file to disk. When selected, a windows common dialog box is invoked to save the active ".IPE" file.

A "save as" function in the file menu permits a user to save the active .IPE file under a new name. A file extension of .IPE is automatically added to the name selected. A print function within the file menu permits a user to print the active screen hierarchy or a subset of the current screen hierarchy. Options for the print function include printing the current view on display, the current tree hierarchy being edited, or a set of selected display screens. A "print setup" function within the file menu permits a user to set up the printer environment. Finally, the "exit" function within the file menu permits exiting the active open file within the interactive presentation editor. If the active .IPE file has not been saved upon invocation of the exit function, the user is prompted to save the file before exiting.

Figure 4B:
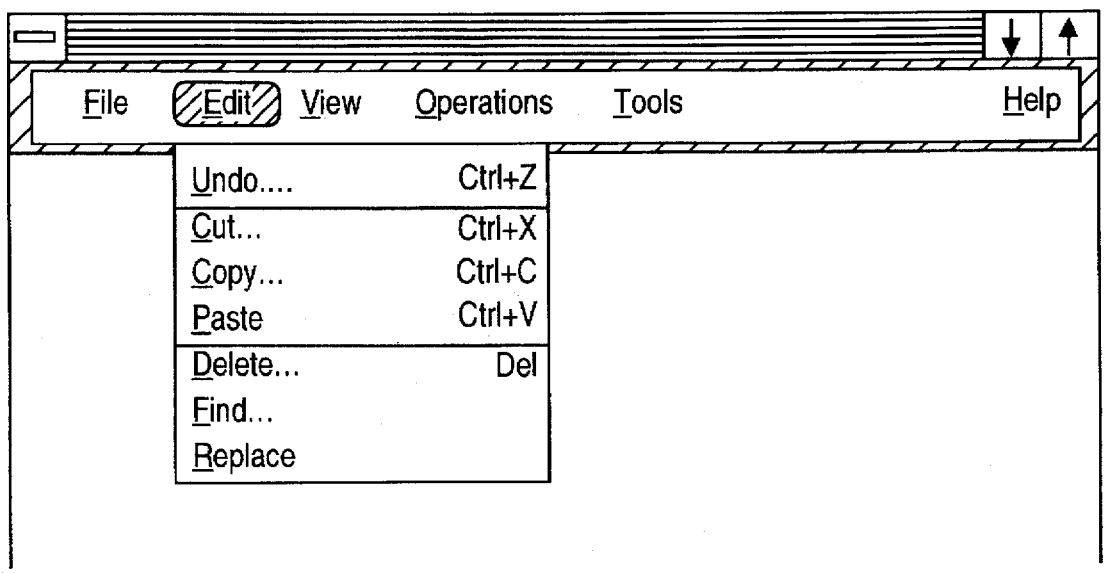
FIG. 4b illustrates an edit menu for the interactive presentation editor program configured in accordance with the present invention.

FIG. 4b illustrates an edit menu for the interactive presentation editor program configured in accordance with the present invention. The edit menu contains an "undo" function command that allows a user to repeatedly back out of the last "n" operations up to a point. The number of undo operations is a user defined option such that the user may pre-configure the number in a configuration program. The interactive presentation editor program edit menu also includes a standard windows "cut" function. The cut function allows the user to cut or delete logical items in the program. The deleted items are placed in the windows clip board or buffer. The cut function permits a user to select screen menus, including the screen menu associated hierarchies, for removal or relocation. The edit menu also displays a standard windows copy function which allows a user to copy logical items in the program. Upon invocation of the copy function, the logical items are placed in the windows clip board. For the interactive presentation editor program, the copy operation copies selected screen menus, including the screen menu associated hierarchies, to other hierarchies. In addition, the copy operation may be utilized as an editing shortcut when a portion of the screen hierarchy is similar.

The edit menu also includes a standard windows "paste" function, allowing a user to paste or insert logical items currently stored in the windows clip board. A "delete" function is also included in the edit menu. The delete function is analogous to the cut function, except that the information is not copied to the clip board. Items in the interactive presentation editor program may also be deleted by selecting the object and pressing a delete key on the host computer keyboard. The "find" function, selectable within the edit menu, permits a user to search for a particular display screen. A user may search on the screen text description or a screen identifier. If the display screen sought is found, the screen is selected and displayed on the monitor so that the selected screen appears within the current view window. A "replace" command, selectable from the edit menu, allows execution of a search and replace function in the interactive presentation editor program. For example, the replace function permits scanning of all display screens for a given media frame for replacement with another. Confirmation of each replacement function selected and global replacement is an option.

Figure 5:
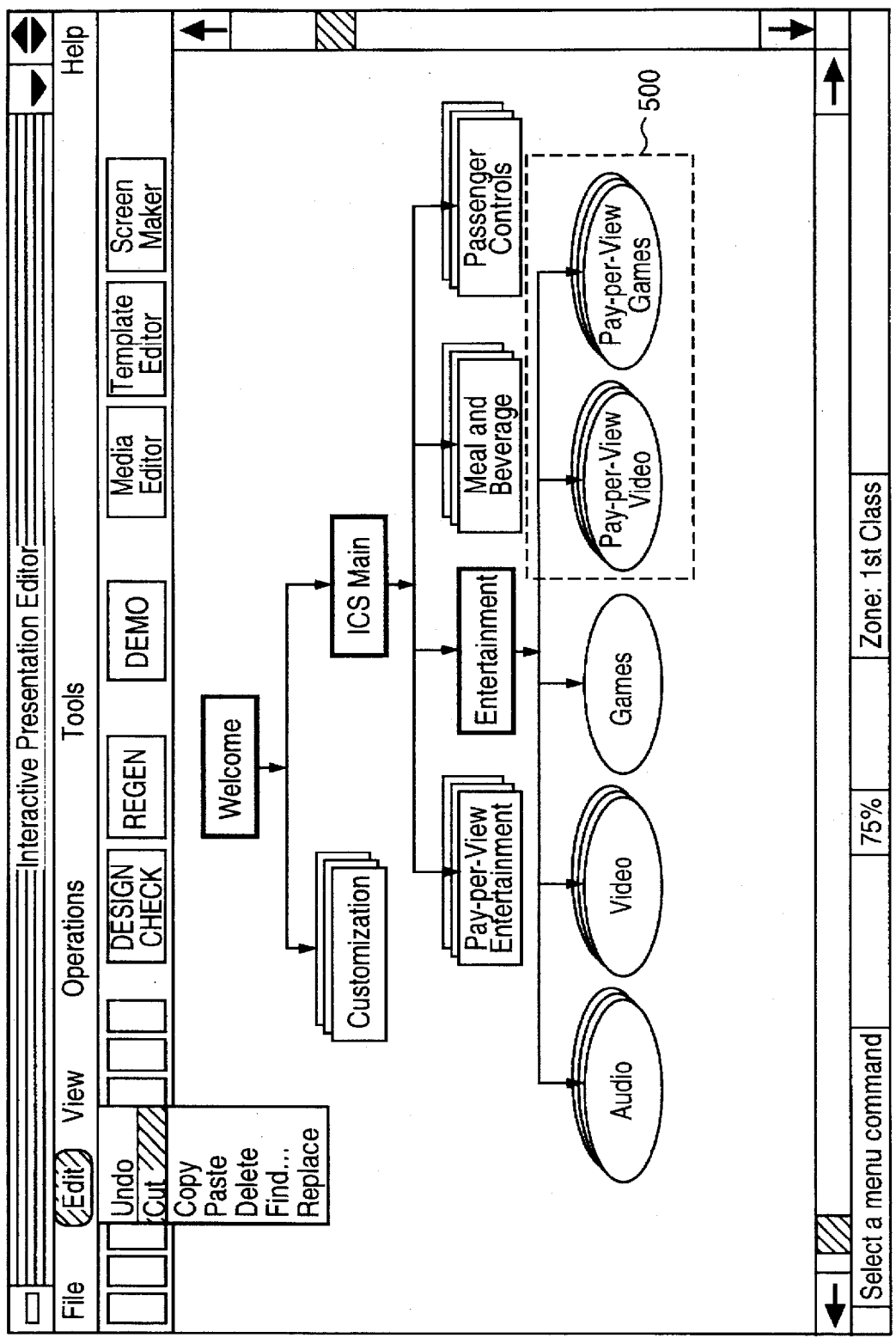
FIG. 5 illustrates a screen identifier movement operation via the interactive presentation editor.

FIG. 5 illustrates a screen identifier movement operation via the interactive presentation editor. For the example shown in FIG. 5, the user desires to move application screens Pay-per-View Video and Pay-per-View Games to a next higher hierarchical level. First, the application screens, pay-per-view video and pay-per-view games, are selected as indicated by the dotted rectangular box labeled 500 on FIG. 5. The selected application display screens are then cut via the cut function, and are subsequently stored in the windows clipboard. A user then selects a new parent screen such as the pay-per-view entertainment menu display screen. Upon selection of the menu display screen, the interactive presentation editor joins the screens graphically as shown in FIG. 6.

Figure 6:
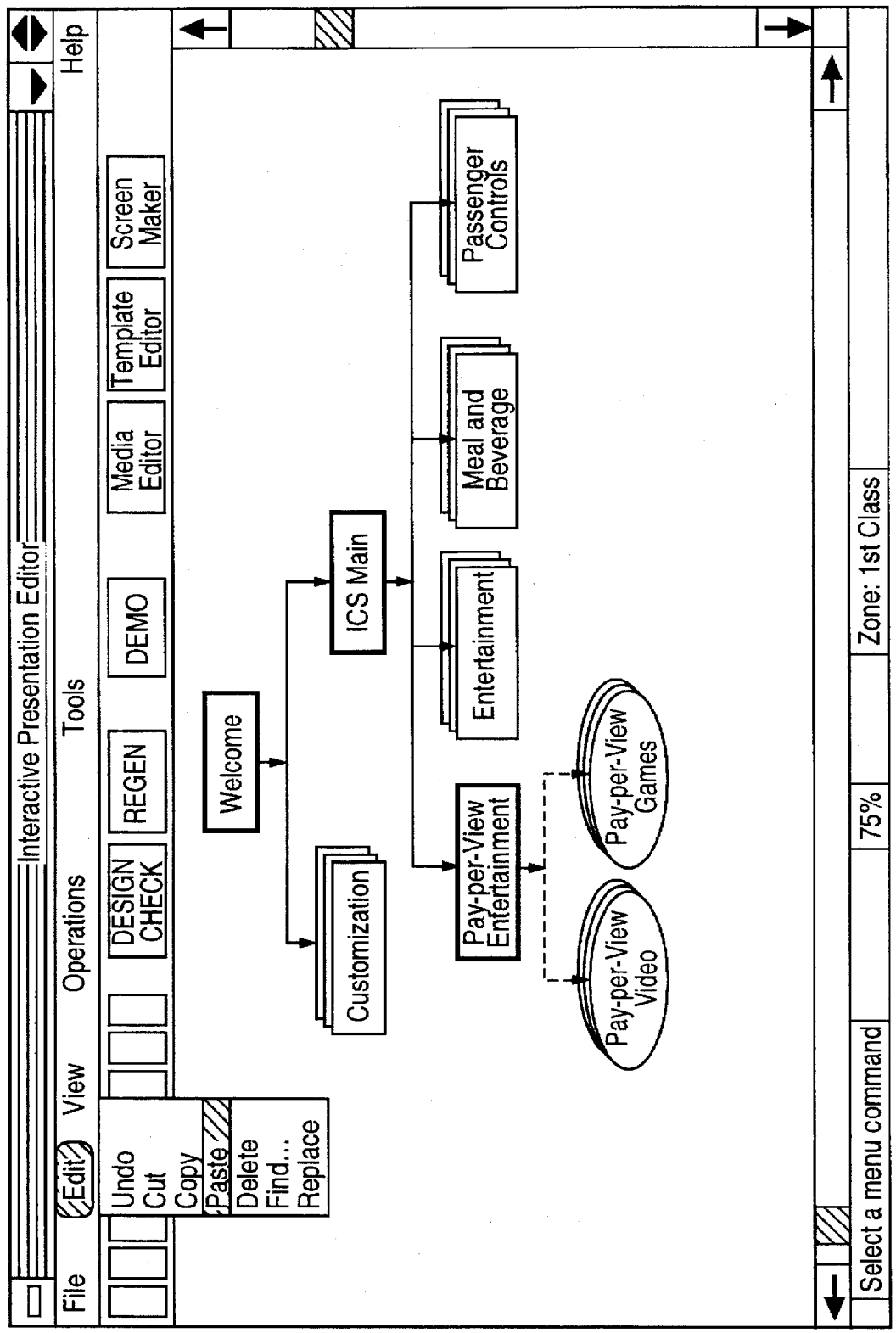
FIG. 6 illustrates the interactive presentation editor graphical user interface configured in accordance with the present invention.

The interactive presentation editor GUI illustrated in FIG. 6 connects, via a dotted line, the pay-per-view entertainment menu screen to the pay-per-view video and pay-per-view games application display screens. The dotted line indicates that the pay-per-view video and pay-per-view games application screens contain controls that are not defined to the parent screen. The placement of the pay-per-view video and pay-per-view games application screens automatically expands the corresponding hierarchical level to show the new placement. Because only one branch of a parent menu is expandable at any one particular time, the audio, video and games application screens were reduced into the entertainment menu screen, and the entertainment menu display identifier was changed accordingly.

Figure 4C:
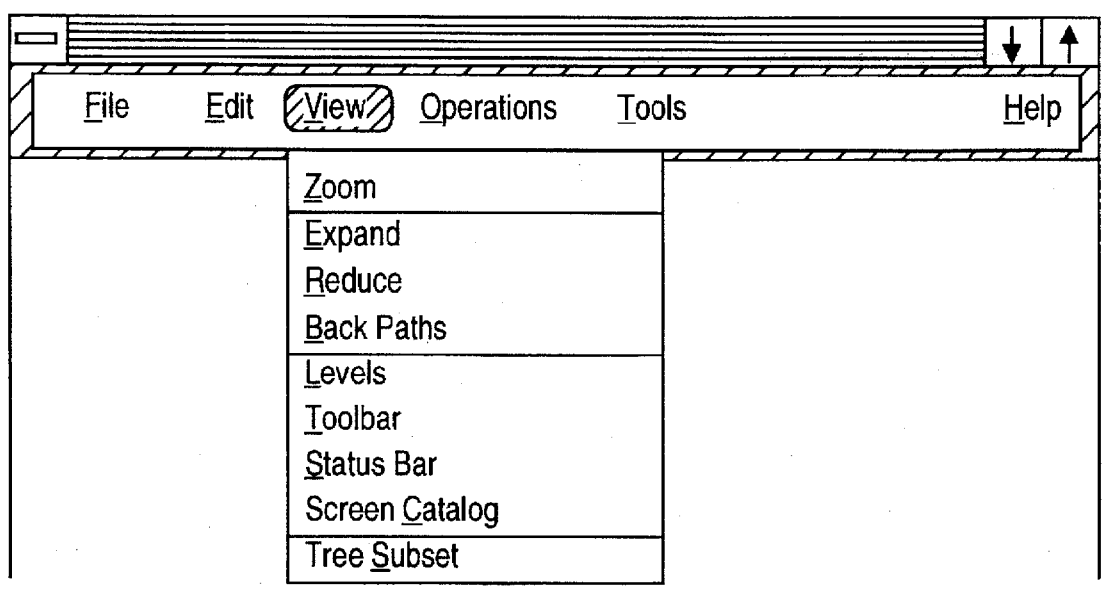
FIG. 4c illustrates a view menu for the interactive presentation editor configured in accordance with the present invention.

FIG. 4c illustrates a view menu for the interactive presentation editor configured in accordance with the present invention. The interactive presentation editor contains a "zoom" function, selectable from the view menu, that allows a user to zoom in or out of the current display window. The user controls the zoom function through use of a zoom scale factor. The zoom function enables the user to focus upon a selected portion of the current output display. The interactive presentation editor scales the selected portion to fit the display window. The "expand" command, also selectable from the view menu, allows a user to expand a menu screen group or an application screen group. A selected menu screen group is graphically expanded into a sub-menu structure. The level of expansion into the sub-menu structure depends upon an option initially set by the user. If expanded to show all levels, then each hierarchical level stops at a final menu screen or an application group. Alternatively, a selected application group expands into a separate screen. The selected application group is displayed showing the first "n" application screens, with forward and backward buttons. The direction buttons allow navigation through the set of screens comprising the application group.

Figure 7A:
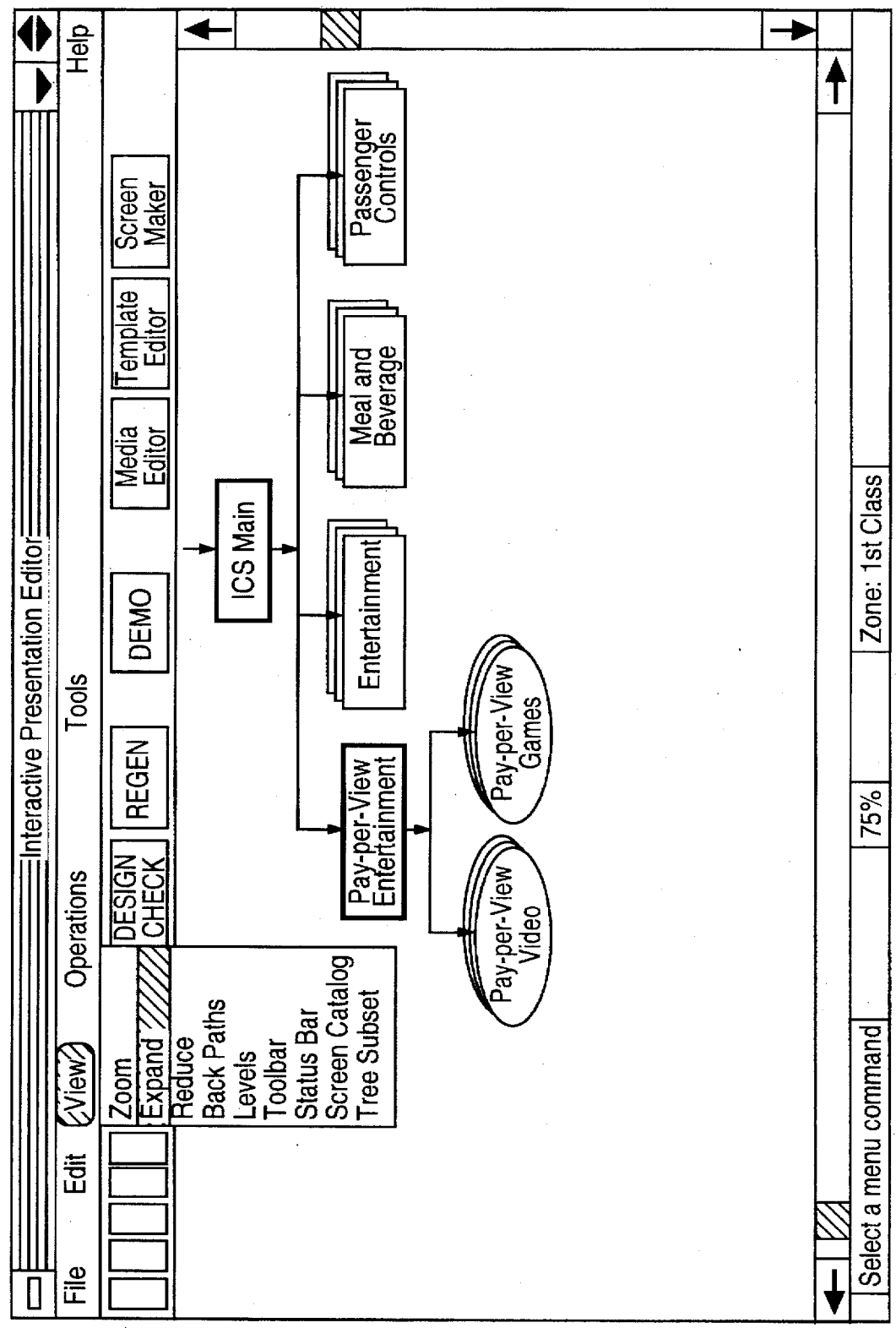
FIGS. 7a–b illustrate an example of the expand command configured in accordance with the interactive presentation editor of the present invention.
Figure 7B:
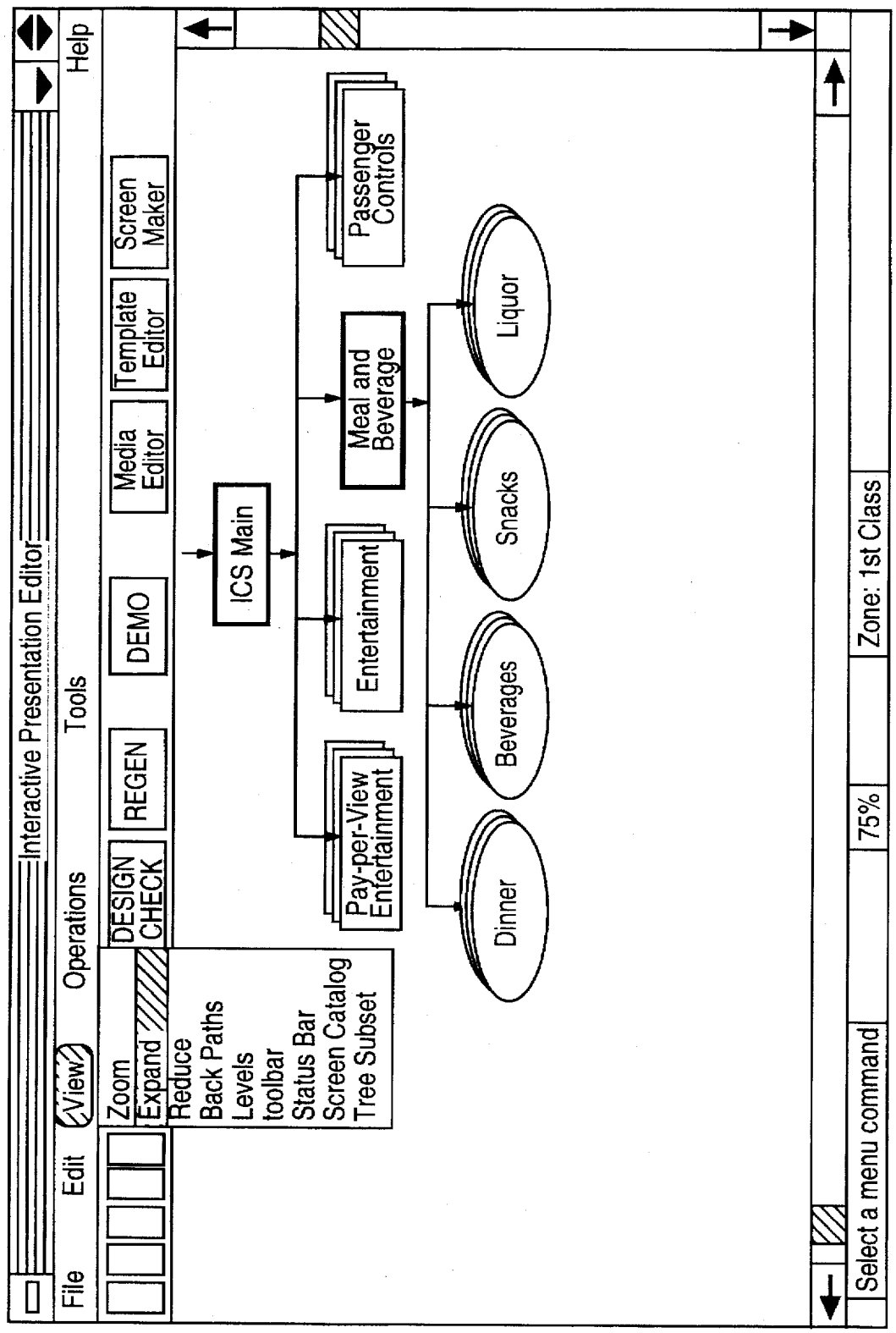

FIGS. 7a–b illustrate an example of the expand command configured in accordance with the interactive presentation editor of the present invention. FIG. 7a illustrates an example of a screen hierarchy for an interactive presentation environment. To expand the meal and beverage menu display screen, the user, through use of the cursor control device, selects the meal and beverage menu display screen identifier on the output display. FIG. 7b illustrates the output display after execution of the expand command on the meal and beverage menu display screen identifier.

Figure 8A:
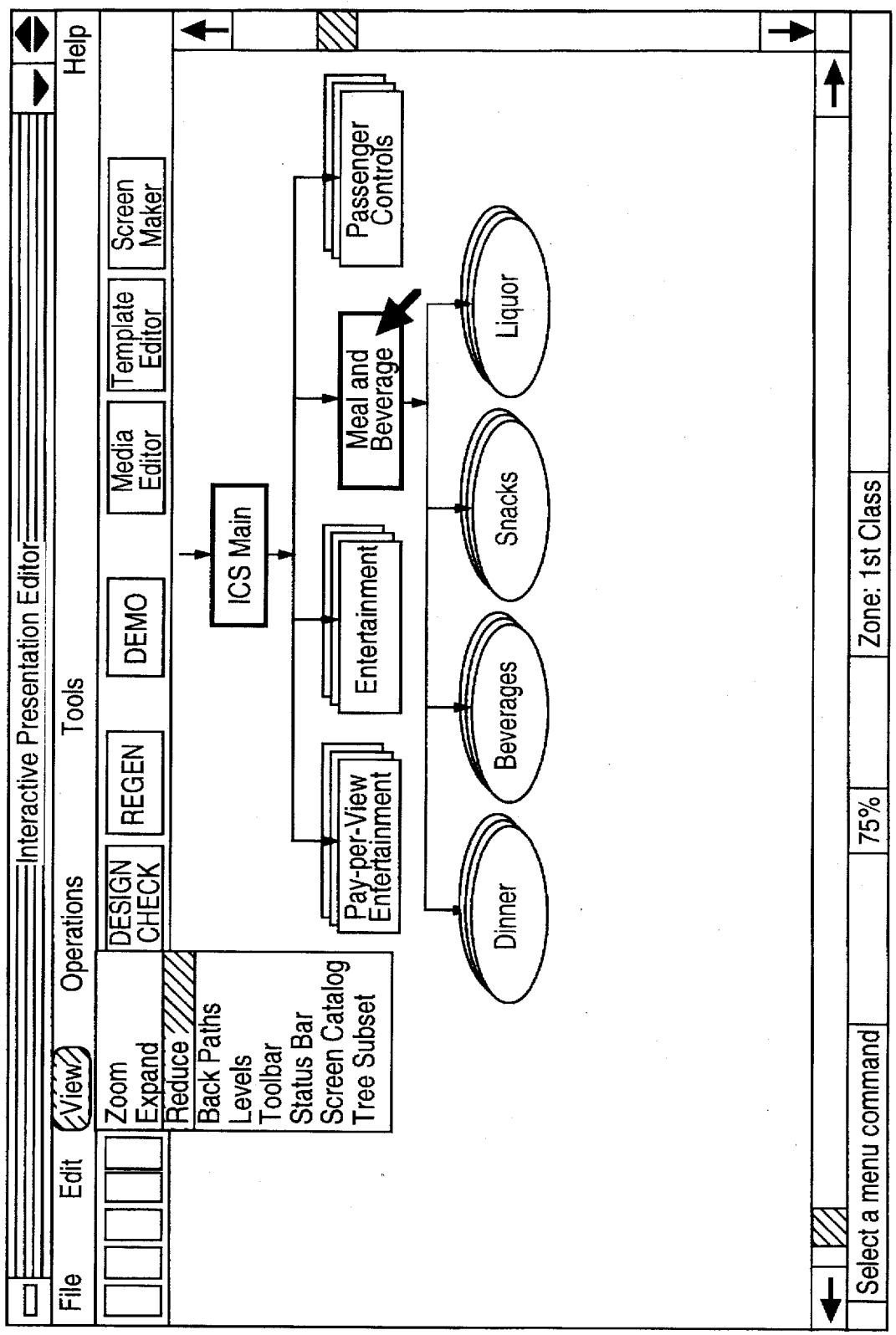
FIGS. 8a–b illustrate the reduce command for an example screen hierarchy.
Figure 8B:
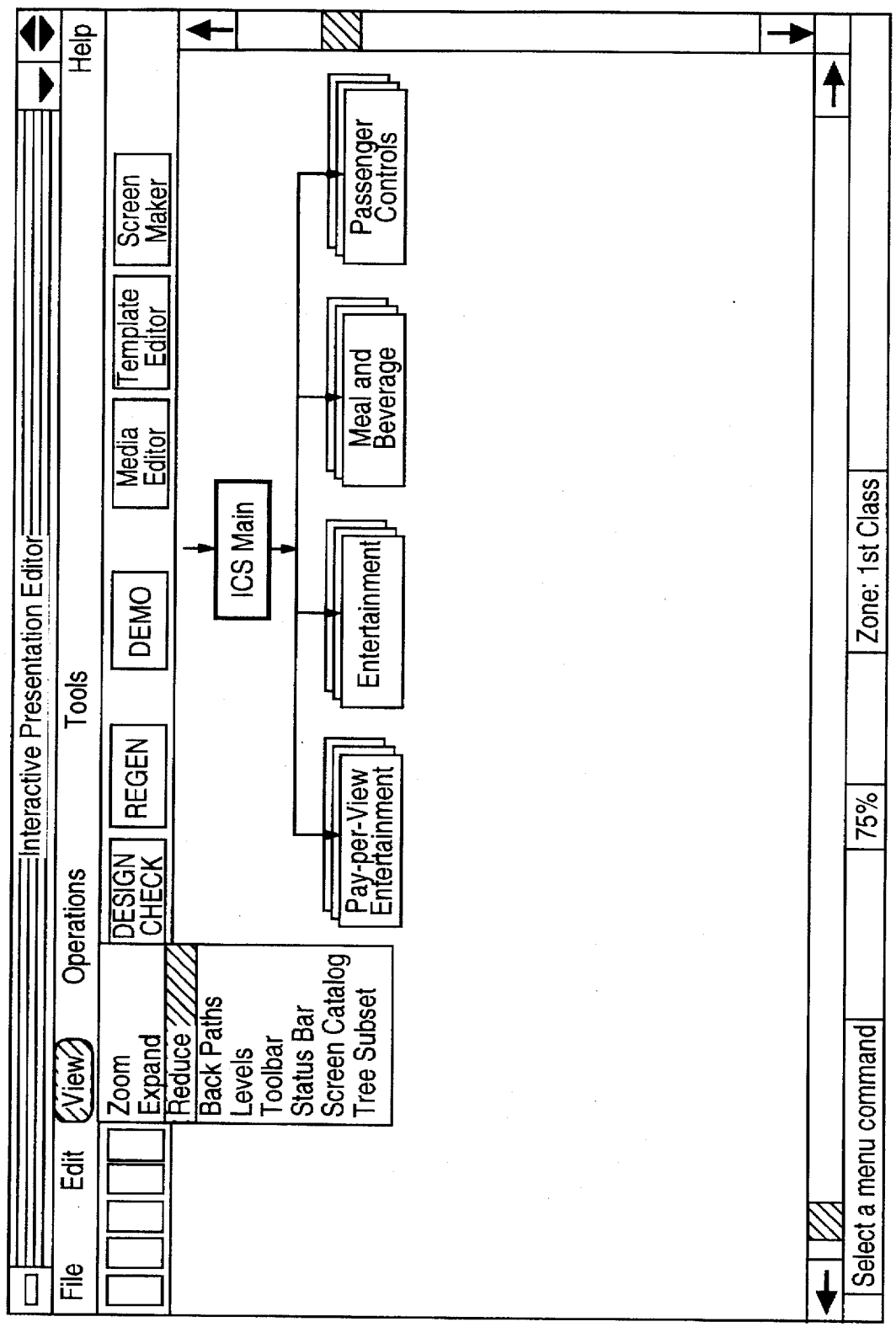

A reduce command, selectable from the view menu, allows a user to reduce a selected menu group or application group in the screen hierarchy. The reduce command allows a user to concentrate on a particular area of interest without viewing overall complexities in the entire screen hierarchical structure. FIGS. 8a–b illustrate the reduce command for an example screen hierarchy. For the example illustrated in FIG. 8a, a user selects a meal and beverage menu display screen. Upon selection of the meal and beverage display screen, a user selects the reduce command from the view menu. After the user selects the reduce command, the physical portion of the hierarchical screen display is reduced to the screen displays as shown in FIG. 8b.

A "back paths" function is selectable from the view menu as shown in FIG. 4c. In a preferred embodiment of the present invention, back paths are defined as routes, within the menu screen hierarchy, that a user may utilize to directly exit a particular screen menu selected. Because viewing back paths may confuse the overall screen hierarchical structure, the output display does not show the backpaths when operating in the default mode. In addition, the back paths are always shown in an attention color, such as red. The back paths function toggles the display of back links, associated with a menu display screen hierarchy, on and off.

A levels function, within the view menu, toggles the display of the depth ruler display "on" and "off". A check mark is displayed beside the levels function in the view menu when the depth ruler is displayed. A tool bar command, selectable within the view menu toggles the display of a tool bar display "on" and "off". A check mark appears beside the tool bar function on the view menu when the tool bar is displayed. A status bar command, selectable from the view menu, toggles the display of the status bar "on" and "off". A check mark is placed beside the "Status Bar" function when the status bar is displayed. A screen catalog function, selectable from the view menu, activates and deactivates a screen catalog window. The screen catalog window permits a user to scroll through a screen set for a particular application. A user may select a screen within the screen set display for insertion into the current screen hierarchical structure. The selection of a screen via the screen catalog window permits the interactive presentation editor to maximize the amount of information set automatically. A screen catalog configured in accordance with the present invention is described more fully below.

Figure 9A:
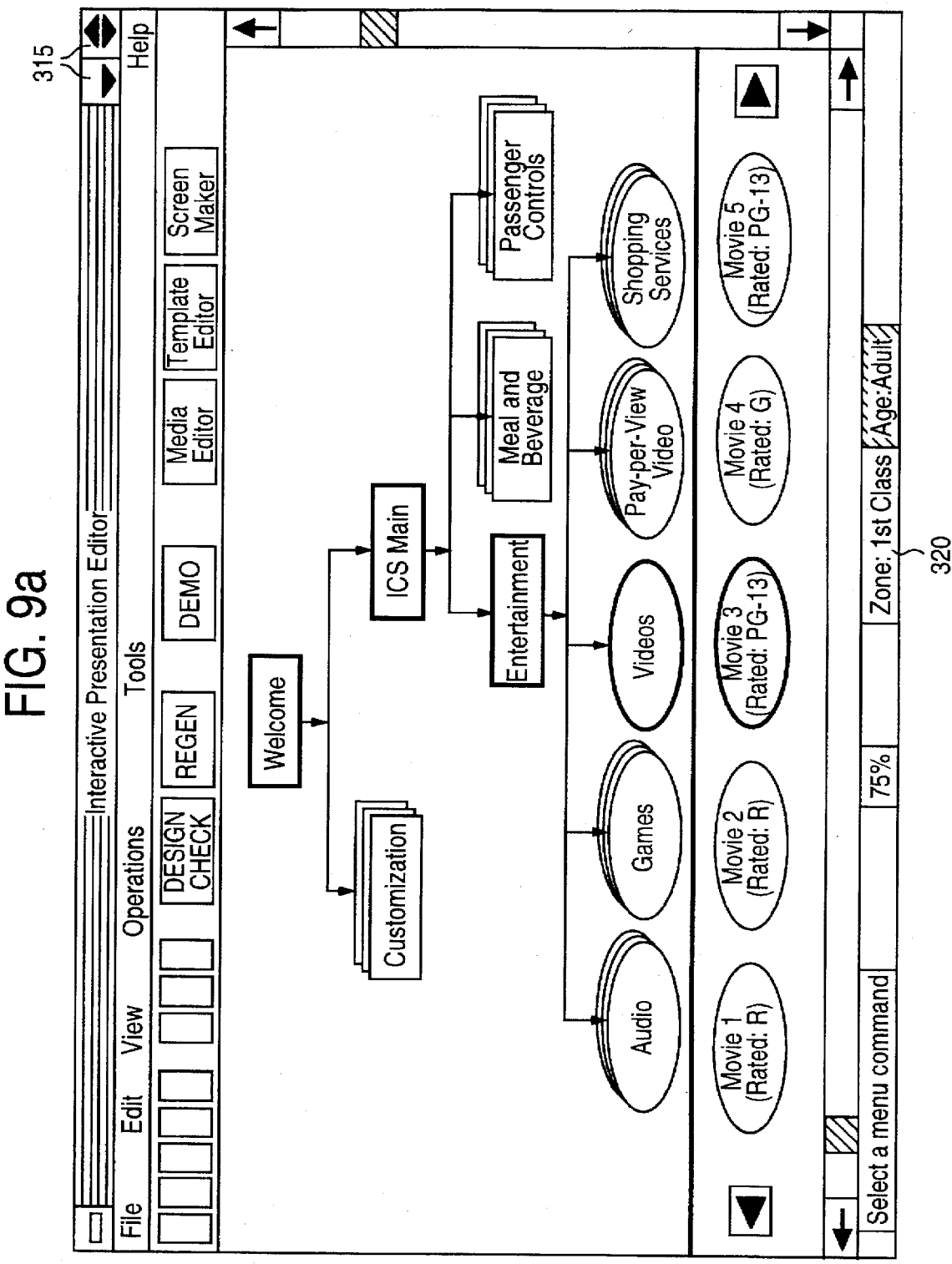
FIGS. 9a–b illustrate an example of the tree subset function configured in accordance with the present invention.
Figure 9B:
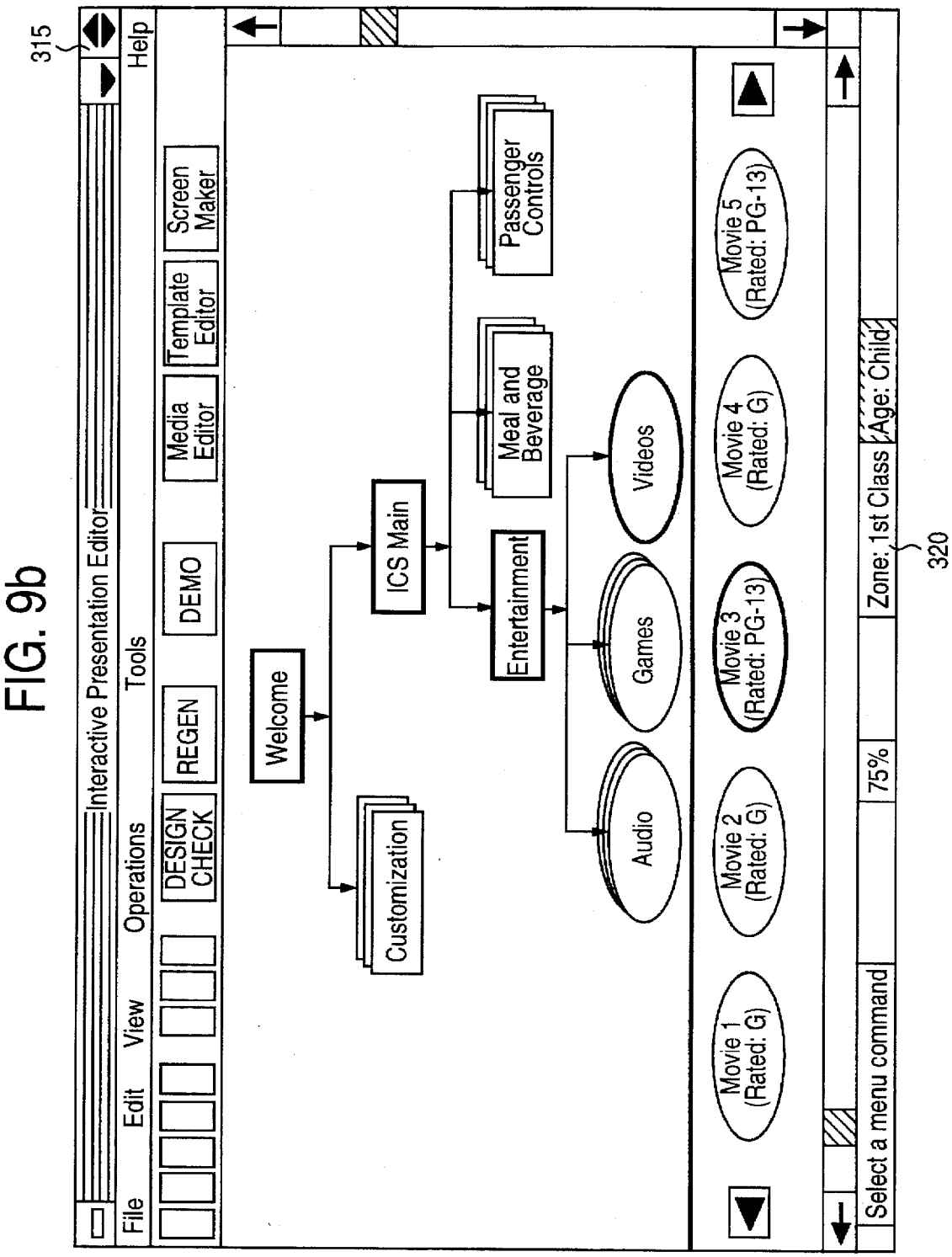

A tree subset function is also selectable from the view menu shown in FIG. 4c. The tree subset function permits restriction to menu screens based on classification information. The tree subset command permits a user to view a given sub-diagram of the overall menu screen hierarchical structure. The sub-diagram is generated by selecting one or more restriction options. The tree subset function allows a user to easily edit and check the menu screen hierarchy for each classification or category. FIGS. 9a–b illustrate an example of the tree subset function configured in accordance with the present invention. FIG. 9a illustrates an example of an adult category for a layout of a menu screen hierarchical structure. Note that the selected application screen (e.g. videos) shows a number of videos suitable for an adult. Also note that the status line 320 indicates that the menu screen structure corresponds to a first class adult passenger. Upon selection of a new tree type, via the tree subset command, the interactive presentation editor revises the menu hierarchy accordingly. FIG. 9b illustrates an example of a menu screen hierarchical structure for a first class child passenger. The entertainment options requiring money transactions and specific adult oriented movies were removed from the output display screen, thereby making these selections non-accessible to a child.

Figure 4D:
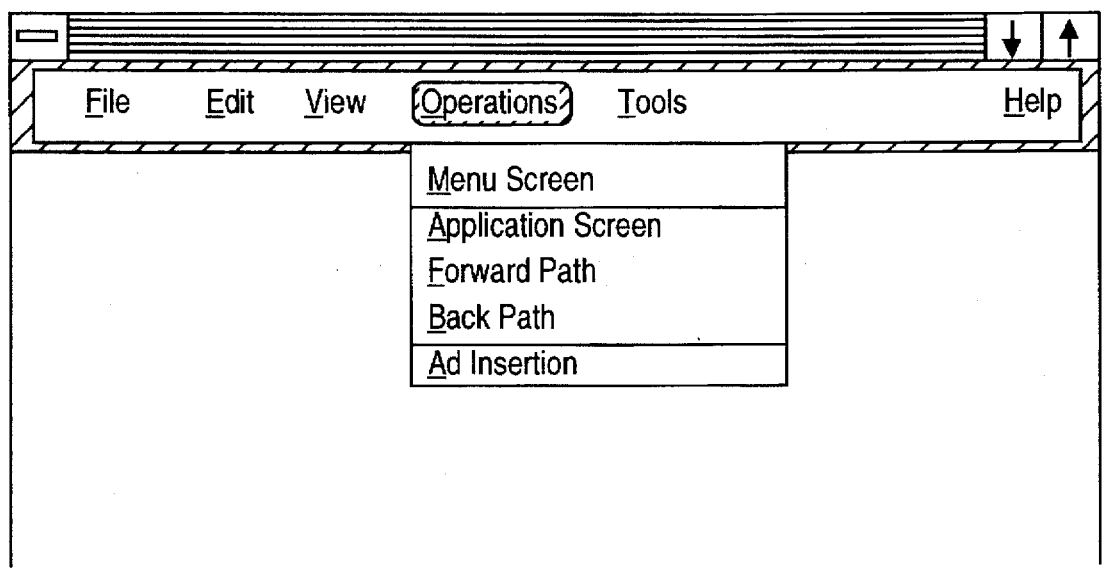
FIG. 4d illustrates an operations menu for the interactive media presentation editor configured in accordance with the present invention.

An operations menu for the interactive media presentation editor is shown in FIG. 4d. The operations menu provides a number of commands to allow the user to add a new menu screen, establish a link, and insert a display screen. As discussed above, a menu screen contains controls that permit a user to navigate through the particular interactive application environment. For example, menu screens are used to group related items together in the screen hierarchical structure. A menu screen command, selectable from the operations menu, is a drag and drop type command. Upon invoking the menu screen function and selecting a menu screen, the selected menu screen may be placed at any level within the screen hierarchical structure. After the selected menu screen is placed, the user, via a dialog box, may enter information pertaining to the selected menu screen. Moreover, information may be added by the user at a later time by double-clicking on the screen identifier for the particular menu screen with the cursor control device.

Figure 10:
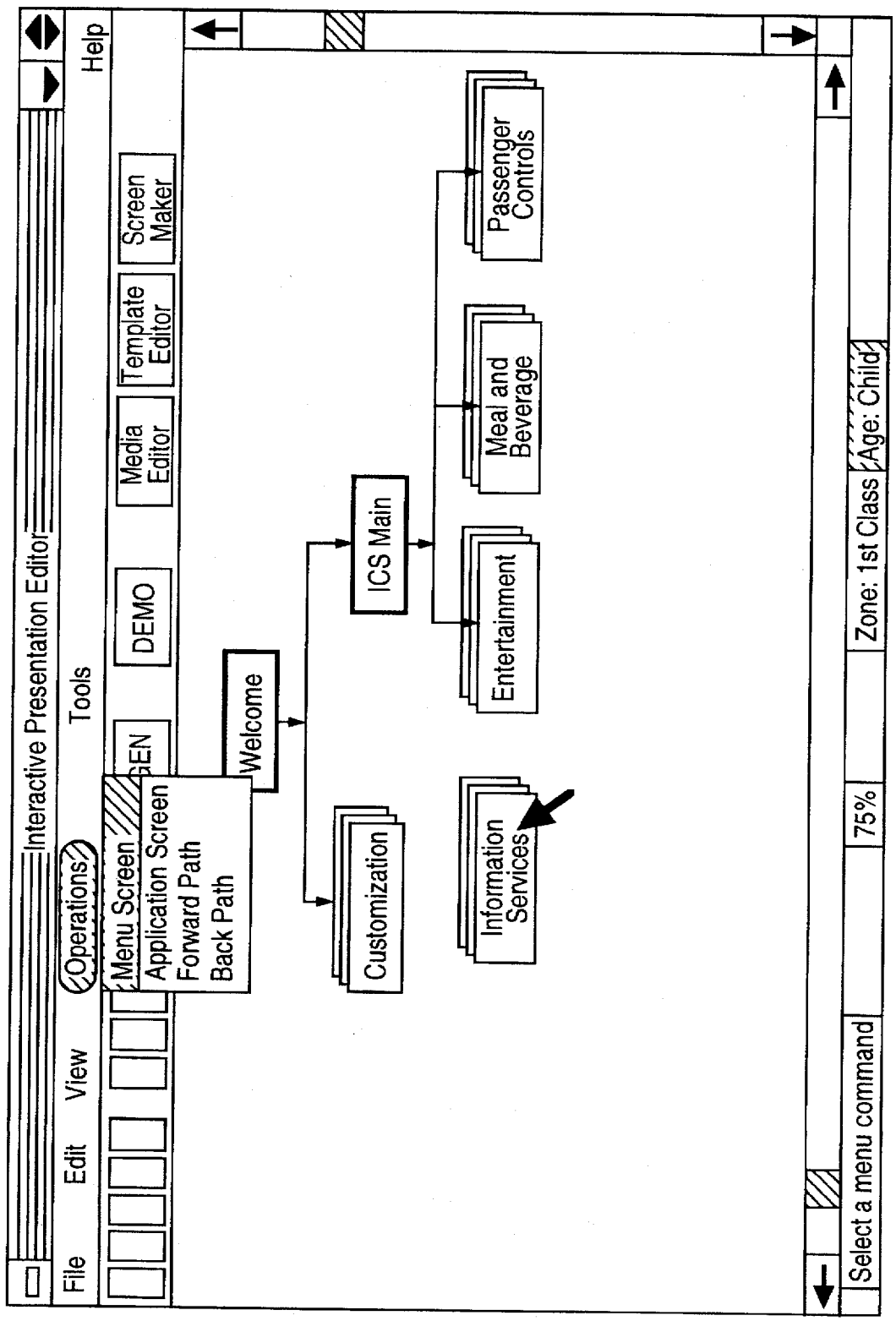
FIG. 10 illustrates an example of the functionality of the menu screen command.

If a menu screen is dropped within the parent menu screen (i.e. the placement of the new menu screen identifier overlaps a parent menu screen display), then a forward link is automatically established. If desired by the user, parent menu screen information may be entered at this time. FIG. 10 illustrates an example of the functionality of the menu screen command. For the example illustrated in FIG. 10, an information services menu screen is added. Note, because the new menu screen was not dropped onto an existing menu screen, the new menu screen is unattached. Because of this, a forward link is established at a later time.

An application screen command, selectable within the operations menu, is shown in FIG. 4d. The application screen command allows a user to add a new application screen to the screen hierarchical structure. As discussed above, an application screen is located at the final destination of a given menu path in an interactive applications environment. Application screens are commonly used in conjunction with other application screens. An application screen contains forward and backward control buttons, wherein the function of these buttons is predefined to enable the user to move through the group of application screens.

In a preferred embodiment, application screens, contained in a particular application screen group, exhibit a left to right ordering. The left to right ordering defines the movement through the application screens in a particular application screen group. For example, in the airline passenger entertainment application, a duty free shopping application group may contain many application screens for sale of different items. The application screen command is a drag and drop type command, whereby the application screen may be placed at any level within the screen hierarchical structure. After the application screen is placed within the screen hierarchical structure, the user may enter information pertaining to the application screen either now, or at a later time. A parent screen is automatically assigned to the selected application screen based on the application group. If the selected application screen was a first screen within a particular application group, a connection is established in the same manner as a menu screen.

Figure 11A:
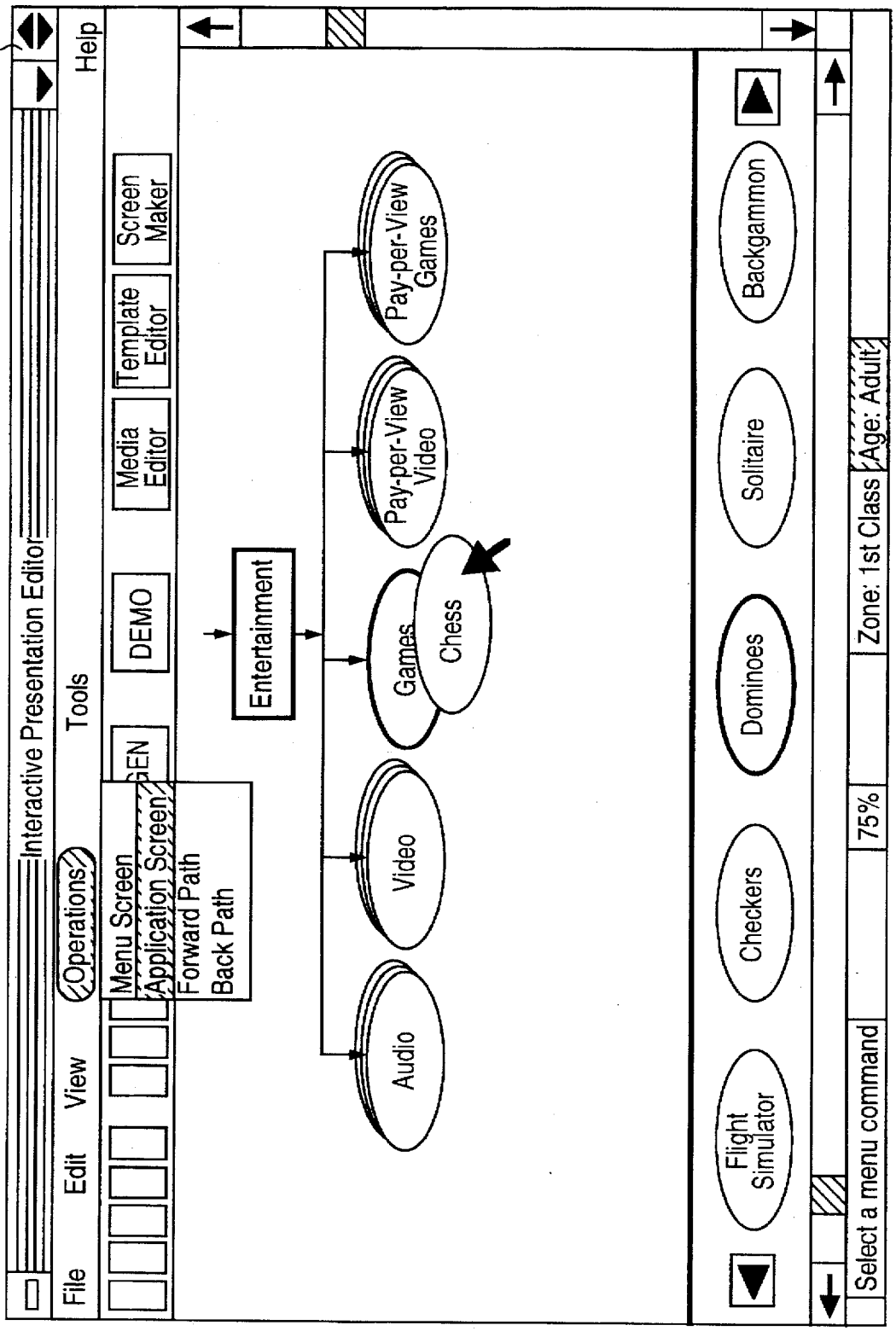
FIGS. 11a–11b illustrate the operation of adding an application screen to a screen hierarchical structure in accordance with the present invention.
Figure 11B:
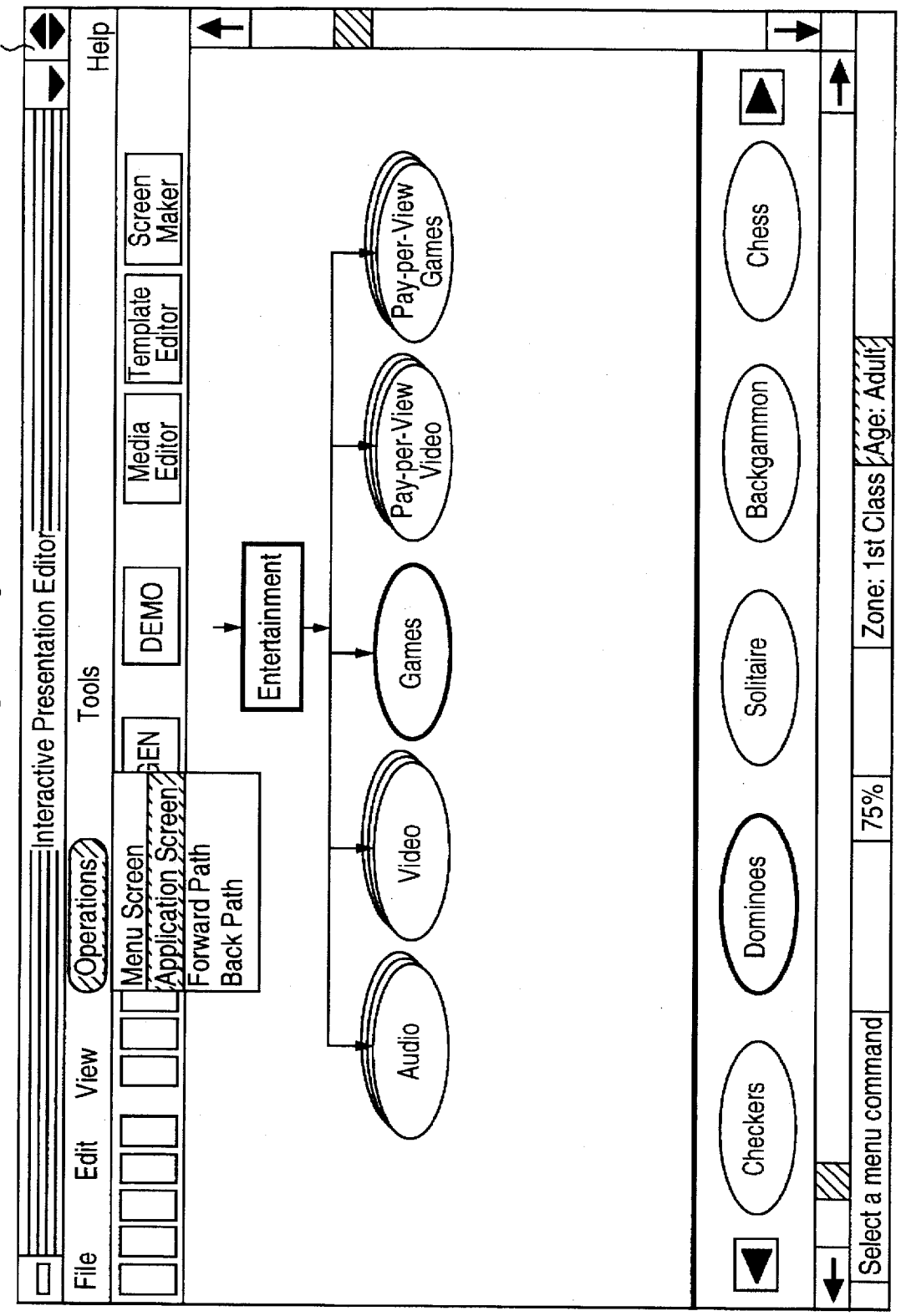

FIGS. 11a–11b illustrate the operation of adding an application screen to a screen hierarchical structure in accordance with the present invention. For the example shown in FIG. 11a, a chess application screen is selected, via the application screen command, and the corresponding screen identifier is attached to the cursor so that the user may place the application screen in an application group. For the example, the chess application screen is placed within the games application group. FIG. 11b shows the output display after the chess application screen is added to the games application group. Note that the chess application screen appears at the far right of the application group, and the interactive presentation editor program automatically scrolls all other application screens to the left.

Figure 12A:
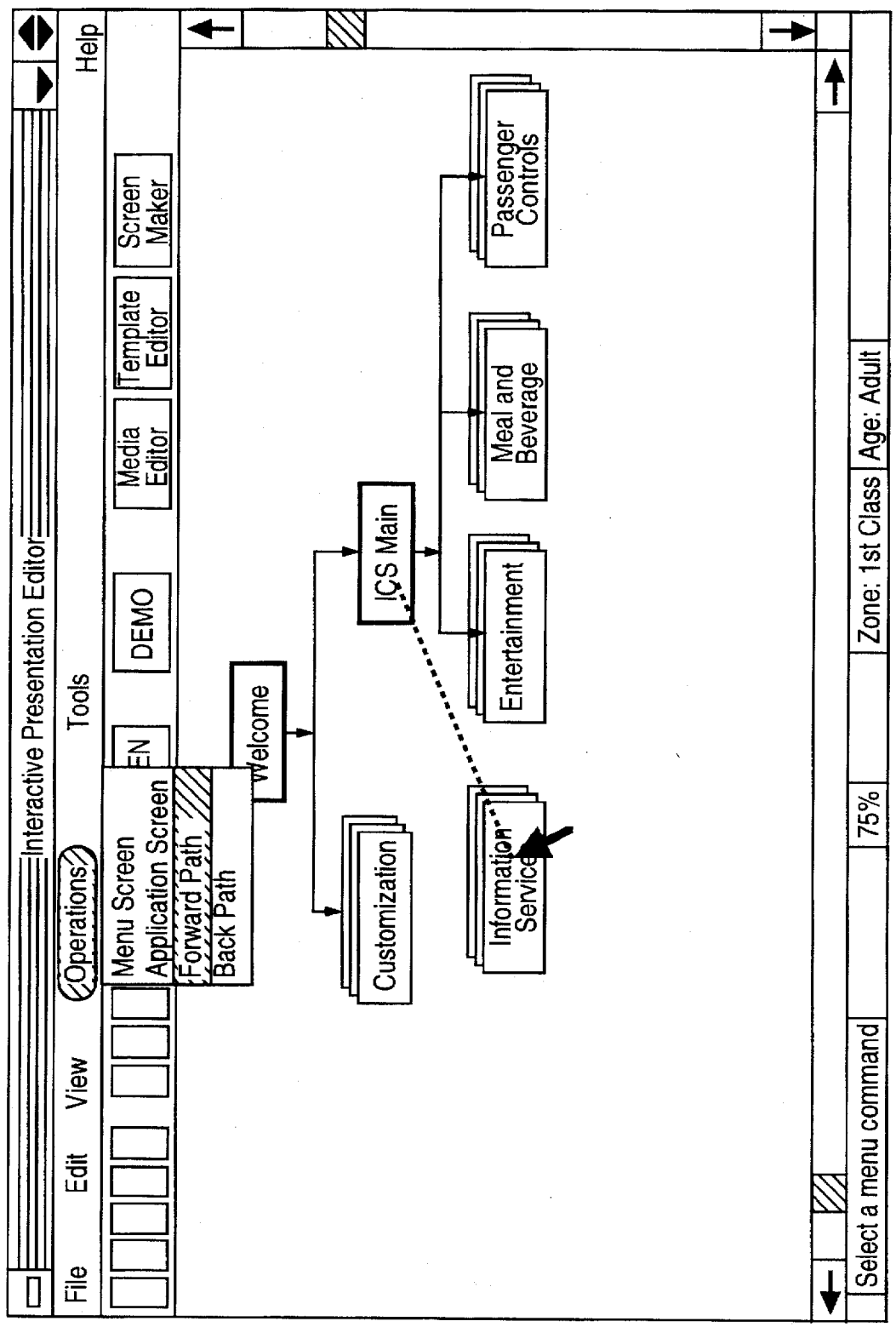
FIG. 12a illustrates the creation of a forward link via the forward path command for an example screen hierarchical structure.
Figure 12B:
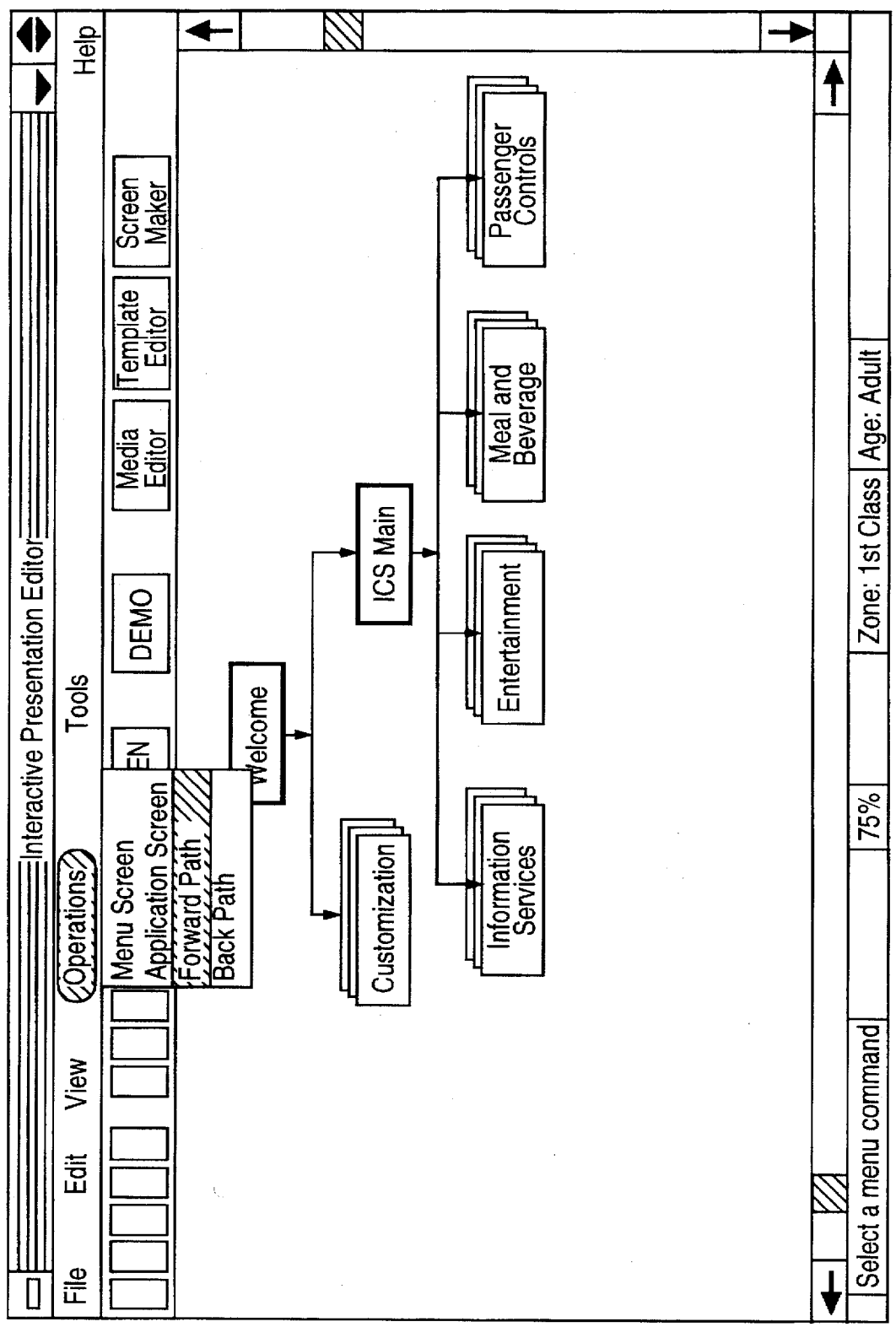
FIG. 12b illustrates the menu hierarchical structure after creation of the forward link between the ICS main menu screen and the information services menu screen.

A forward path command, selectable from the operations menu, is shown in FIG. 4d. The forward path command establishes a link from a control in a menu screen at a "n" level to a menu or application screen at a "n+1" level. Although the forward path command connects application and menu screens to controls, the standard drag and drop procedure is the preferred procedure for making a forward path link. FIG. 12a illustrates the creation of a forward link via the forward path command for an example screen hierarchical structure. For the example screen hierarchical structure, a forward link is created between an information services menu screen and an ICS main menu screen. The forward link is established by selecting the two associated menu screens with the cursor control device. In response to selecting the forward path command, a mock screen template of the parent menu is graphically created allowing the user to pick the control from the screen template. The selection of the control on the parent menu screen establishes the link to access the child menu screen. FIG. 12b illustrates the menu hierarchical structure after creation of the forward link between the ICS main menu screen and the information services menu screen.

For a typical application, when a child screen is exited, the program returns control to a parent screen. The return of control to a parent screen from a child screen is the default mode of operation in setting up an interactive applications environment with the interactive applications generator. However, in some cases, it is desirable to jump back several levels to exit a particular child screen. Therefore, the present invention provides a back path command selectable from the operations menu that allows a child screen to exit to a screen other than the parent screen. The back path command establishes a back link as an override to the default mode of operation. To establish a back link, source and destination screens are selected by the cursor control device.

Figure 13A:
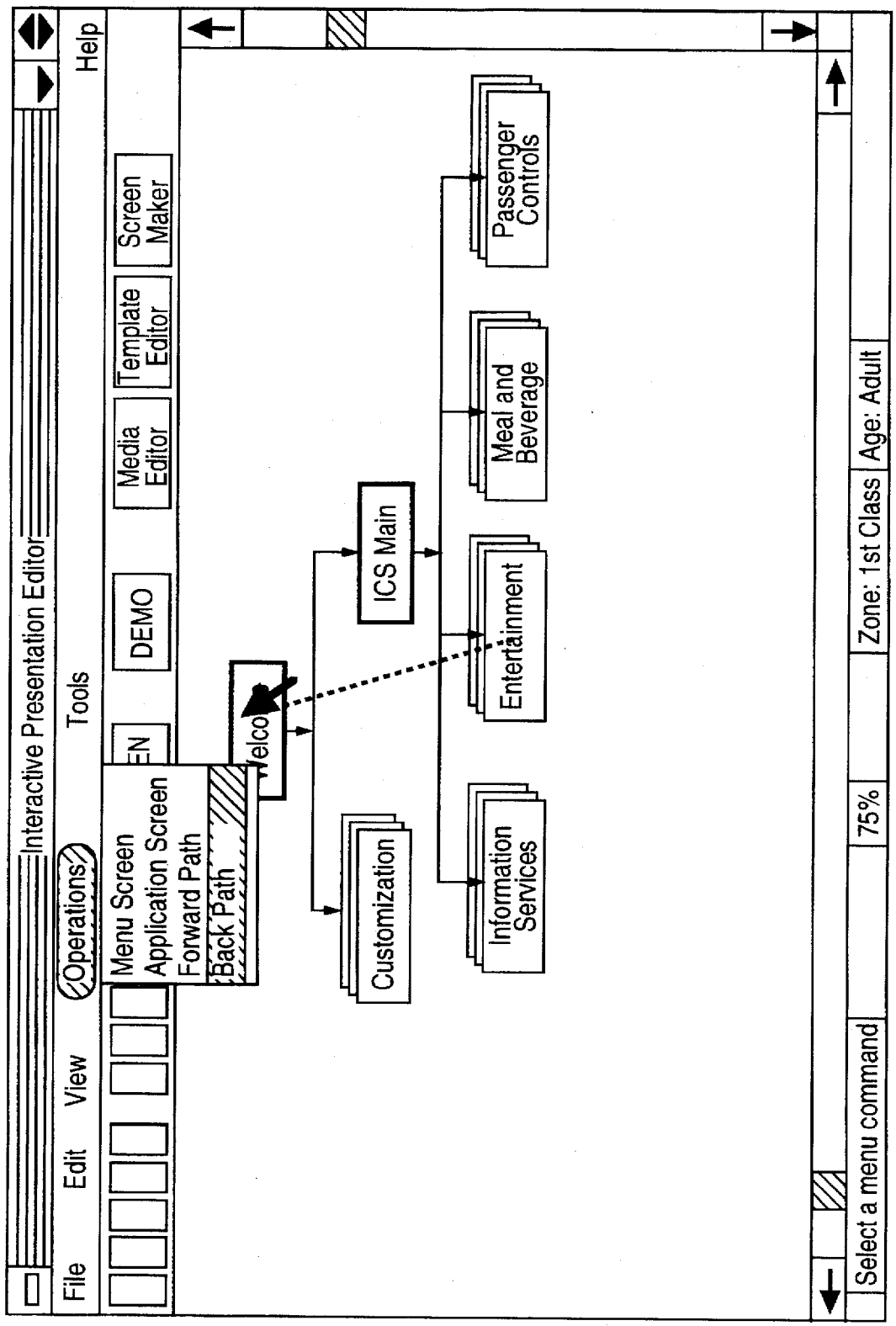
FIGS. 13a–b illustrate an example of a screen hierarchy structure for the operation of the back path command.
Figure 13B:
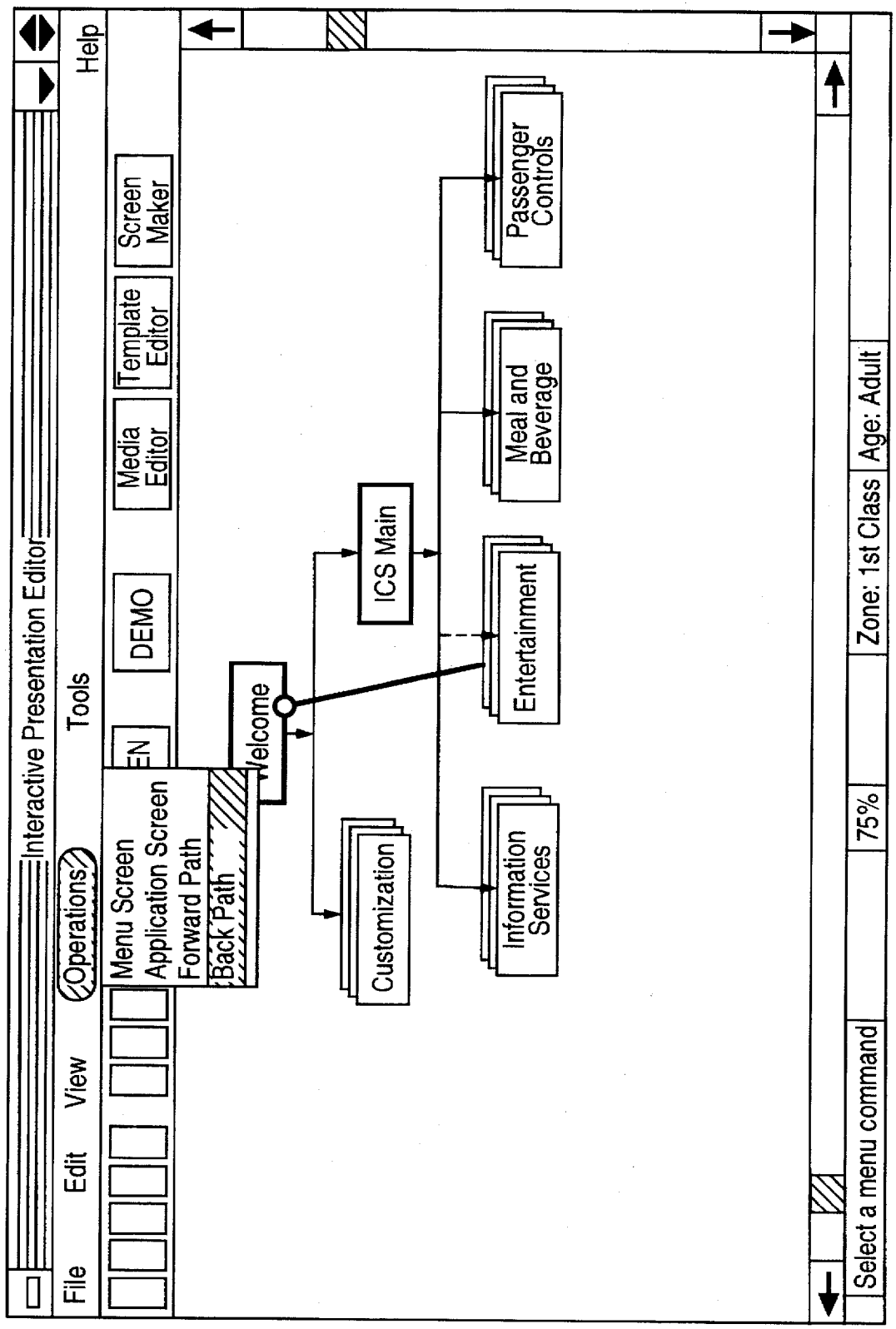

FIG. 13a illustrates an example of a screen hierarchy structure for the operation of the back path command. For the example shown in FIG. 13a, an entertainment menu screen and a welcome menu screen are the source and destination screens, respectively, for the back path command. The operation of the back path command to create a back path is analogous to the operation of the forward path command explained above. Once a back link has been established, and if a forward link exists, the forward link is changed from a solid line to a dashed line as shown in FIG. 13b. The dashed line represents the one way nature of the forward link. In addition, the back link path is only shown when a view/back path option is selected.

An advertisement (ad) insertion command, selectable from the operations menu, permits the user to insert an advertisement before a particular screen is displayed. The advertisement begins each time the associated screen is selected. Upon completion of the advertisement, the associated screen is displayed. For example, for the airline passenger entertainment system, an "In-flight games are brought to you by XYZ Enterprises," advertisement may be displayed before entering into a games menu screen. When a path to a screen contains an associated advertisement, the screen icon is displayed with a "$" icon.

Figure 4E:
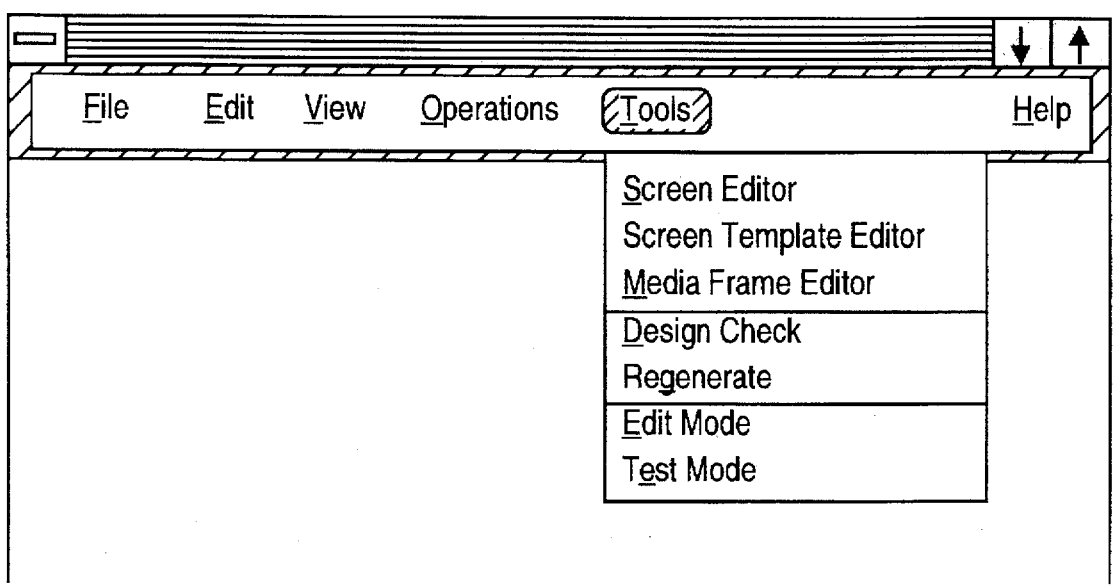
FIG. 4e illustrates a tools menu for the interactive presentation editor program configured in accordance with the present invention.

FIG. 4e illustrates a tools menu for the interactive presentation editor program configured in accordance with the present invention. A screen editor command is shown selectable from the tools menu. The screen editor command permits a user to access the screen editor program. For example, a user may wish to create/edit an actual menu screen or application screen when working within the screen hierarchy structure. Although the screen editor is typically run separately, providing access to the user during operation of the interactive presentation editor program is desirable to provide greater flexibility in the design process. Also shown selectable from the tools menu is a screen template editor command. The screen template editor command provides access to the screen template editor program. The screen template editor command allows the user to create/edit the actual screen templates while working within the screen hierarchy. A menu frame editor command is also selectable from the tools menu. Similarly, the media frame editor allows a user to access the media frame editor program while operating within the interactive presentation editor program. A user may wish to create/edit the actual media frames while working within the screen hierarchy.

A design check command, selectable from the tools menu, invokes the design check program. The design check program is used to perform a variety of information and error checks within the current screen hierarchy. The design check program identifies potential problems including identifying missing information and circular menu screen paths. For example, the design check program identifies menu screens that are not attached to a specific control in a corresponding parent screen. The design check program also identifies controls in a menu screen that do not have a corresponding application or menu screen attached. Furthermore, the design check program identifies screens that have not been linked to a parent screen. Finally, the design check program identifies screens situated in endless loops, such that a screen does not have a forward and backward link from another screen within the screen hierarchy. The design rules used by this design check program can be flexibly configured via a dialog box.

FIG. 14 illustrates an example of a screen hierarchical structure during the design check process. When an error is detected by the design check program, a display box, such as display box 1700, is displayed. The display box 1700 identifies any errors detected. In addition, the display box permits a user to fix, continue or cancel the design check program. For the design check program, a screen identifier icon is highlighted to identify the screen where the error was detected. For the example shown in FIG. 14, the entertainment menu screen does not have controls attached, and therefore is highlighted.

Figure 15A:
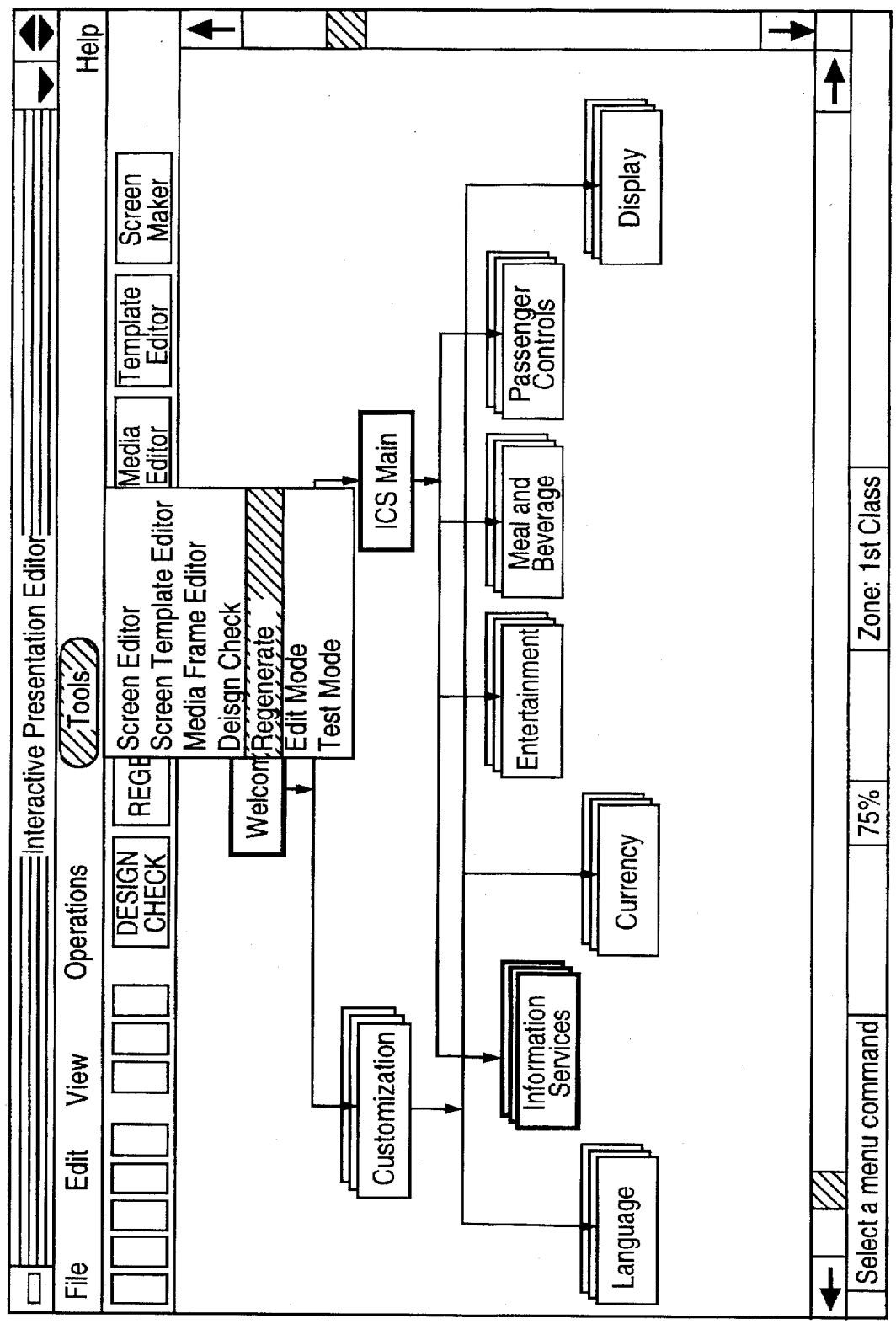
FIGS. 15a–b illustrate an example screen hierarchy structure for the operation of the regeneration command.
Figure 15B:
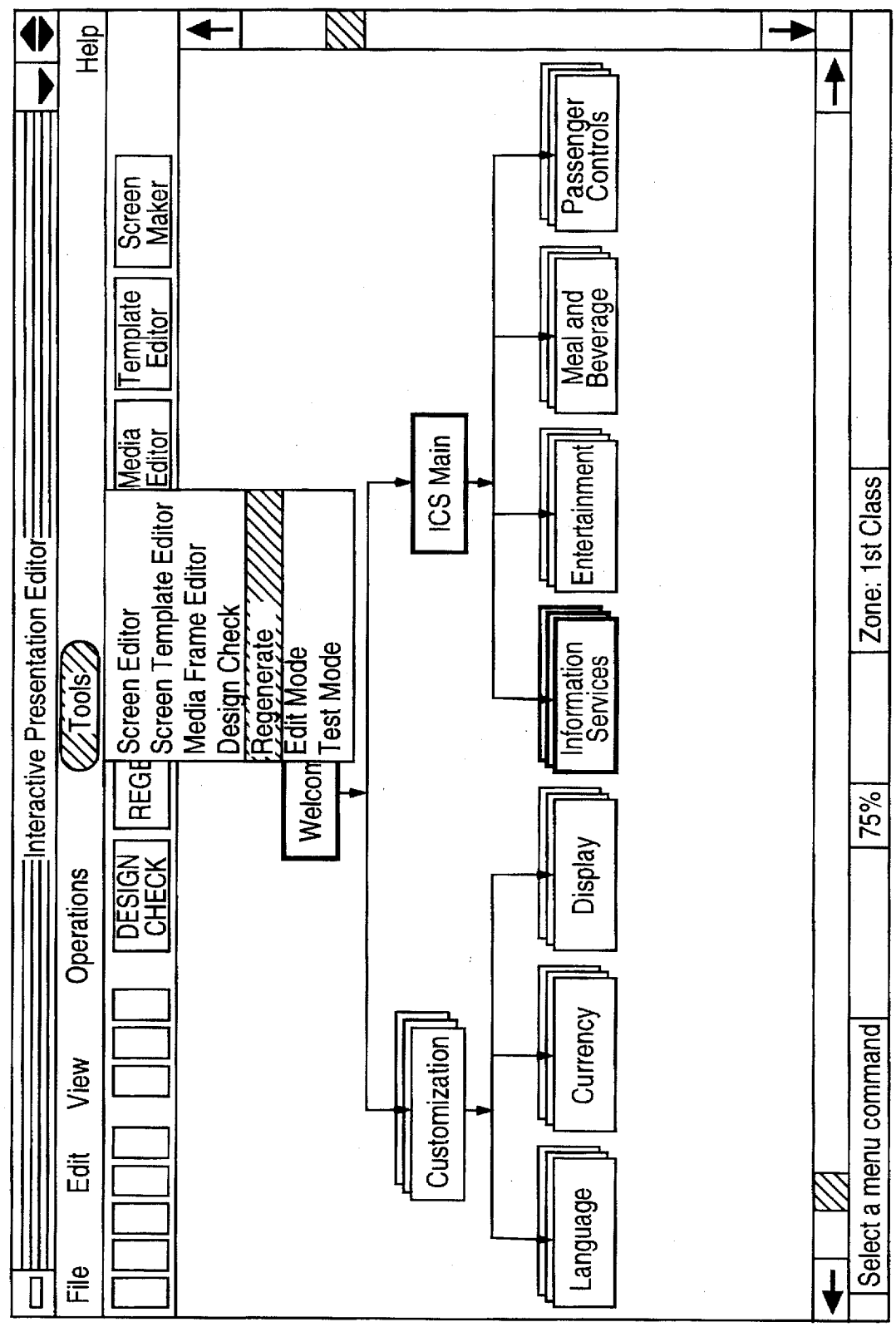

FIG. 4e illustrates a regenerate command selectable from the tools menu. The regenerate command regenerates the screen hierarchy after edits occur. For example, after editing and moving the screen identifier icons, the resulting screen hierarchy may be displayed having links that are crisscrossed. Upon invocation of the regenerate command, a new graphical representation in a top-to-bottom, left-to-right ordering is displayed. FIG. 15a illustrates an example screen hierarchy after editing, but prior to execution of the regeneration command. Note that the Information Services menu screen and the display menu screen are displayed within menu screens having a different parent menu screen. FIG. 15b shows display of an example screen hierarchy after execution of the regeneration command. The screen hierarchy displayed in FIG. 15b more clearly shows the hierarchical structure.

An edit mode command is shown selectable from the tools menu in FIG. 4e. The edit mode command sets the mode of operation for the interactive presentation editor program. The edit mode is the normal mode of operation for the program, and permits the user to edit the current design. The edit mode is used to return from the test mode. When the interactive presentation editor operates in the edit mode, a check mark resides beside the edit mode command on the tools menu. Also shown on the tools menu in FIG. 4e is a test mode command. The test mode command switches the mode of operation from the edit mode to the test or demonstration modes. A check mark resides beside the test mode command on the tools menu when the interactive presentation program is in the test mode.

Figure 4F:
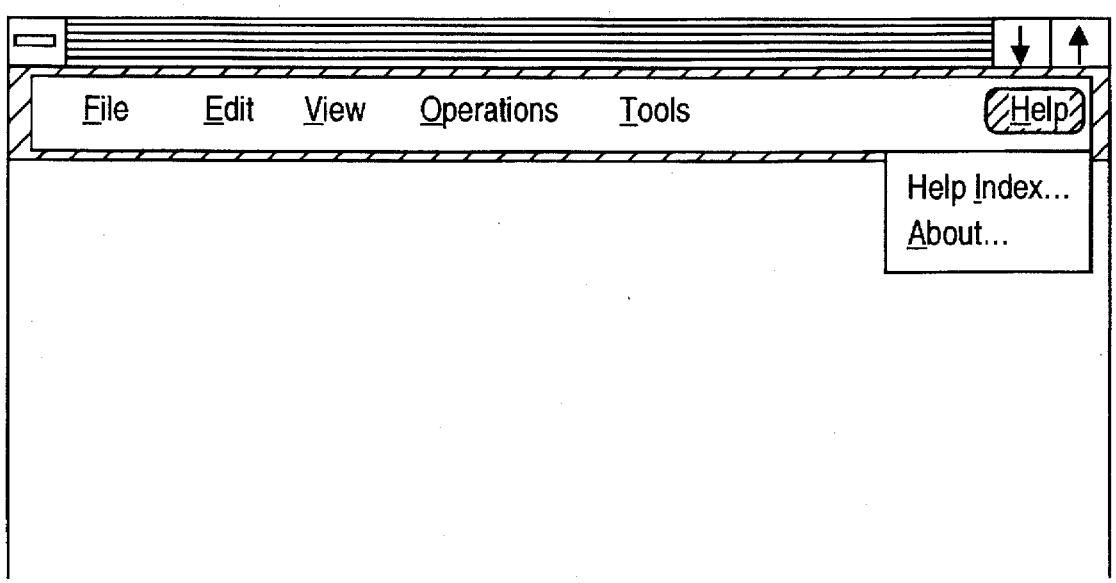
FIG. 4f illustrates a help menu for the interactive presentation editor program configured in accordance with the present invention.

FIG. 4f illustrates a help menu for the interactive presentation editor program configured in accordance with the present invention. The help menu displays a "Help Index . . . " and "About" commands. The Help Index command is a standard windows help index type function. Generally, the help index command permits a user to select from a category index to obtain help information for operation of the interactive presentation editor program. The about command is also a standard windows type about box utilized for windows programs. The about box, when selected, displays title, copyright, and version information pertaining to the interactive presentation editor.

The screen editor program of the present invention provides capabilities to create screens utilized in the interactive applications environment. A screen contains two parts: a reference to a generic screen template, and a set of information specific to the screen (actual controls and media frames) that customizes the screen template for a unique interactive applications environment. To generate a screen with the screen editor program, a screen is first associated with a screen template. A window on the output display displays a graphical representation of the screen template. To generate media frames, information is supplied by choosing from a media frame catalog, or by typing an identification code to specify media data. For controls associated with a screen, an operator supplies the text to define all buttons and controls. For controls accessing one of the pre-defined libraries, an operator assigns functionality to the control by choosing from the function library catalog. Controls activating a new screen are automatically assigned by the one to one correspondence between the ordering of the template and the structure within the interactive presentation editor.

Each control or media frame area located on a particular screen template is selectable by the cursor control device. To select a control or media frame, the user double-clicks on the area with the cursor control device, and an information box is subsequently displayed by the screen editor program. For a control, the information box displays the control text and any attached functionality. For a media frame, the information box displays an associated identification. Although the preferred manner of entering information is through the drag and drop interface, information may be entered in the information box directly by the user. However, for the associated text relating to a particular control, the information box is the only means to enter data. In addition, information is supplied in a read only type fashion for defined controls in media frames. The defined controls are preset within the template definition (e.g. an abort function). Defined media frames are preset within the template definition, normally for common text captions. The ability to graphically select controls and or media frames on the screen template provides an easy user interface to enter the screen specific information. As screen specific information is entered, the screen template is transformed so that the user can evaluate the output display screen. The screen definition maintains a reference to the screen template. Therefore, when a screen template changes (e.g. a new logo is desired), then, by definition, all screens using that particular screen template as a reference are automatically updated.

Figure 16:
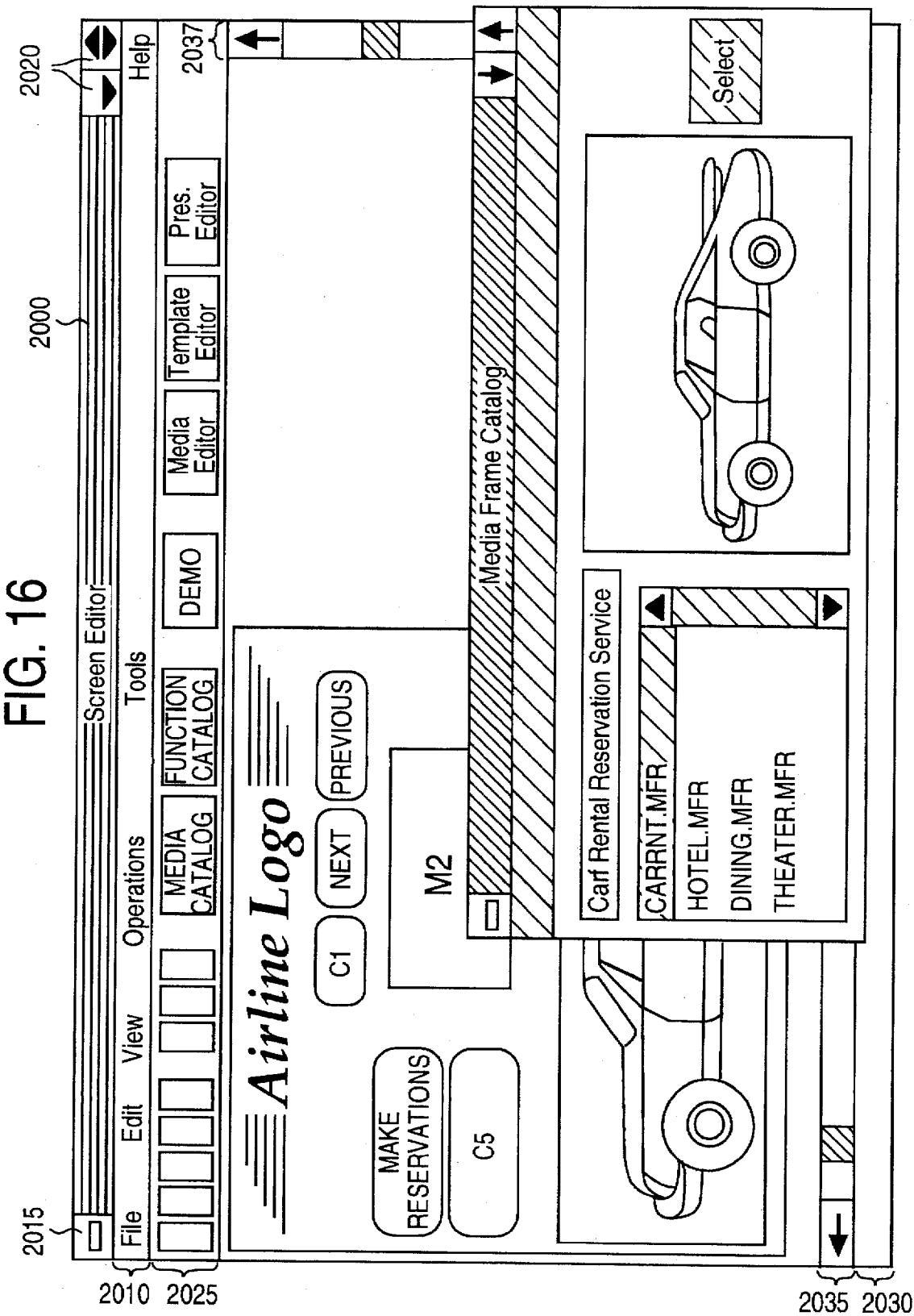
FIG. 16 illustrates a GUI for the screen editor configured in accordance with the present invention.

FIG. 16 illustrates a GUI for the screen editor configured in accordance with the present invention. In a preferred embodiment, the screen editor program is implemented to operate in conjunction with a windows operating system. The screen editor program contains features such as a title bar 2000, a menu bar 2010, a system menu button 2015, and windows minimum/minimum buttons 2020. In addition, other Microsoft™ Window features are provided such as a tool bar 2025, a status bar 2030 and scroll bars 2035 and 2037. The operation of the title bar, menu bar, system menu button, tool bar, status bar, and scroll bars are described above in conjunction with the interactive presentation editor.

Figure 17A:
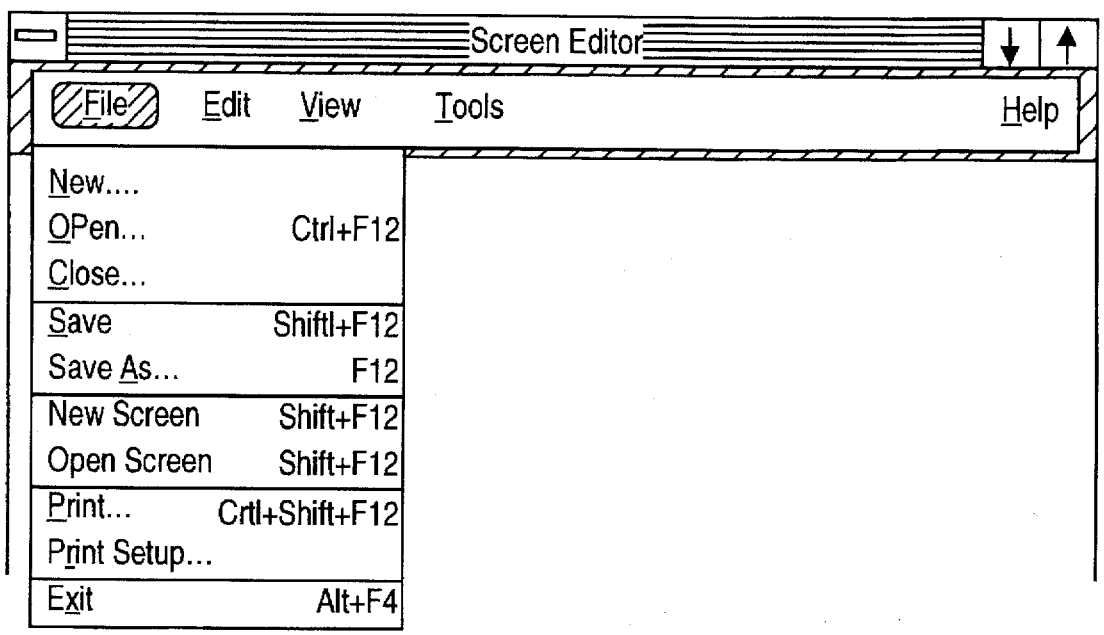
FIG. 17a illustrates a file menu for the screen editor configured in accordance with the present invention.

FIG. 17a illustrates a file menu for the screen editor configured in accordance with the present invention. The file menu for the screen editor contains a number of commands to manipulate files within the screen editor program. A "new" command, selectable from the file menu, creates a new screen project file. If a project file is currently opened, the user is prompt to save any changes before An "open" project file is created. An "open" command permits a user to open a new or an existing screen project file. To open a new or existing project file, a windows common dialog box is invoked. The screen project files contain the file extension ".SCR". During the file load selection, only files containing the file extension .SCR are displayed for selection.

A "close" command closes the currently active screen project file. The user is prompted to save changes if edits were made subsequent to the last save operation. A "save" command saves the active screen file to a permanent storage device. A windows common dialog box is invoked in order to save the screen project file. If no name is assigned to the currently open screen project file, then the user is prompted with a "save as" command. The "save as" command, also selectable from the file menu, saves the active project file under a new name. A windows common dialog box is invoked in order to save the active screen project file. A file extension of .SCR is automatically appended to the name given by the user. The "Save As" command contains an option in the file save dialog box to automatically save the edits in all active child windows. Otherwise, the user is prompted to save changes for each open child window.

A "New Screen" command opens a child window in order to create a new screen for addition to the screen project file. To open a new screen, the user supplies a valid screen template name to associate a screen template for the new screen. When the child window is closed, the user cancels the edits or adds the screen to the "update list" used during save operations. The "Open screen" command opens a child window in order to edit an existing screen within the screen set for the project file. A dialog box is invoked in order to search the screen set for a particular screen. When opening a new screen, the operator cancels the edits or adds the screen to the update list. A "Print" command permits a user to print the active screen. A windows common dialog box is invoked to print the screen. A "Print Setup" command also invokes a windows common dialog box in order set up the printer environment. In addition, an "Exit" command permits the user to exit the screen editor program. If any updates are made to screens currently active, the user is prompted to save changes before exiting.

Figure 17B:
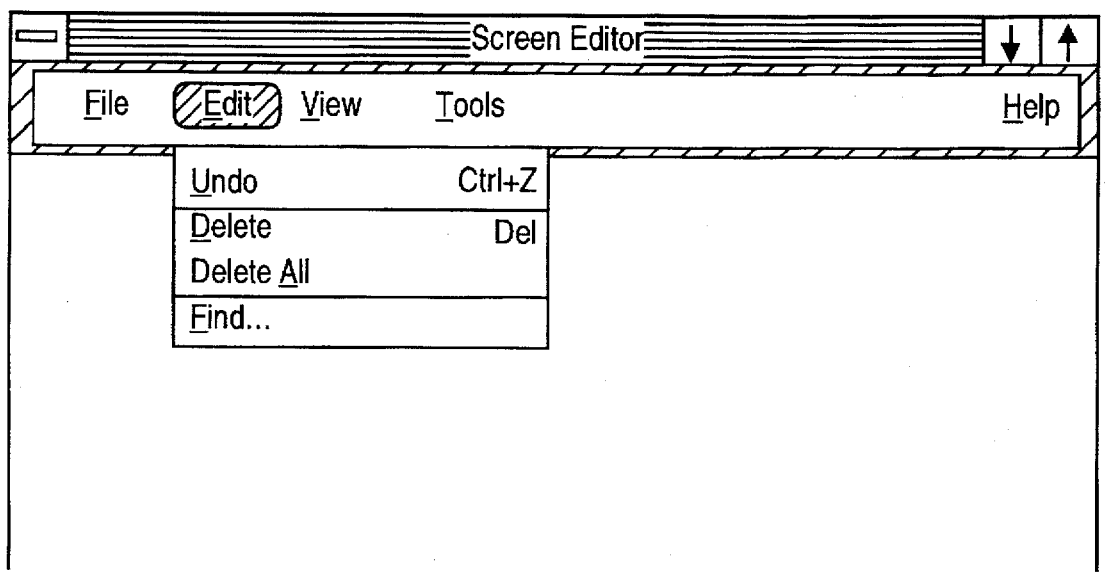
FIG. 17b illustrates an edit menu for the screen editor program configured in accordance with the present invention.

FIG. 17b illustrates an edit menu for the screen editor program configured in accordance with the present invention. The edit menu contains a number of commands to manipulate screen sets in the screen editor program. An "Undo" command allows the user to undo the last "n" edit operations. The number of reversible operations is a user defined option that is set in the configuration program. In the screen editor program, an "Undo" operation results in negating information supplied for the control areas and media frames. A "Delete" command allows the user to erase the associated information for a control or media frame from the database. A "Delete All" command, when selected, invokes a dialog box to allow the user to delete all associated information for a particular set of controls, media frames, or any combination thereof. The delete all command is useful for creating a new screen with the current screen template, without having to remember the screen template name. The "find" command permits a user to locate information associated with a control or media frame. For example, a user may search based on the name of a media frame or the text associated with a particular control on the screen.

Figure 17C:
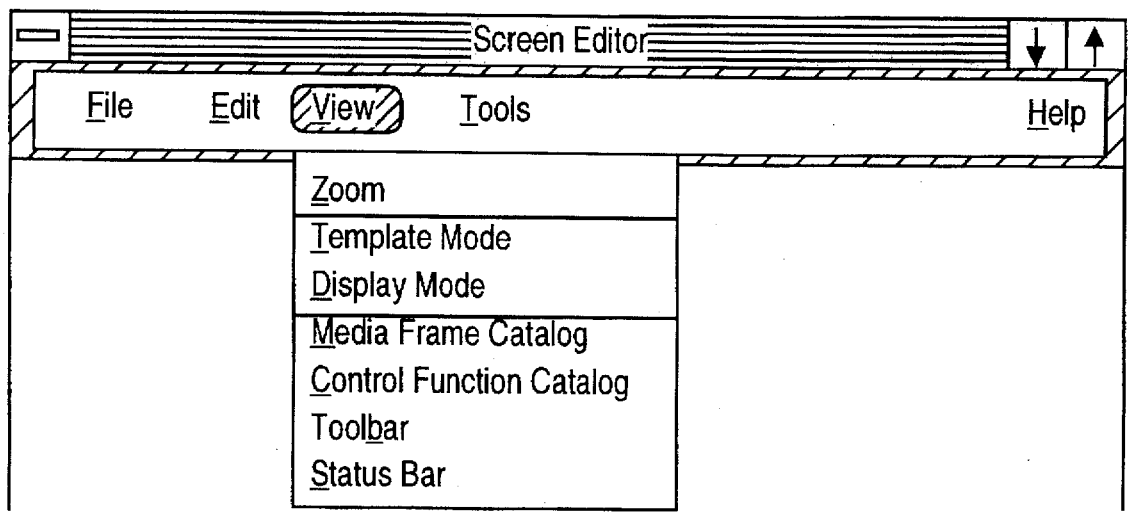
FIG. 17c illustrates a view menu for the screen editor program configured in accordance with the present invention.

FIG. 17c illustrates a view menu for the screen editor program configured in accordance with the present invention. In general, the view menu permits the user to select a number of commands relating to the display of information associated with the screen editor program. A "zoom" command allows the user to set the area of display on the output display device. The user may either apply a zoom scale factor or select a window portion of the output display device. If the user selects a window portion of the current display, the selected window area is scaled to fit the window display area. A "template mode" command permits a user to place the screen editor program in the template mode so that only the view of the screen template is shown. The template mode does not display screens with the external media frame files thereby allowing quick edits.

A "display mode" command places the screen editor program in a display mode. The display mode permits a user to update a view of the screen as information is supplied. For example, when a media frame is assigned to an area on the screen template, the actual media frame image is displayed on the selected area. The display mode is the default mode because it ensures to the operator that the correct data is being supplied to the display screen. A "media frame" catalog command toggles a media frame catalog "on" and "off" the display screen. A check mark located beside the media frame catalog command on the view menu indicates the media frame catalog is displayed. In general, the media frame catalog is a separate window that permits a user to scroll through a list of media frames. The media frame catalog assists a user by selecting a specific media frame, and by placing the selected media frame on an area of the screen layout.

Figure 18:
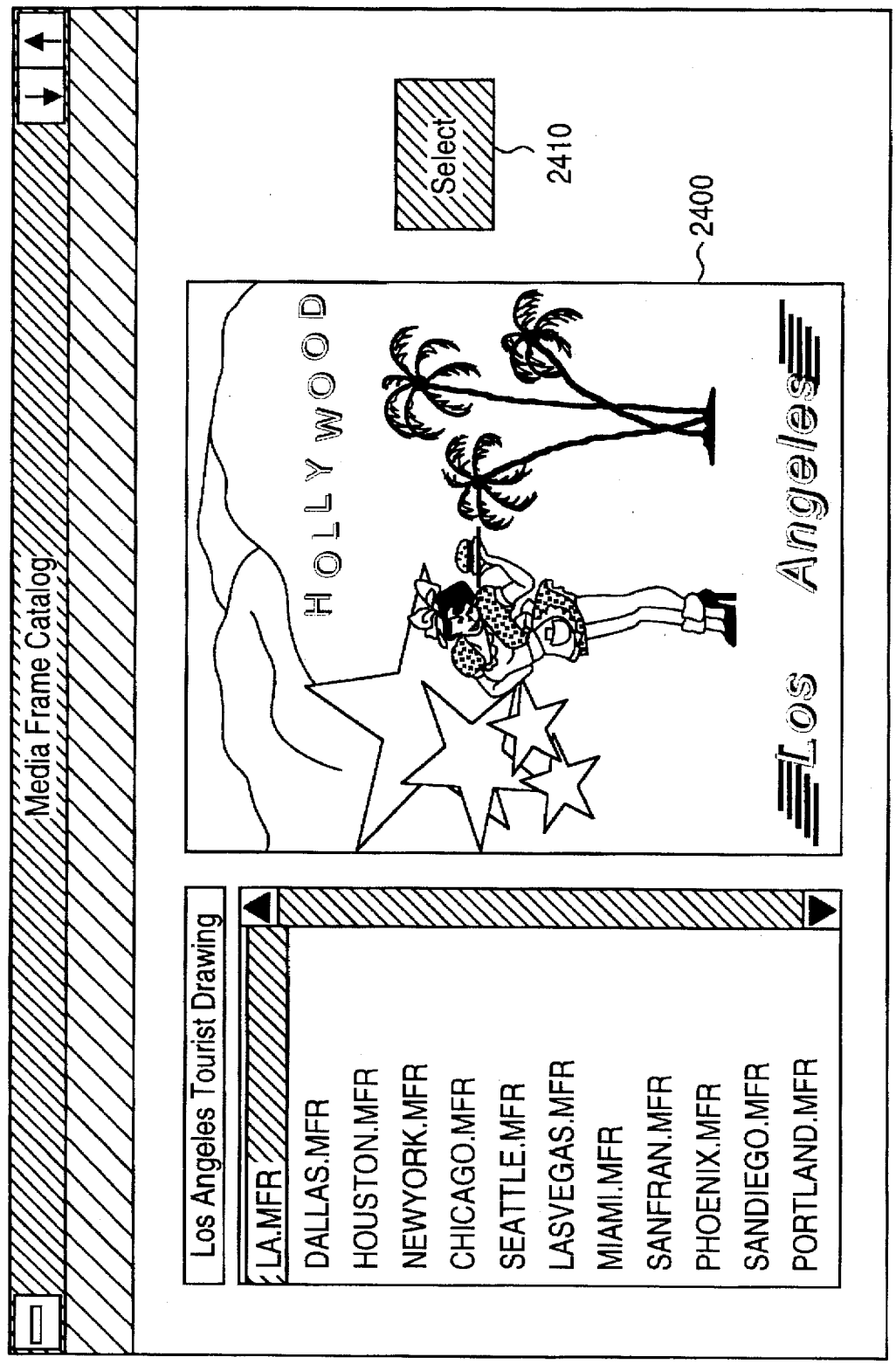
FIG. 18 illustrates an example of a media frame catalog window configured in accordance with the present invention.

FIG. 18 illustrates an example of a media frame catalog window configured in accordance with the present invention. The graphics display portion 2400 of the media frame is displayed along with a descriptive name. For the example shown in FIG. 18, the media frame is associated with the text description "Los Angeles Tourist drawing". In addition, the media frame file "LA.MFR" identifies the file containing the media frame. A select button 2410 is shown on the media frame catalog window. The select button 2410 is utilized to drag a selected media frame icon over a media frame area on the screen layout to create the association between the area and the particular media frame selected.

Figure 19:
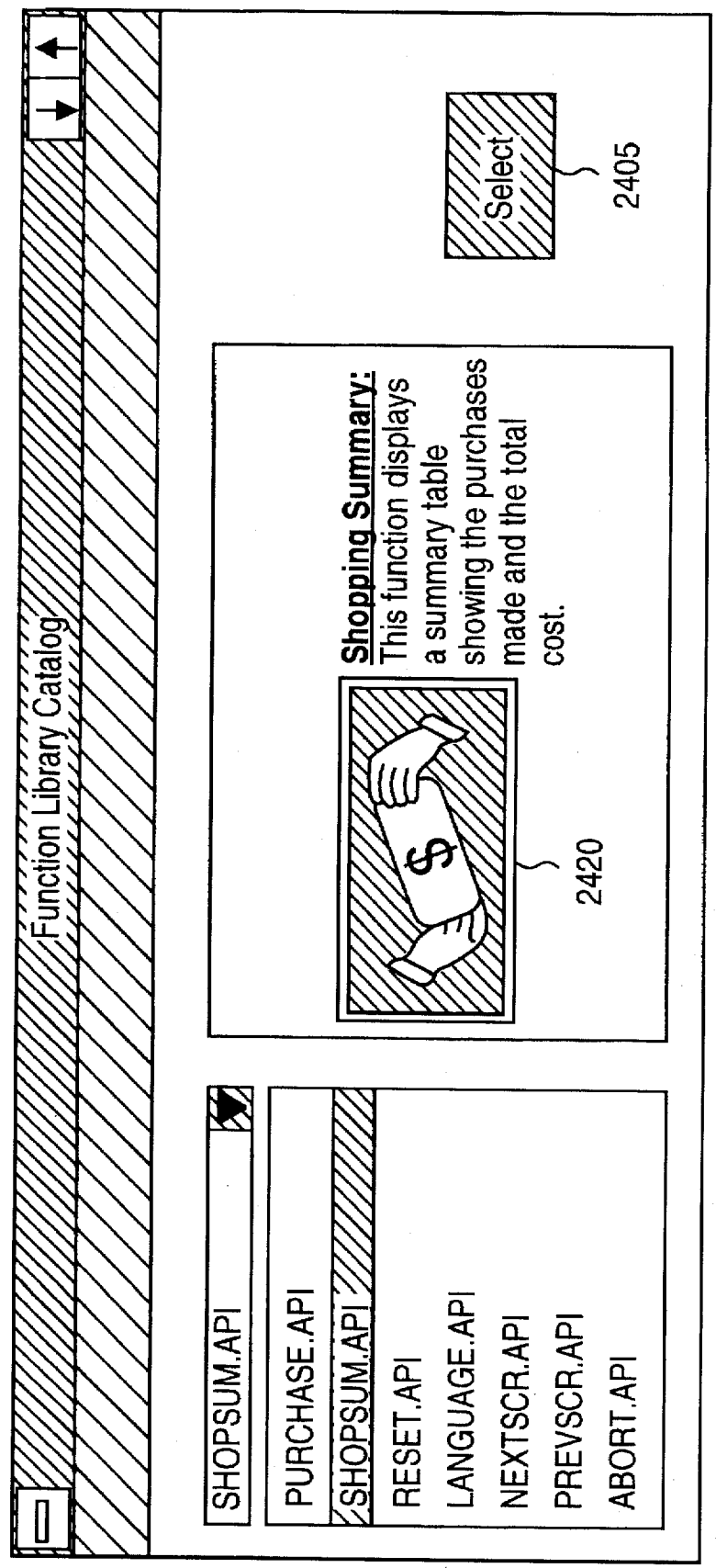
FIG. 19 illustrates an example of a function library catalog window configured in accordance with the present invention.

The present invention includes a function library catalog. The function library catalog is a separate window that allows the user to scroll through a library of predefined functions. The function library catalog permits the user to assign a specific function to a control on the screen layout. FIG. 19 illustrates an example of a function library catalog window configured in accordance with the present invention. Each function contained within the function library has an associated text description and an icon box. In addition, the user may scroll through the list of files contained in the function library catalog for selection of the desired function. For the example shown in FIG. 19, the "SHOPSUM.API" file is active, therefore the associated text description and icon box are shown. The files for the function library are given the file extensions "API".

A select button 2405 permits a user to drag the icon box 2420 over a control button on the currently displayed screen. If the user drags the icon and places the icon over a control button, the screen editor program automatically creates an association between selection of the button and invocation of the function. Note that controls that activate screens are automatically assigned functionality through use of the interactive presentation editor program. Only controls performing other functions (e.g. handle credit card transactions) are assigned using the function library catalog. However, the function library catalog may be used to implement any function. For example, the function library catalog may be used to: purchase merchandice "PURCHASE.API"; reset the menu to the original parent screen "RESET.API"; select a language for the menu "LANGUAGE.API"; advance to the next screen "NEXTSCR. API"; return to the previous screen "PREVSCR. API"; and abort a menu "ABORT. API".

FIG. 17c illustrates a control function catalog command selectable from the view menu. The control function catalog command toggles the control function catalog "on" and "off". A check mark located beside the control function catalog command on the view menu indicates the function is active. A tool bar command on the view menu toggles the tool bar display "on" and "off". A check mark located next to the tool bar command on the view menu indicates the tool bar is displayed. Similarly, a status bar command toggles the status bar on and off. A check mark next to the status bar command on the view menu indicates that the status bar display is active.

Figure 17D:
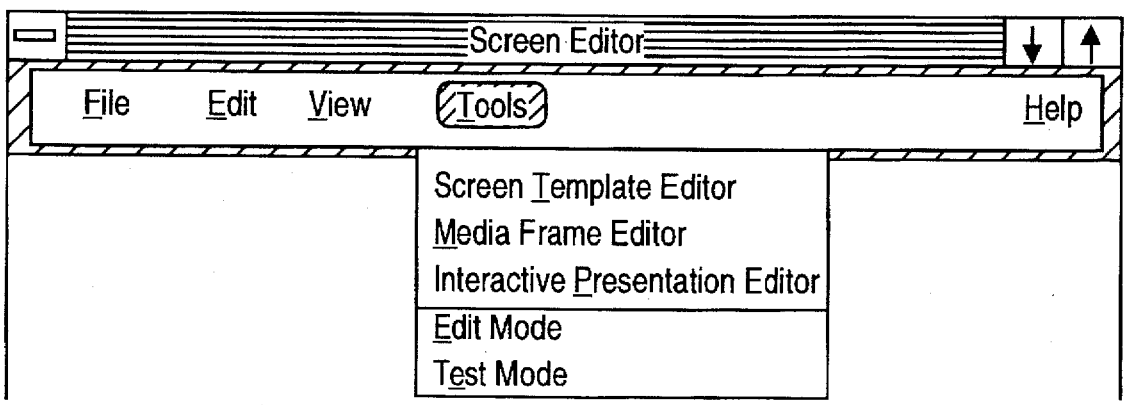
FIG. 17d illustrates a tools menu for the screen editor configured in accordance with the present invention.

FIG. 17d illustrates a tools menu for the screen editor configured in accordance with the present invention. The commands selectable from the tools menu permit a user to invoke different programs while maintaining the screen editor program active. An interactive presentation editor command permits the user to access the interactive presentation editor program. A screen template editor command allows a user to access the screen template editor program. Access to the screen editor template program from the screen editor program permits the user to create/edit a screen template while working on creation of the actual screens. A "media frame editor" command permits access to the media frame editor program. The media frame editor command permits the user to create/edit a menu frame while working to create screens.

An "edit" mode command allows a user to select an operating mode for the screen editor program. The edit mode, which is the normal mode of operation for the screen editor program, permits the user to edit an active screen. When in the edit mode, the edit mode command on the tools menu has a check mark next to the command. The edit mode command allows a user to return the screen editor program from the test mode. The test mode command switches the operation mode of the screen editor from edit mode to a test or demonstration mode. The test mode allows the user to test the screen (i.e. run the media frame and use the controls) in the manner intended for the end user. To return to the edit mode, the user selects the edit mode command. A check mark located next to the test mode command on the tools menu indicates the test mode is the active mode.

Figure 17E:
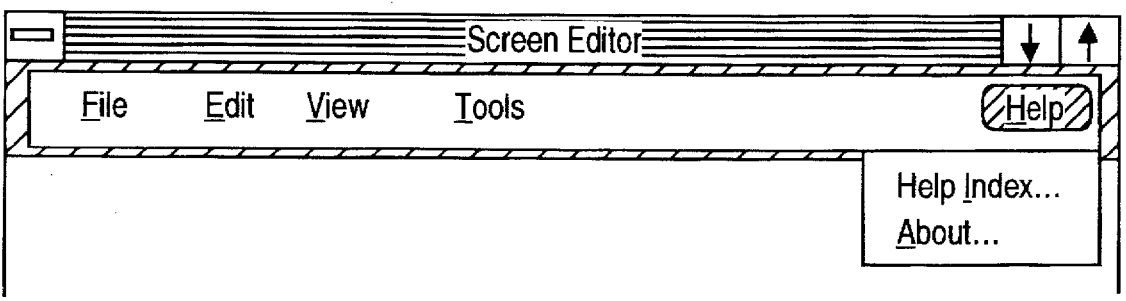
FIG. 17e illustrates a help menu for the screen editor program configured in accordance with the present invention.

FIG. 17e illustrates a help menu for the screen editor program configured in accordance with the present invention. The help menu contains the "help index" and "about" commands. The help index command is configured in accordance with the standard Windows™ help index type function. In general, the help index function allows the user to select from a category index to obtain help to operate the screen editor program. An about command is implemented as a standard Windows™ type "about box" for a windows program.

Figure 20:
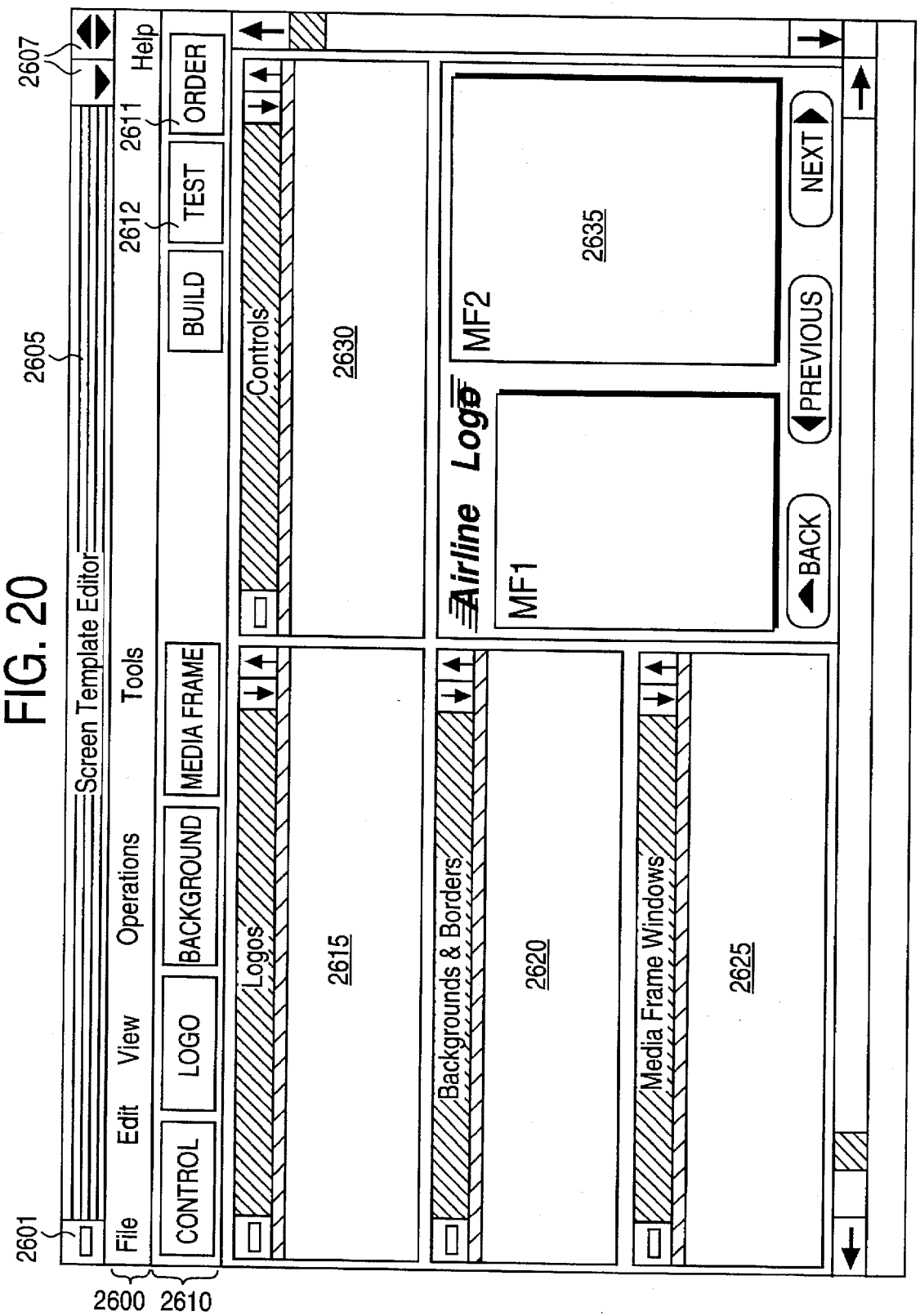
FIG. 20 illustrates a graphical user interface for the screen template editor configured in accordance with the present invention.

The present invention includes a screen template editor to provide capabilities for constructing screen template definitions. The screen template definitions include defining backgrounds, borders, drop boxes, logos, controls, and media frame windows. FIG. 20 illustrates a GUI for the screen template editor configured in accordance with the present invention. In a preferred embodiment of the present invention, the screen template editor is implemented as a Microsoft™ Windows program. The screen template editor screen layout contains a title bar 2600. The title bar 2600 includes a standard control/menu box 2601, "screen template editor" title bar 2605, and a pair of minimize/maximize buttons 2607. The screen template editor menu bar 2600 provides pull down access to menu selections. For example, the screen template editor menu bar 2600 provides for mouse click and accelerator key selection.

The screen template editor screen layout also contains a tool bar 2610 for providing commonly used functionality to the user. The tool bar 2610 includes buttons to pull up tool dialogs for controls, logos, background and borders, and media frame windows. A first button 2611 on the tool bar 2610 allows traversal ordering of controls for manual assignment. A second button 2612 on the tool bar 2610 allows for testing the controls on a screen template to see that a locked control user interface and pick access traversal occur in the correct order. For purposes of explanation, a locked control user interface is a user interface that does not use a cursor, but instead provides some indication to the user about the control currently ready for activation. Typically, a set of cursor move buttons increments the particular indication from one control to the next.

The screen template editor screen layout contains a plurality of tool dialog boxes. Specifically, the screen layout contains a logos tool dialog box 2615, backgrounds and border tool dialog box 2620, a media frame tool dialog 2625, a controls tool dialog box 2630, and a screen template build window 2635. All of the tool dialog boxes include a control/menu button in the upper left corner. The control/menu button is implemented from a standard Microsoft™ Windows function. The control/menu button may be utilized to close a tool dialog box. Once a tool dialog box has been closed, the respective box is reopened by selecting the box from the tool bar 2610 or from a menu selection. In the screen template editor, only one instance of each of the tool dialogs can be invoked at one time. Opening multiple instances of each tool dialog serves no useful purpose.

Figure 21A:
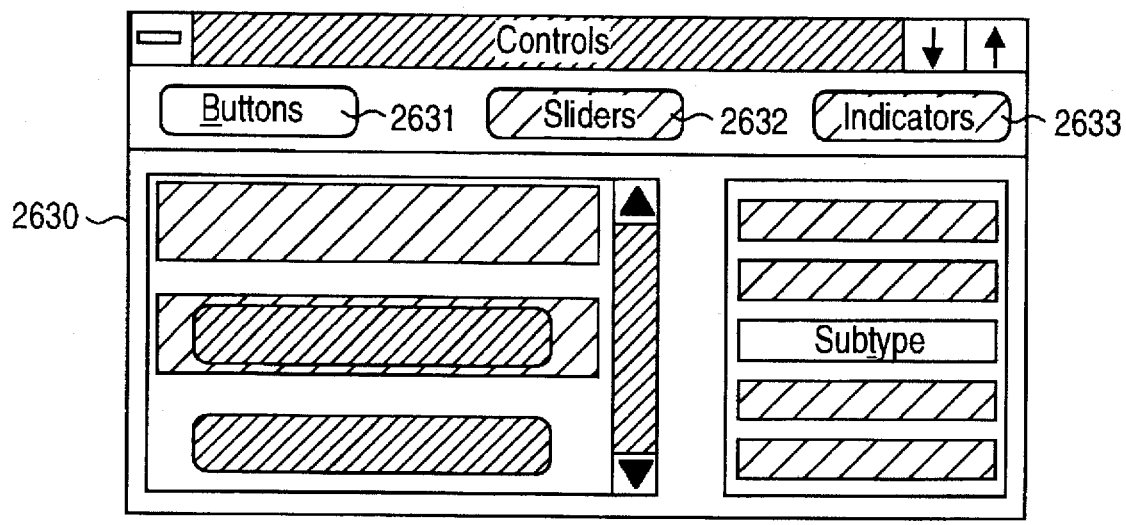
FIG. 21a illustrates a controls tool dialog box configured in accordance with the present invention.

FIG. 21a illustrates a controls tool dialog box configured in accordance with the present invention. The controls tool dialog box 2630 contains selections for selecting a control type mode. Typical control type modes include buttons, sliders and indicators. For the control tool dialog box illustrated in FIG. 21a, the selections include buttons 2631, sliders 2632, and indicators 2633. The buttons mode permits a user to select from various types of buttons including momentary, toggle, checkbox and radio button. The sliders mode permits a user to select from controls with multiple output states such as volume sliders and rotational knobs. The indicators mode permits a user to select from various sorts of light emitting diode (LED) indicators such as red, yellow and green, circular LEDs, bargraph LEDs, semicircle meter LEDs, and seven segment numerical readout LEDs. The controls tool dialog contains a list box allowing control selection from a set of bit map images. The selections, located at the right hand side of controls tool dialog box 2630, provide the user with color, orientation, subtype, type and attached function selection capabilities.

Figure 21B:
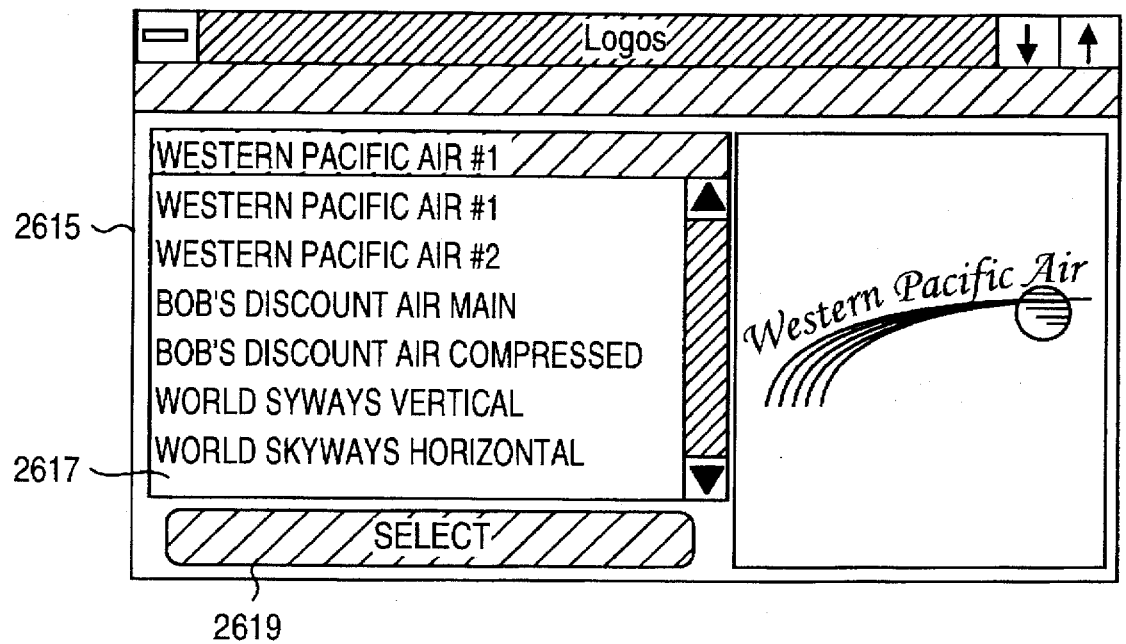
FIG. 21b illustrates a logos tool dialog box configured in accordance with the present invention.

FIG. 21b illustrates a logos tool dialog box configured in accordance with the present invention. The logos tool dialog box 2615 allows users to select from sets of bit mapped corporate logos. In a preferred embodiment, the corporate logos are prescanned using an image editor such as Adobe™ Photoshop. The corporate logos are loaded over a screen templates background using an icon type graphics primitive that supports a transparent surround for the logo. A list box 2617 provides descriptive labels for each corporate logo currently selectable. Also, a thumbnail sketch window 2618 displays a picture of the highlighted logo description in the list box 2617. A select button 2619 attaches the selected corporate logo to the mouse cursor so that the logo may be dropped into the screen template build window 2635. New logo description labels are added to the logo tool dialog by invoking a new logo dialog box (not shown). The new logo dialog box permits adding, deleting, previewing, and canceling of logos. In addition, the new dialog box permits entry of text description for each logo.

Figure 21C:
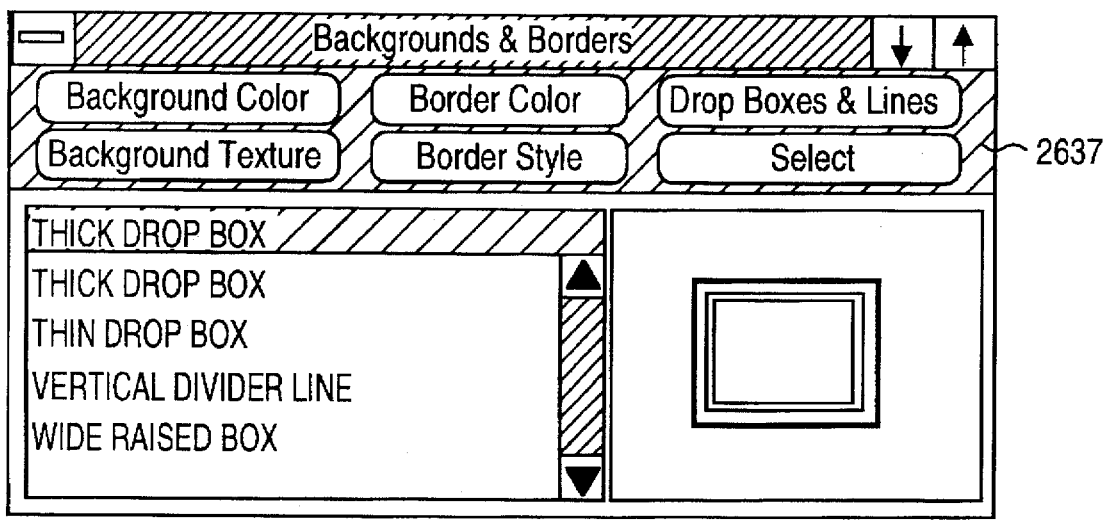
FIG. 21c illustrates a backgrounds and borders tool dialog box configured in accordance with the present invention.

FIG. 21c illustrates a backgrounds and borders tool dialog box configured in accordance with the present invention. The backgrounds and borders tool dialog box 2620 provides users with options for controlling the graphical look of the screen template. The backgrounds and borders tools dialog box 2620 provides the user with capabilities to select background color and texture, border color and style, and various sorts of divider line and drop box shapes. A list box 2629 allows a user to scroll through possible selections. A thumbnail sketch window 2628 allows a user to view the corresponding highlighted selection in the list box 2629. A select button 2627 attaches a user's selection to the cursor control device so that the user may drop the selected item onto the screen template build window 2635. An additional dialog box (not shown), invoked through a menu selection, allows adding, deleting, and previewing new choices to the backgrounds and borders tool dialog.

Figure 21D:
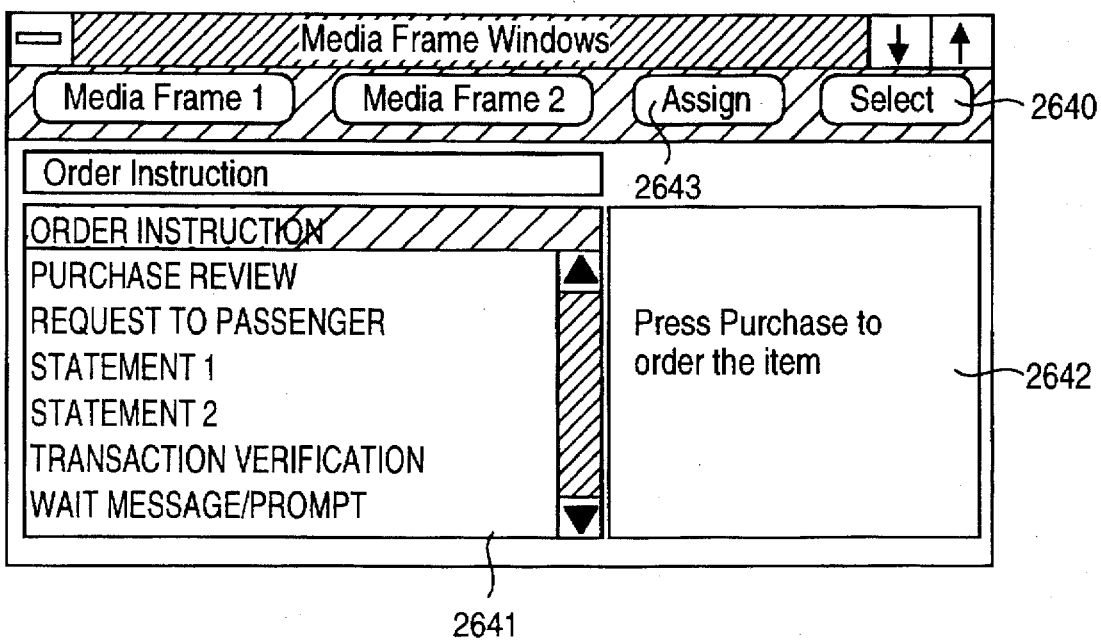
FIG. 21d illustrates a media frame windows tool dialog box configured in accordance with the present invention.

FIG. 21d illustrates a media frame windows tool dialog box configured in accordance with the present invention. The media frame windows tool dialog box 2625 allows selection of a media frame window location and size within the generic screen template. The media frame tool dialog box 2625 includes a list box 2641 and a thumbnail sketch box 2642 for assigning specific media frames to the generic screen template. The thumbnail sketch window 2642 also shows sizing of the media frame window. A select button 2640 permits a user to select a media frame from the list box 2641. Selecting a media frame from the list box 2641 attaches the selected media frame to the cursor control device. In addition, the selected media frame appears on the output display with a dotted border comprising the size and aspect ratio of the selected media frame. To select a media for the screen template, the user places the dotted border onto the generic screen template in the screen template build window 2635, and drops the dotted border into place by selecting a control button on the cursor control device. A special selection within the list box 2641 allows the user to retrieve a free formatted dotted border which can be adjusted to any size or aspect ratio. The assign button 2643 attaches specific media frames to the cursor control device for drag and drop operations into the generic screen template on the screen template build window 2635.

As shown in FIG. 20, the screen template build window 2635 provides a space for constructing a screen template. As described above, the various component elements of a screen template are attached to the mouse cursor and dragged and dropped into the screen template build window 2635. In addition, selecting elements with the cursor control device, already positioned within the screen template build window, allows a user to easily reposition, cut, copy and paste. Editing the screen template build window 2635 is accomplished through the edit menu. Selecting, with the cursor control device, the order button on the tool bar 2610 places the screen template into the order control traversal mode. In the order control traversal mode, a user selects the order in which a locked control user interface steps from one control to the next.

A test button 2612, selectable from the tool bar 2610, allows a user to test functionality attached to a particular control. If the user selects the test button 2612, the screen template editor enters the test mode. Upon invocation of the test mode, a message box is displayed. The message box is utilized to display a text string that indicates the nature of operations attached to controls through the function button within the controls tool dialog. As a user operates controls in a screen template, any attached functionality is indicated by an appropriate message. A build button returns the screen template build window 2635 to the build mode.

When operating within the screen template editor, screen templates are stored into a file. The file contains the name of the active project and the file extension ".STM". Any number of screen templates are stored into the screen template file, and are identified by screen template identification values. An operations/screen template dialog menu selection allows user access to screen template header information. The operation/screen template dialog includes fields that permit a user to set a screen template's name, description, id and reference to one other screen template. When a screen template's identification value is edited, an automatic adjustment of all other preassigned identification values occurs. Consequently, each screen template identification is unique within a particular project. For example, changing a screen template id to 20, when id values of 20-25 are already defined within a particular project, automatically bumps the preassigned ids to the range of 21-26. Screen templates are automatically assigned screen template identification values in ascending order beginning at 1.

The screen template editor contains a reference capability to allow a screen template to copy common characteristics from another previously defined screen template. A next and previous button, contained in a first screen template, may be referenced by all other screen templates within the particular project to automatically copy the control and logo characteristics. Specific characteristics referenced from another screen template are displayed within the screen template build window 2635. The referenced characteristics cannot be repositioned or deleted. Instead, edits are performed on the screen template where the controls and logos were originally defined. The screen template editor also contains a control order override so that controls copied from a reference screen template may be reordered for control traversal. The test mode for the screen template editor permits controls and referenced screen templates to be tested even though the assigned functionality cannot be altered. Instead, assigned functionality of a reference screen template may be altered when the original reference screen template is active in the screen template editor. The screen template reference capability reduces network bandwidth in file server storage requirements by sharing redundant screen template definitions.

Figure 22A:
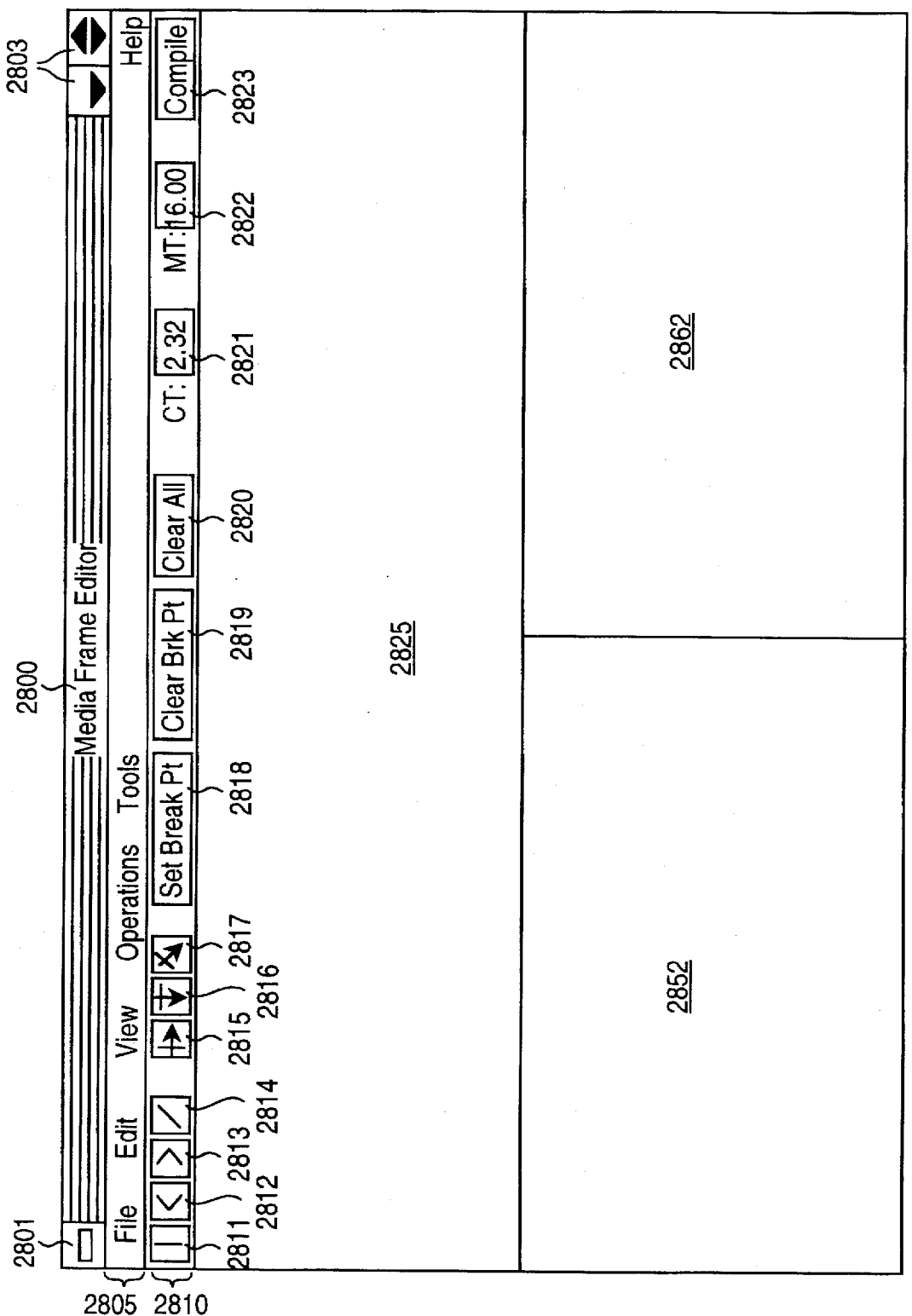
FIGS. 22a–d illustrate a graphical user interface for the media frame editor configured in accordance with the present invention.

The media frame editor of the present invention provides capabilities for combining images, graphics, animations, video clips, text, and sound clips on a common timeline. FIGS. 22a–d illustrate a GUI for the media frame editor configured in accordance with the present invention. In a preferred embodiment, the media frame editor is implemented as a Microsoft™ Windows program. As shown in FIG. 22a, the screen layout for the media frame editor contains a title bar 2800, including a standard control/menu box, "media frame editor" title, and minimize and maximize buttons 2803. A menu bar 2805 provides pull down access to menu selections. The menu bar 2805 provides for mouse click and accelerator key entry selection.

The tool bar 2810 includes time line edit functions such as cut symbol 2811, fade in symbol 2812, fade out 2813, and dissolve 2814. The timeline edit functions are selected by placing the cursor control device on the function symbol and depressing a button to select the symbol. The function symbol is then dragged, with the button being depressed, across a portion of a timeline track to generate a track edit. A fade or dissolve begins when the mouse button is pressed, and ends when the mouse button is released (as long as both the mouse press and release occur within a single track window). Also located on tool bar 2810 are three screen wipe buttons 2815, 1816, and 2817. The wipe buttons provide, for example, horizontal, vertical, and diagonal wipes between media elements. A wipe is a hard or soft edged line transition from one media element to the next media element. The media frame track edit syntax diagram provides additional definitions of the on-screen edit marks.

The tool bar 2810 also provides buttons: set break point 2818, clear break point 2819, and clear all 2820. The set break point 2818, clear break point 2819 and clear all 2820 set, clear, and clear all break points, respectively. With the break point functions, multiple break points may be set by the user. In operation, when a user sets a pair of break points, each successive run operation plays the selected tracks between adjacent break points. If the user selects the clear break point button 2819, the closest breakpoint to the timeline cursor is cleared. The clear all break point button 2820 clears all currently set break points. The toolbar 2810 also displays information via a current time window 2821 and a maximum time field 2822. The current time field 2821 displays the time position of the timeline cursor. The maximum time field display 2822 indicates the total media frame time length. Also shown on the toolbar 2810 is a compile button 2823. The compile button 2823 permits periodic saves under the currently active media frame file name. If no media frame file name exists, the user is prompt by an input dialog box so that the user may enter one.

Figure 22B:
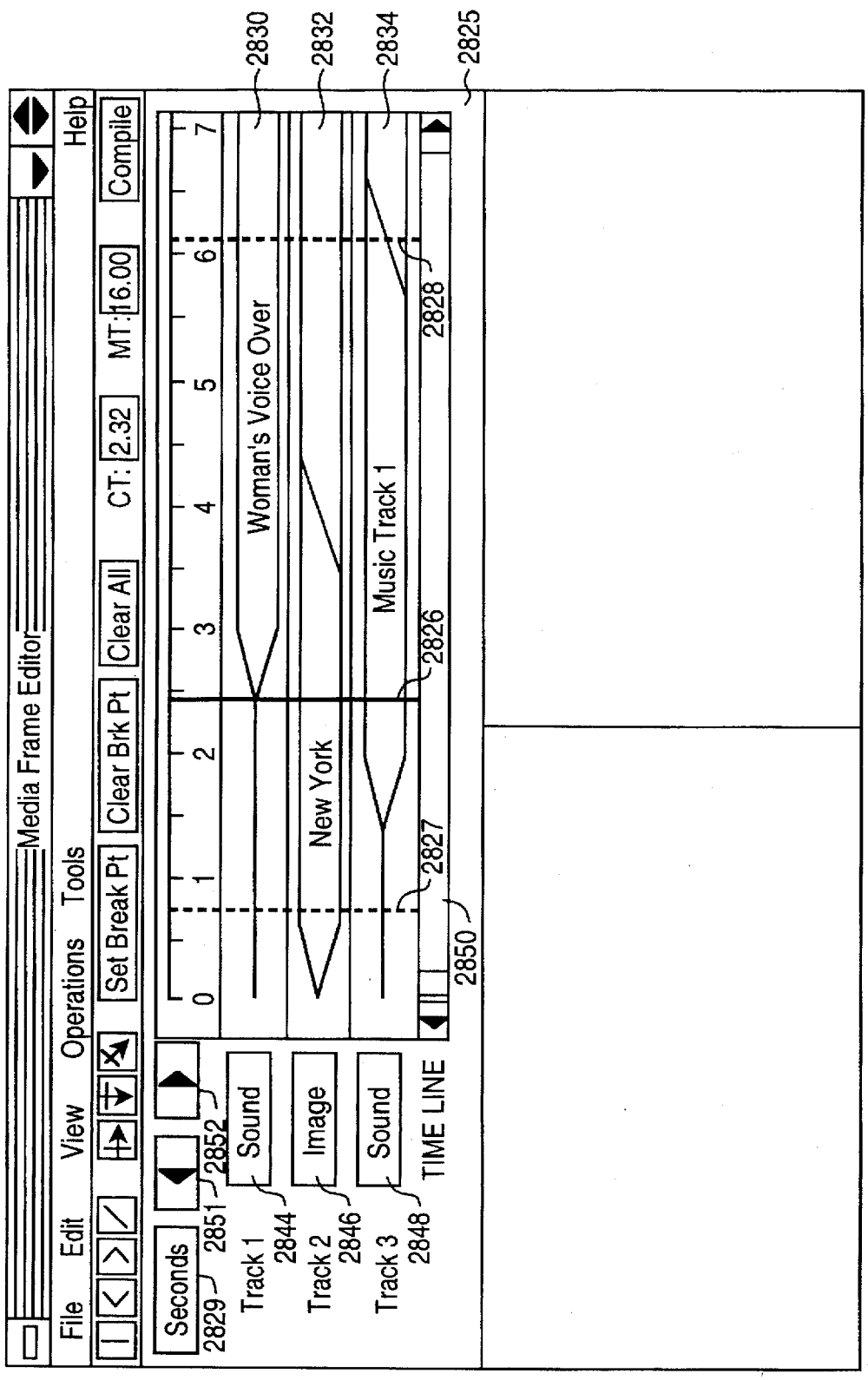

FIG. 22b illustrates the timeline window 2825 for the media frame editor of the present invention. The timeline window 2825 on the media frame editor screen display 2800 displays up to three media tracks against a time scale. A vertical solid line cursor 2826 traverses the time scale and the track window from left to right when a user runs a particular media frame. Dotted vertical lines, such as dotted vertical lines 2827 and 2828, indicate break point time positions. A time units button 2829 permits a user to toggle the time scale units between seconds and minutes. The time units button 2829 label changes when the button is depressed, toggling back and forth between "seconds" and "minutes". The timeline window 2825 displays three tracks 2830, 2832 and 2834. Each track contains a button label 2844 for Track 1, 2846 for Track 2, and 2848 for Track 3. If a user successively presses a button label for a corresponding track, the button label displays the possible choices indicating the current selection.

A slide bar 2850 at the bottom of the timeline window 2825 permits panning of the time scale and track displays in the range from time zero up to the maximum time for the media frame. A pair of bump up bump down buttons 2851 and 2852, respectively, permits a user to adjust the maximum time for the media frame. The media frame editor of the present invention utilizes standard film editing marks to represent track cuts, fades, and dissolves. The track cuts, fades, and dissolves define the length of media elements within track window 2825. A cut is represented as a vertical line in the track. A fade in is represented as a sideways "V" pointing to the left as shown at time "0" on "Track 2". A fade out is represented as a sideways "V" pointing to the right. A dissolve between track elements is represented as a slanting line from bottom to top of the respective track. A slanting line running from the top to bottom indicates a wipe. A continuation of the current track elements is indicated by two horizontal lines. A blank space in a particular track is indicated by a single horizontal line in the center of the corresponding track. The blank space indicates silence for audio or blank screen for video. The length and position of track editing marks are relative to the time scale. The media frame track edit syntax diagram provides additional details about track editing marks.

Figure 22C:
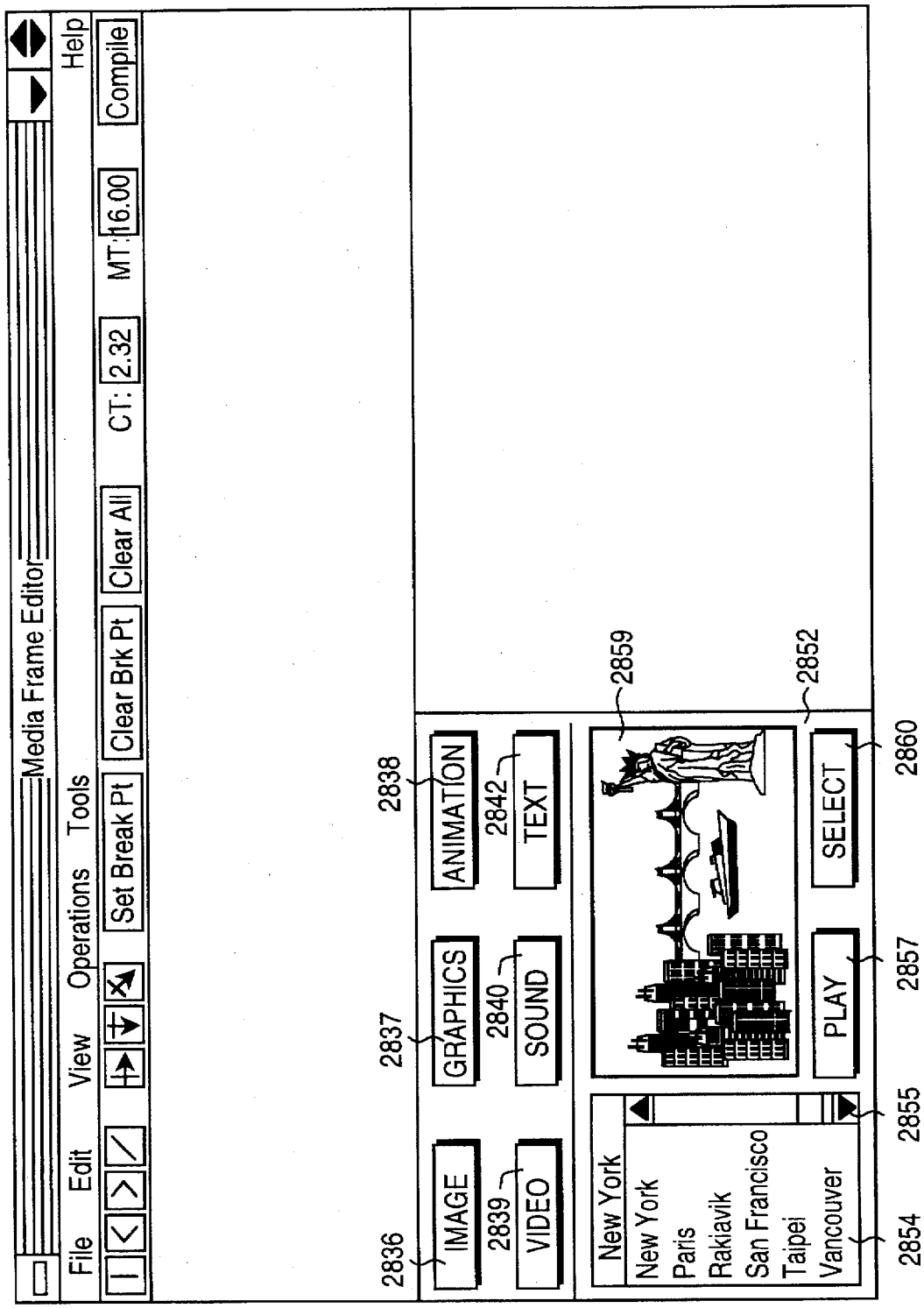

The media frame editor also contains a media selection window 2852, located in the lower left corner of the media frame editor screen display 2800, as illustrated in FIG. 22c. The media selection window 2852 allows selection of media frames for attachment to a particular track. Within the media selection window 2852, a plurality of buttons are provided for selecting the type of media element. The buttons include an image button 2836, graphics button 2837, animation button 2838, video button 2839, sound button 2840 and text button 2842. A list box 2854 provides a selection mechanism for specific media elements within the active media type, and the active media element is shown at the top of the list box 2854. A slide bar 2855 on the list box 2854 allows traversal of the possible media selections.

A thumbnail sketch window 2859 provides a means to show viewable media elements. For the example shown in FIG. 22c, a video media element of New York is displayed in the thumbnail sketch window 2859. A play button 2857 plays the currently selected media element. If the media element is a sound clip, no view is shown in the thumbnail sketch window 2859, but the corresponding sound clip is played on the host computer system sound card. A select button 2860 attaches the current media element to the cursor control device thereby permitting a user to attach a particular media element to a portion of a track. The mouse cursor changes to represent the type of media attached (e.g. a musical note for sound, a rectangle for image, etc.). The mouse cursor is then moved into a track window and clicked on a portion of the track for which insertion is desired.

Figure 22D:
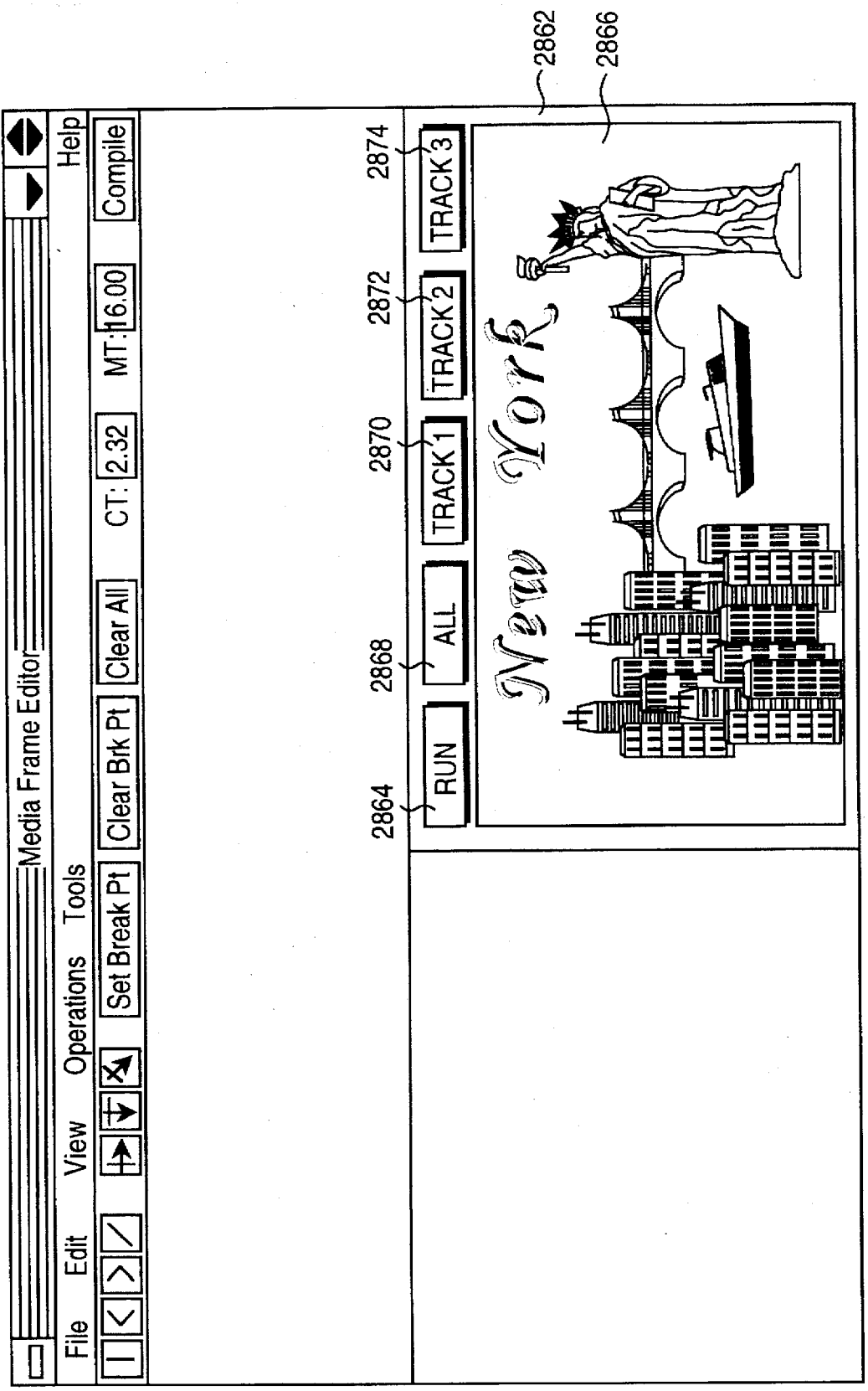

FIG. 22d illustrates a run window for the media frame editor configured in accordance with the present invention. The run window 2862 permits a user to play selected portions of a media frame. A momentary run button 2864 plays the media frame between successive break points. When the run button 2864 is selected, the cursor traverses across the track window from left to right. A run view window 2866 displays viewable elements of the media frame, and any selected sound tracks are played on the computer system sound card. An all button 2868 selects all defined tracks for the current media frame. The buttons 2870, 2872 and 2874 are provided for selecting/deselecting tracks 1–3, respectively. When the all button 2868 is asserted, Tracks 1–3 buttons 2870, 2872 and 2874 are automatically asserted. By selecting the associated track button, any of Tracks 1–3 can be deasserted.

When multiple viewable media elements overlap in time, viewability priority is assigned automatically based on the media type. In a preferred embodiment, animation contains the highest viewability priority and is displayed over other lower priority media element layers. The text media contains the next highest priority layer, taking precedence over the remaining media elements. The graphics is assigned the next highest viewable priority, and an image has the lowest viewable priority. The video clips are unique because video clips are not combined with other viewable media image elements. An attempt to lay down a video track in parallel with any other viewable media element generates an error message. The media frames are stored in files containing file name extensions of ".MFR".

Figure 23A:
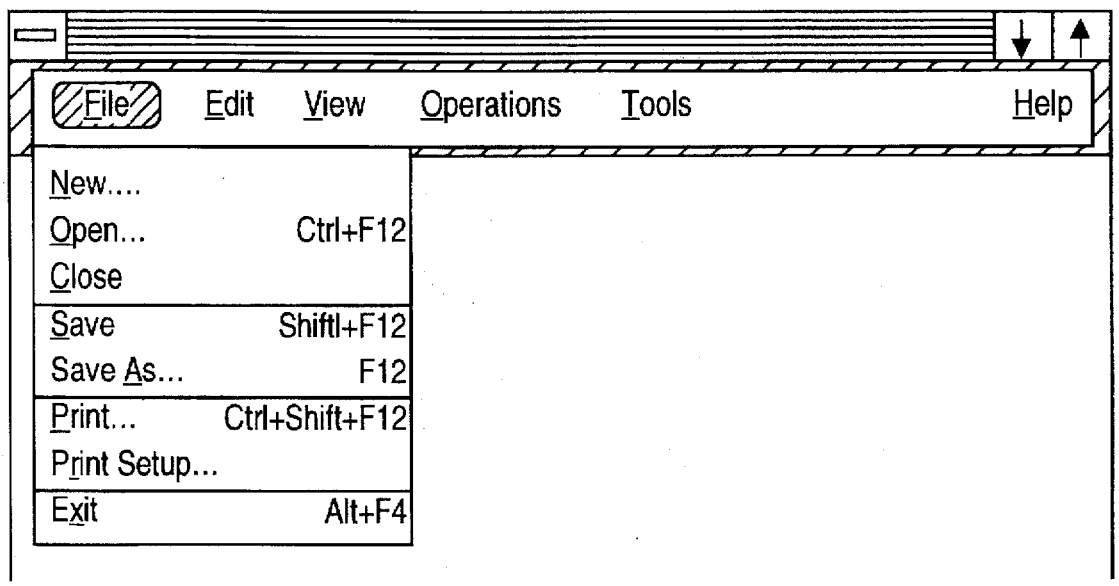
FIG. 23a illustrates a file menu for the media frame editor configured in accordance with the present invention.

FIG. 23a illustrates a file menu for the media frame editor configured in accordance with the present invention. The file menu includes a new command. The new command, when selected by a user, invokes a dialog box to create a new media frame. If a media frame file is currently opened when the new command is selected, the user is prompted to save the currently opened media frame file prior to creating a new media frame file. When operating in the interactive applications generator environment, only one media frame may be active at any one time. An "open" command, when selected by a user, invokes a dialog box with a list box to select an existing media frame. All media frame files containing the file extensions ".MFR" are displayed in a combo box within the file open dialog.

A "close" command, selectable from the file menu, closes a currently opened media frame file. If edits were made to the active media frame file, the user is prompted to save changes. A "save" menu selection, when invoked, saves the currently open program, sub-program, or application to the associated file. The media frame file is saved under the name "used" when the media frame was loaded. If a file name for the media frame file was not previously specified, the user is prompted to supply a file name. The media frame file extension is automatically appended to a name supplied by the user. A file save as menu selection invokes a dialog box to save the current program, sub-program or application under a file name specified by the user. The standard media frame file extension is automatically appended to the file name designated by the user.

A "print" menu selection, selectable from the file menu, invokes a dialog box to print the currently open media frame file at the current timeline cursor position. The user specifies an output format and number of copies for the print operation. All selected viewable tracks are combined for printing, and the layers for printing are the same as the layers for viewing on the display screen. The "print setup" command, when selected, invokes a common dialog box to set up a printer. An "exit" menu selection closes active media frame files. If revisions were made to the active open media frame file subsequent to saving the file, then the user is prompted to save edits prior to exiting the media frame program. If the media frame editor was invoked from another portion of the interactive applications generator program, control is returned to the calling program.

Figure 23B:
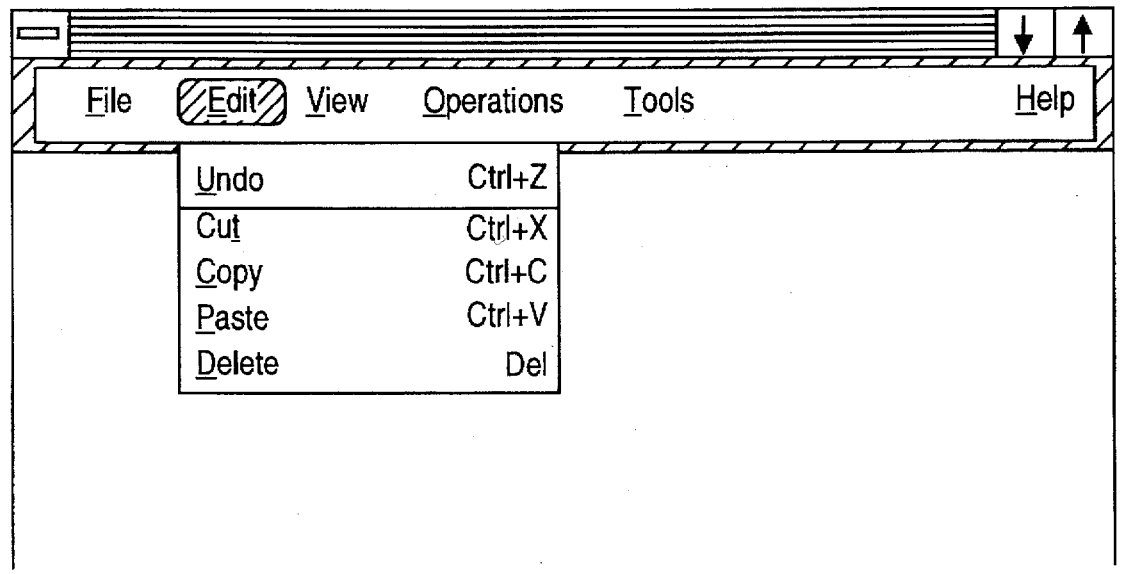
FIG. 23b illustrates an edit menu for the media frame editor configured in accordance with the present invention.

FIG. 23b illustrates an edit menu for the media frame editor configured in accordance with the present invention. An "undo" command selection reverses the most recent track edit operation performed by the user. A "cut" menu selection deletes the selected portions of a track. The deleted portion of the track is copied to the windows clip board, and is accessible to the window track at a future time. A "copy" menu selection copies selected portions of a track to the windows clip board. A "paste" menu selection inserts the contents of the windows clip board into the track window at a point designated by a user. The "delete" menu selection removes the currently selected portion of a track.

Figure 23C:
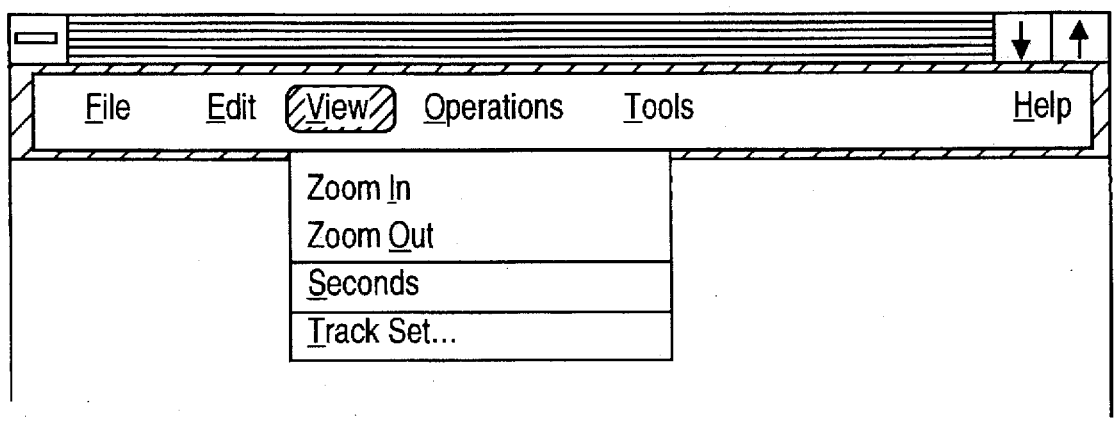
FIG. 23c illustrates a view menu for the media frame editor configured in accordance with the present invention.

FIG. 23c illustrates a view menu for the media frame editor configured in accordance with the present invention. A "zoom in" command, selectable from the view menu, permits the user to decrease the displayed time scale range down to 75% of the previously displayed time range. The "zoom out" view menu selection allows the user to increase the time scale displayed range up to 133% of the currently displayed time range. A "seconds" and "minutes" commands, selectable from the view menu, permits the user to toggle between the seconds and minutes time scale. When invoked by the user, the menu frame editor redraws the time scale with the appropriate units. In addition, the media frame editor changes the current and maximum time windows 2821 and 2822, respectively to reflect the selection. A "track set" view menu selection allows a user to pull up a menu box to save the three currently selected tracks as either track set 1, 2, 3 or 4. The dialog box also allows selection of any of the four possible track sets as the current set.

Figure 23D:
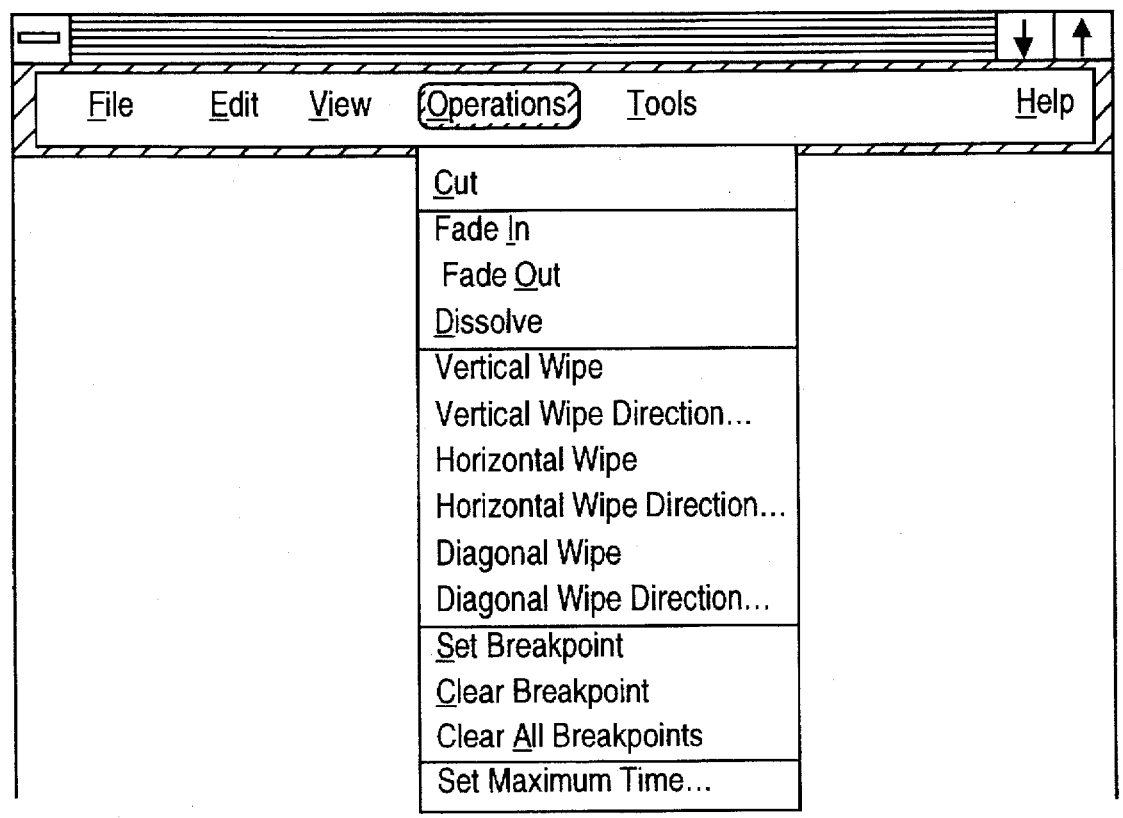
FIG. 23d illustrates an operations menu for the media frame editor configured in accordance with the present invention.
Figure 24A:
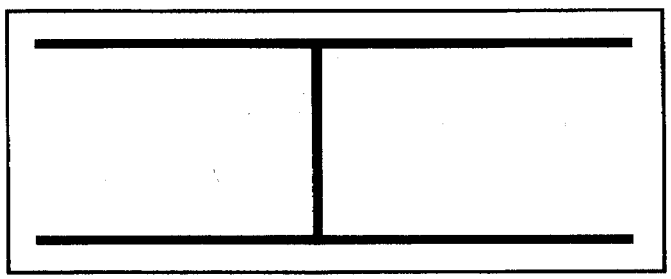
FIGS. 24a–n illustrate the media frame track edit syntax for a preferred embodiment of the present invention.

FIG. 23d illustrates an operations menu for the media frame editor configured in accordance with the present invention. A "cut" operations menu selection permits a user to attach a track cut edit operation to the cursor control device. A track cut edit operation provides a sharp cut from one media element to the next subsequent media element. FIG. 24a illustrates the media element track cut edit syntax for a preferred embodiment of the present invention. The media element track cut edit syntax is displayed in the tool bar 2810 as cut symbol 2811. In a preferred embodiment, the track cut edit is applied to a track when the left mouse button is pressed and released.

Figure 24B:
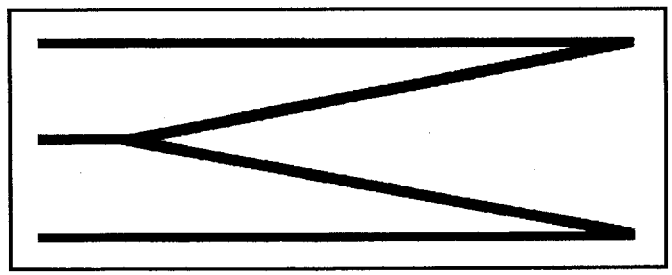

The "fade in" command, selectable from the operations menu illustrated in FIG. 23d, permits a user to attach a track fade in edit operation to the cursor control device. FIG. 24b illustrates the media element track fade in edit syntax for a preferred embodiment of the present invention. The fade in edit operation provides a gradual fade in from a blank into the media element. The media element track fade in edit syntax is displayed in the tool bar 2810 as fade in symbol 2812. In the preferred embodiment, the fade in edit operation is applied to a track by pressing a left button on the cursor control device at the start of the fade in, dragging the mouse cursor to the end of the fade in, and releasing the mouse button. In order to effectively apply the edit operations to a track, the mouse cursor begins and ends within the same track window.

Figure 24C:
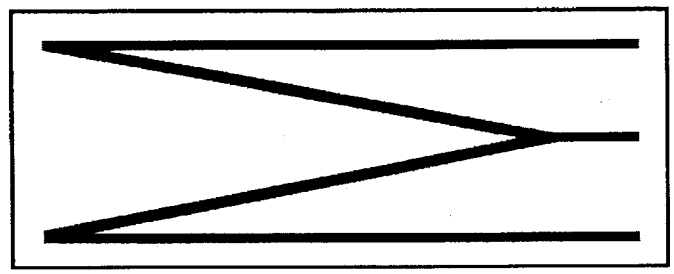

A "fade out" menu selection on the operations menu permits a user to attach a track fade out edit operation to the mouse cursor. FIG. 24c illustrates the media element track fade out edit syntax for a preferred embodiment of the present invention. The fade out edit syntax provides a gradual fade out from a media element to a blank track. The media element track fade out edit syntax is displayed in the tool bar 2810 as fade out symbol 2813. In a preferred embodiment, the fade out edit operation is applied to a track by pressing the left mouse button at the start of the fade out, dragging the mouse cursor to the end of the fade out, and releasing the mouse button. The mouse cursor begins and ends within the same track window to effectively execute the fade out operation.

Figure 24D:
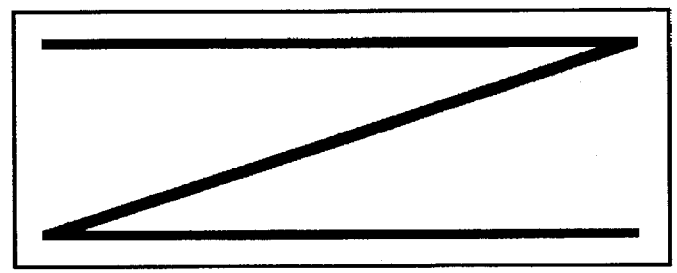

A "dissolve" menu selection, selectable from the operations menu, permits a user to attach a track dissolve edit operation to the mouse cursor. FIG. 24d illustrates the media element track dissolve edit syntax for a preferred embodiment of the present invention. The dissolve track edit operation provides a gradual transition to mix two media elements between the transition from the first to the second. The media element track dissolve edit syntax is displayed in the tool bar 2810 as dissolve symbol 2814. The dissolve edit operation is applied to a track by pressing the left mouse button at the start of the dissolve, dragging the mouse cursor to the end of the dissolve and releasing the mouse button. The mouse cursor begins and ends within the same track window for the dissolve operation to effectively operate on a track.

Figure 24E:
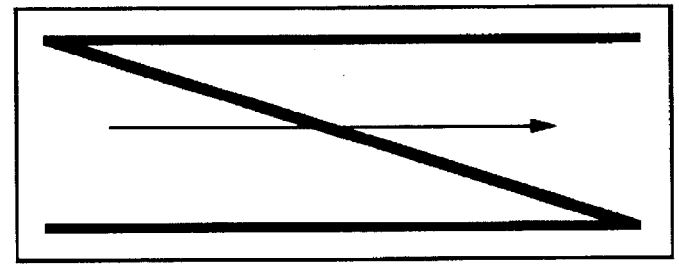
Figure 24F:
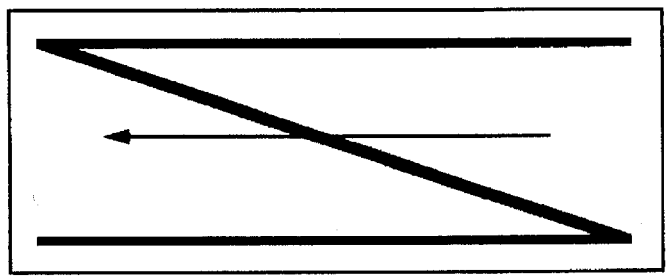

A "vertical wipe" menu selection permits a user to attach a track wipe edit operation to the mouse cursor. In a preferred embodiment, FIG. 24e illustrates the media element track vertical wipe edit syntax from left to right, and FIG. 24f illustrates the media element track vertical wipe edit syntax from right to left. The media element track vertical wipe edit syntax is displayed in the tool bar 2810 as screen wipe symbol 2815. The currently selected vertical wipe is applied to a track by pressing the left mouse button at the start of the wipe, dragging the mouse cursor to the end of the wipe, and releasing the mouse button. In order to effectively apply the wipe operation to a track, the mouse cursor begins and ends within the same track window. The "vertical wipe direction" selection on the operations menu, upon selection by a user, invokes a dialog box allowing the user to select a vertical wipe direction from right to left, or from left to right.

Figure 24G:
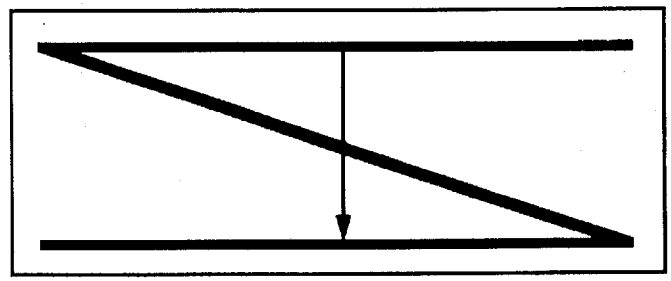
Figure 24H:
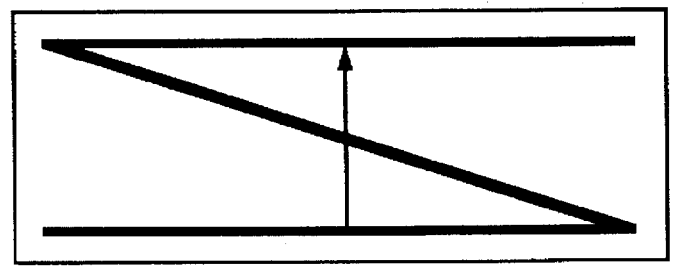

The "horizontal wipe" selection on the operation menu permits a user to attach a track wipe edit operation to the mouse cursor. In a preferred embodiment, FIG. 24g illustrates the media element track horizontal wipe edit syntax from top to bottom, and FIG. 24h illustrates the media element track horizontal wipe edit syntax from bottom to top. The media element track vertical wipe edit syntax is displayed in the tool bar 2810 as screen wipe symbol 2816. The currently selected horizontal wipe is applied to a track by pressing the left mouse button at the start of the wipe, dragging the mouse cursor to the end of the wipe, and releasing the mouse button. The mouse cursor begins and ends within the same track window for the wipe to be applied to a particular track.

Figure 24I:
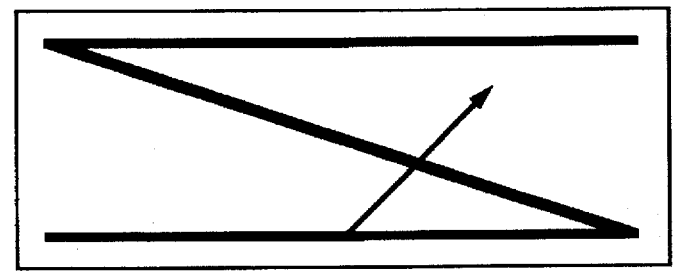
Figure 24J:
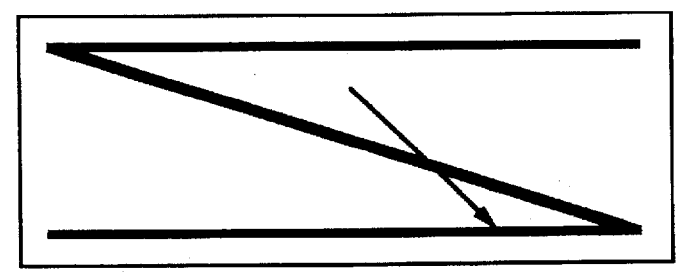
Figure 24K:
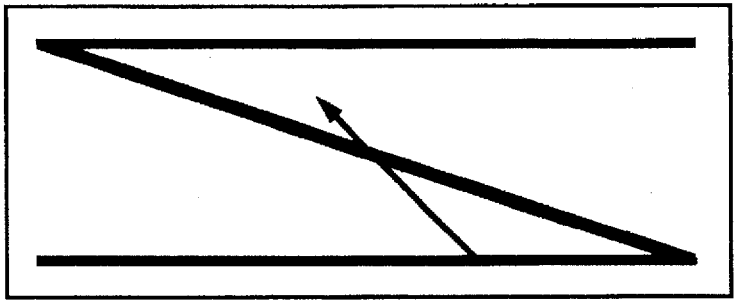
Figure 24L:
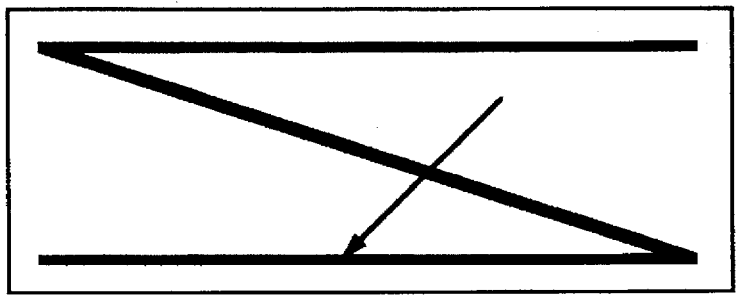
Figure 24M:
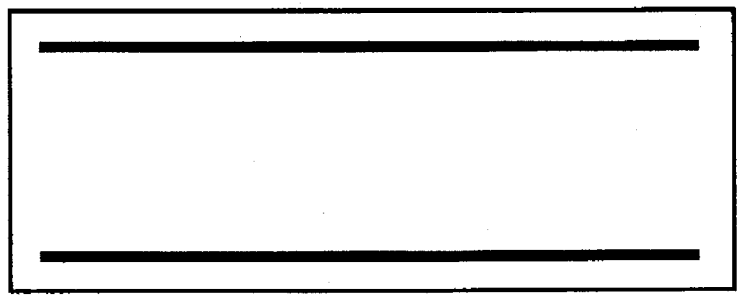
Figure 24N:
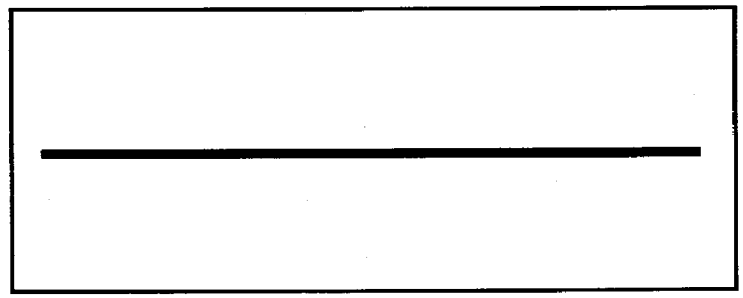

The "diagonal wipe" selection on the operation menu permits a user to attach a track wipe edit operation to the mouse cursor. In a preferred embodiment, FIG. 24i illustrates the media element track diagonal wipe edit syntax from lower left to upper right hand corner, and FIG. 24j illustrates the media element track diagonal wipe edit syntax from upper left to lower right corner. In addition, FIG. 24k illustrates the media element track diagonal wipe edit syntax from lower right to upper left hand corner, and FIG. 24l illustrates the media element track diagonal wipe edit syntax from upper right to lower left corner. The media element track vertical wipe edit syntax is displayed in the tool bar 2810 as screen wipe symbol 2817. The currently selected diagonal wipe direction is used. The "diagonal wipe direction" selection on the operations menu invokes a dialog box, when selected by a user, that allows the user to select a diagonal wipe direction. The diagonal wipe directions include: upper right to lower left corners, lower right to upper left corners, upper left to lower right corners, and lower left to upper right corners.

A "set breakpoint" menu selection on the operations menu, illustrated in FIG. 23d, permits a user to attach a break point to the mouse cursor. A break point is set by the user by pressing a left mouse button and releasing the button within the time scale window, or within any of the three track windows. A "clear breakpoint" menu selection on the operations menu permits a user to clear the break point closest to the current cursor position. If no break points are currently set, a message box displays the message "no break points are currently set." After displaying the message box, the menu frame editor waits for the user to press an "OK" button. A "clear all breakpoints" menu selection on the operations menu permits a user to clear all currently set break points. If no break points are set, the media frame editor displays a message box containing the message, "no break points are currently set." In response, the user is prompted to press an "OK" button. A "set maximum time" command selectable from the operations menu invokes a dialog box when selected by a user that allows the user to set the maximum time of the media frame.

Figure 23E:
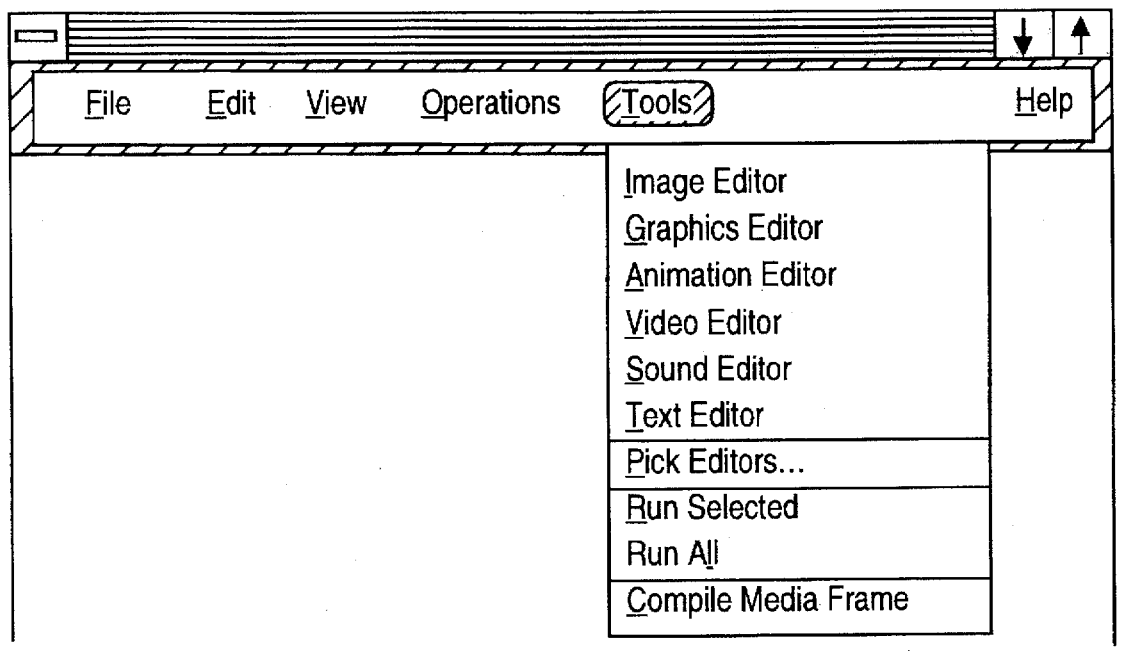
FIG. 23e illustrates a tools menu for the media frame editor configured in accordance with the present invention.

FIG. 23e illustrates a tools menu for the media frame editor configured in accordance with the present invention. An "image editor" menu selection on the tools menu permits a user to call the selected image editor. An image editor may comprise any commercially available multimedia editing program. A "graphics editor" menu selection on the tools menu calls the selected graphics editor when invoked by the user. The "animation editor" menu selection on the tools menu calls an animation editor when selected by the user. A "video editor" menu selection and a "sound editor" menu selections, selectable from the tools menu, calls a video and sound editor, respectively. Similarly, a "text editor" menu selection on the tools menu calls a text editor. A "pick editors" menu selection on the tools menu invokes a dialog box allowing selection of various media element editors. In a preferred embodiment, the dialog box contains a set of standard industry programs commercially available. In addition, the pick editors menu selection permits a user to specify a program name and search path for the program name. A "run selected" menu command selectable from the tools menu plays selected tracks of media frames between adjacent break points. A "run all" menu selection, when invoked, plays all tracks of the media frames between adjacent break points. A "compile media frame" menu selection, selectable from the tools menu, compiles tracks of a media frame into a menu frame file with the file extension ".MFR".

Figure 23F:
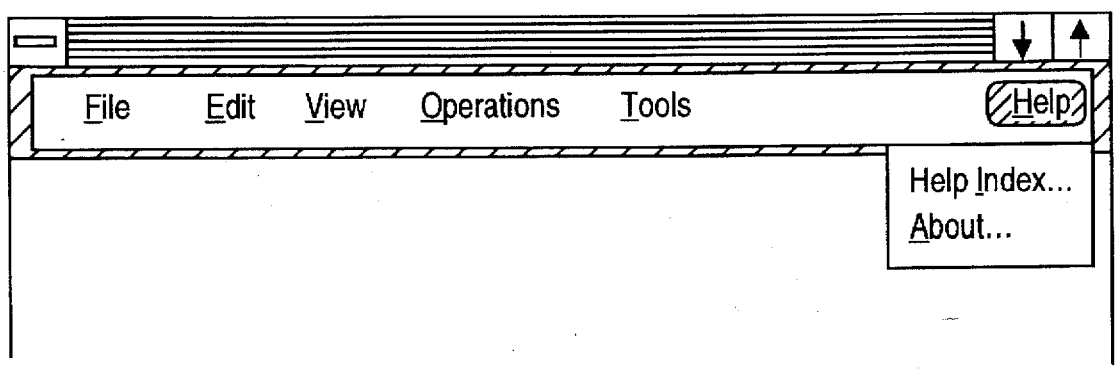
FIG. 23f illustrates a help menu for the media frame editor configured in accordance with the present invention.

FIG. 23f illustrates a help menu for the media frame editor configured in accordance with the present invention. A "help index" menu selection, when selected by a user, invokes a help dialog with a list of help entries for the media frame editor. An "about" menu selection on the help menu invokes an about dialog box that lists the current version of the media frame editor and the release date. The dialog box also lists Sony Trans Com, Inc. address and ownership message.

Figure 25:
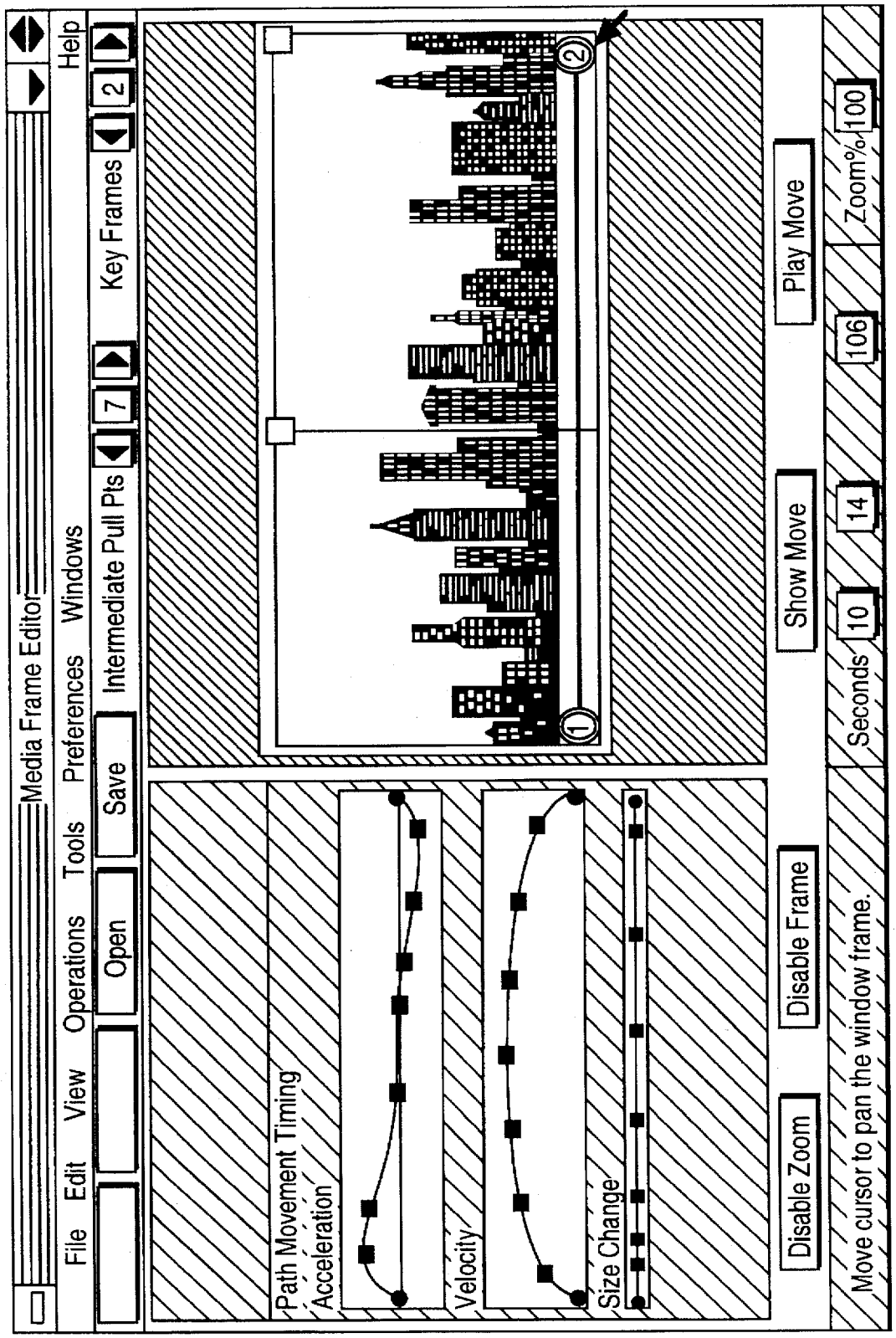
FIG. 25 illustrates a pan display effect for the media frame editor for the present invention.

FIG. 25 illustrates a pan display effect for the media frame editor for the present invention. In general, the pan display effect permits a user of the interactive applications generator to pan media subject matter for presentation in the interactive presentation environment. In order to generate the pan display effect, the media frame editor provides intermediate pull points and key frames. For the example illustrated in FIG. 25, the media subject matter contains seven intermediate pull points and two key frames. The key frames define a beginning frame and an ending frame for the pan display effect. The intermediate pull points define intermediate or intermittent points between the beginning and ending key frames. In order to completely define the pan display effect, the media frame editor provides path movement timing. The path movement timing includes accelerator, velocity, and size change. The acceleration and velocity define the rate at which frames, representing the intermediate pull points, are displayed. For the example illustrated in FIG. 25, the cityscape is displayed in nine frames, beginning with the first key frame, shown in the left portion, and continuing to the second key frame shown in the right portion of the display window. The media frame editor also includes a disable zoom, disable frame, a show move and play move controls. In addition, on the bottom portion of the media frame editor display, the time elapsed for the pan display effect and the amount of zoom are shown.

Figure 26:
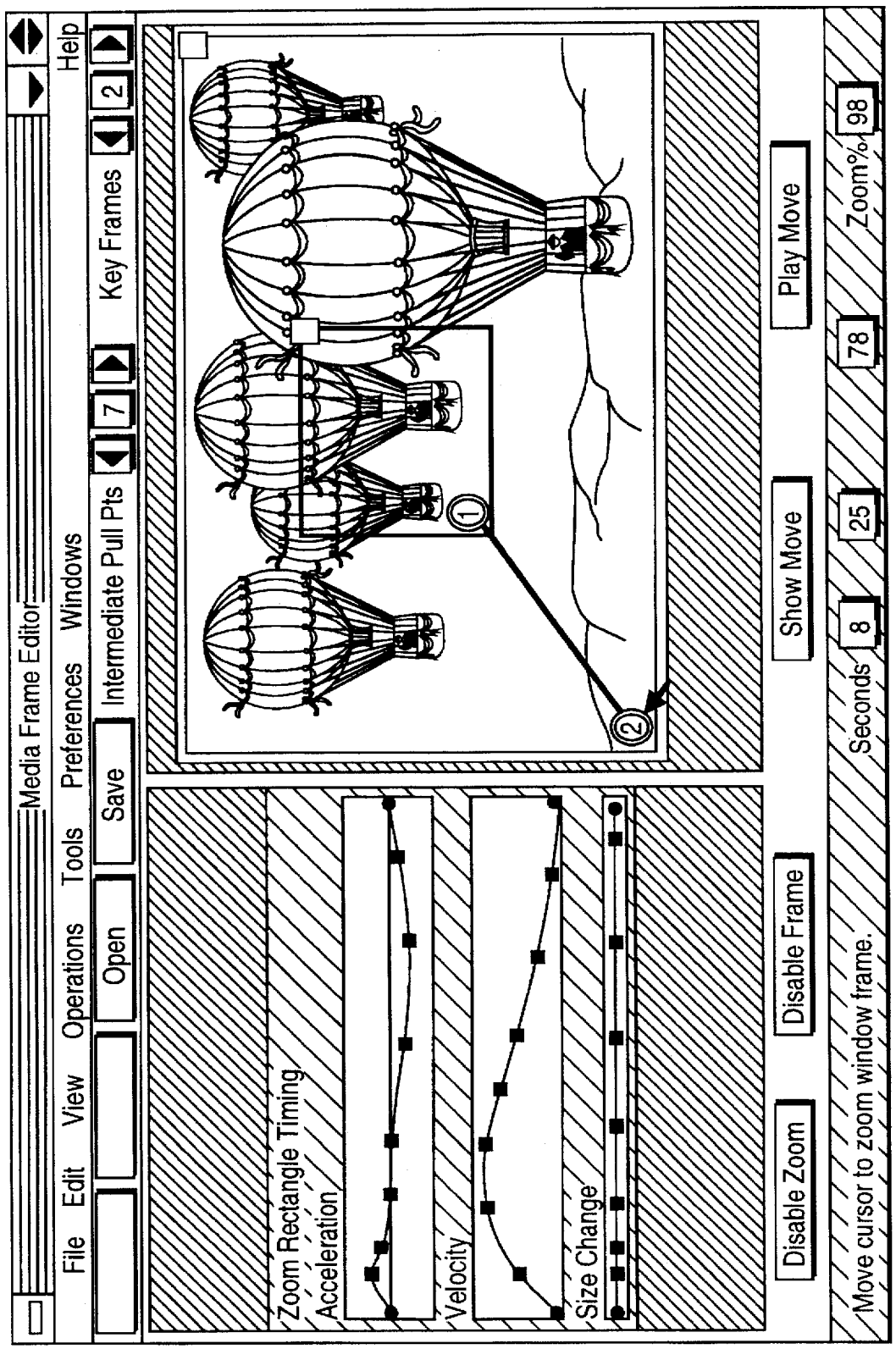
FIG. 26 illustrates a zoom display effect for the media frame editor of the present invention.

FIG. 26 illustrates a zoom display effect for the media frame editor of the present invention. Analogous to the pan display effect shown in FIG. 25, the zoom display effect involves specifying key frames and intermediate pull points. For the example illustrated in FIG. 26, two key frames and seven intermediate pull points are defined. The first key frame focuses on the center two balloons and the zoom display effect opens up to shown all five hot air balloons. The zoom display effect of the present invention provides a user with the zoom rectangle timing by graphing the acceleration, velocity, and size change as the media frames zoom from the first key frame to the second key frame.

Figure 27:
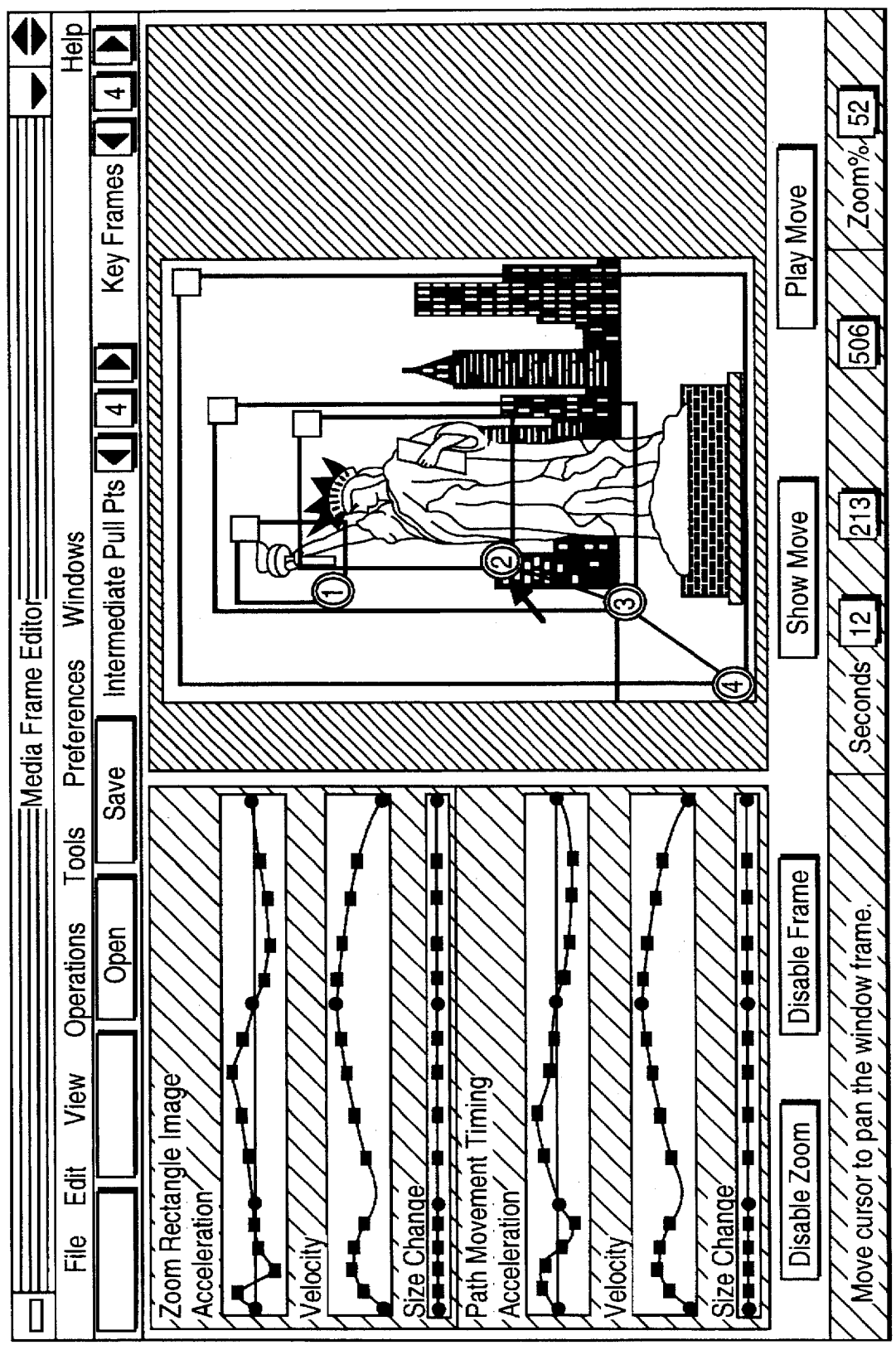
FIG. 27 illustrates a first complex pan and zoom effect for the media frame editor of the present invention.

FIG. 27 illustrates a first complex pan and zoom effect for the media frame editor of the present invention. For the first complex pan and zoom effect illustrated in FIG. 27, four key frames are specified. The first key frame, showing the torch of the Statue of Liberty, and the second key frame shows the upper portion of the statue. The third key frame shows most of the statue, and the fourth key frame shows the entire media frame available. Consequently, the resulting media frames both pan and zoom the Statue of Liberty and the New York city background. For the complex pan and zoom effect, the media frame editor provides zoom rectangle image and path movement timing information. The key frames are designated by an oval on the timeline, and the intermediate pull points are designated by a square. For the complex pan and zoom effect illustrated in FIG. 27, four intermediate pull points are designated. As discussed above, the zoom rectangle image and path movement timing show the acceleration, velocity and size change for the respective display effect.

Figure 28:
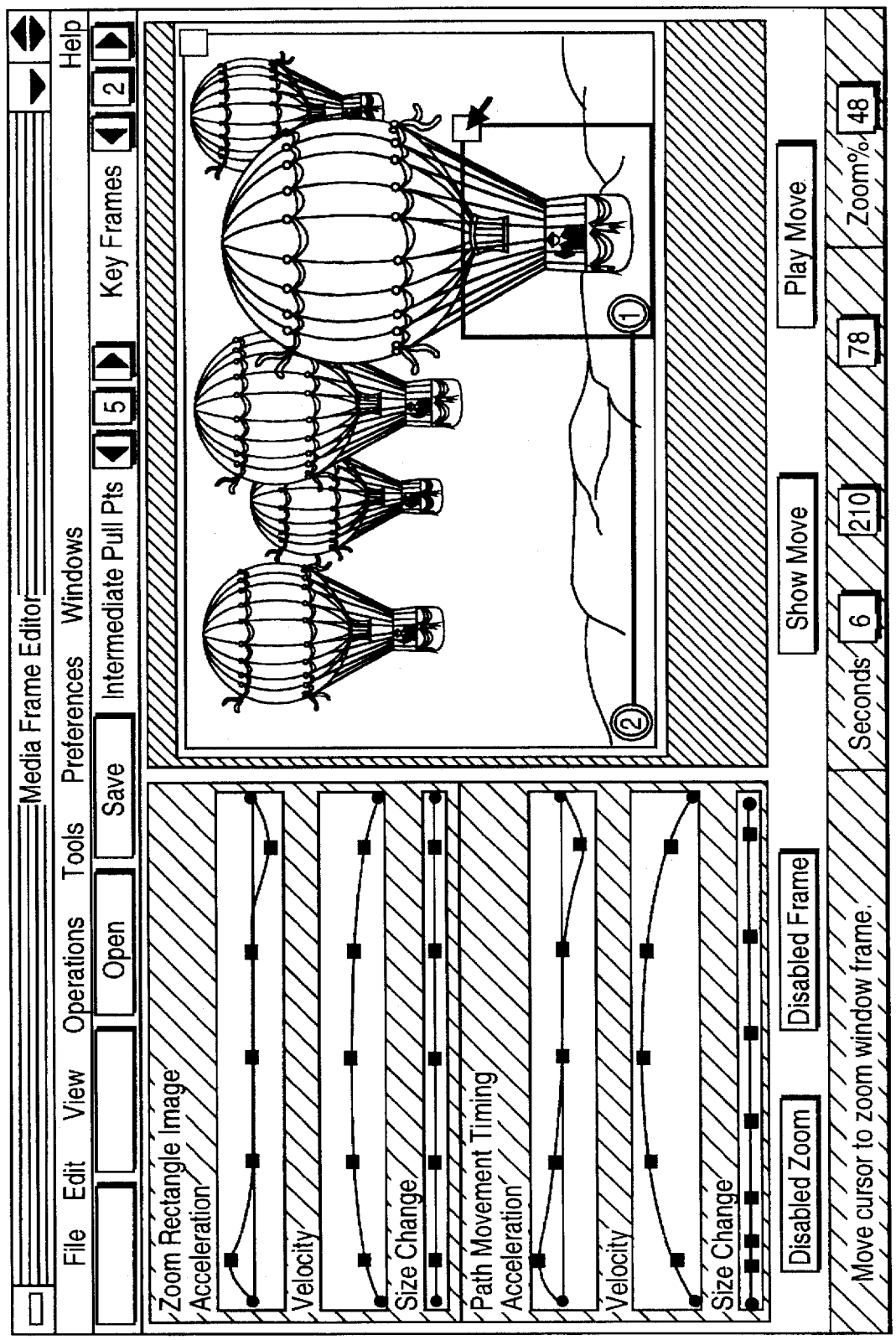
FIG. 28 illustrates a second complex pan and zoom effect for the media frame editor of the present invention.

FIG. 28 illustrates a second complex pan and zoom effect for the media frame editor of the present invention. The second complex pan and zoom effect includes two key frames. As shown in the display window, the first key frame shows a portion of the hot air balloon in the foreground, and the second key frame includes the entire media frame subject matter. For the second complex pan and zoom effect illustrated in FIG. 28, five intermediate pull points are specified. Consequently, in seven frames, the media frame editor scans the media frame subject matter from the first key frame to the second key frame. As described above, the media frame editor provides zoom rectangle image and path movement timing.

Figures 29A, 29B:
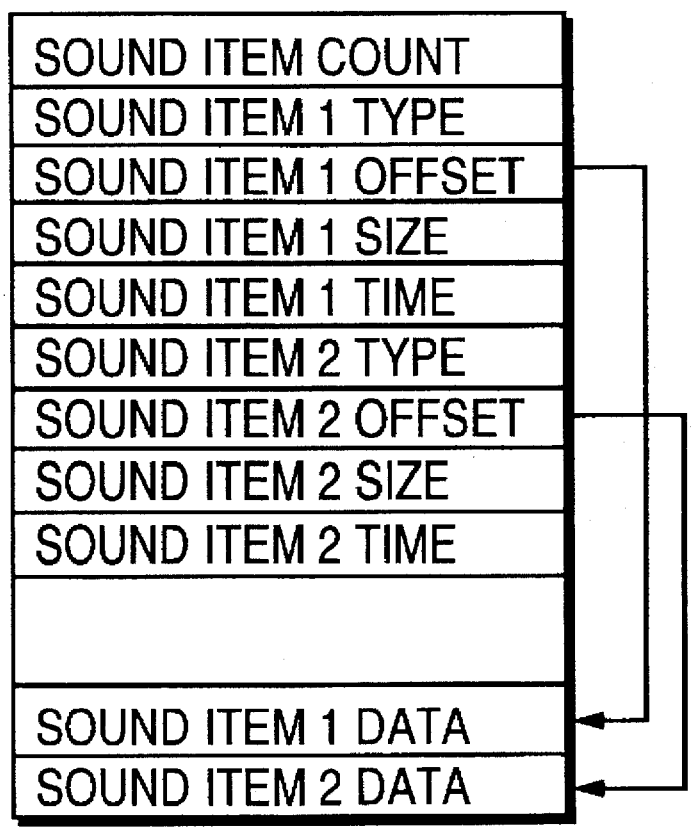
FIGS. 29a–f illustrate a target application media frame format configured in accordance with the present invention.
Figure 29C:
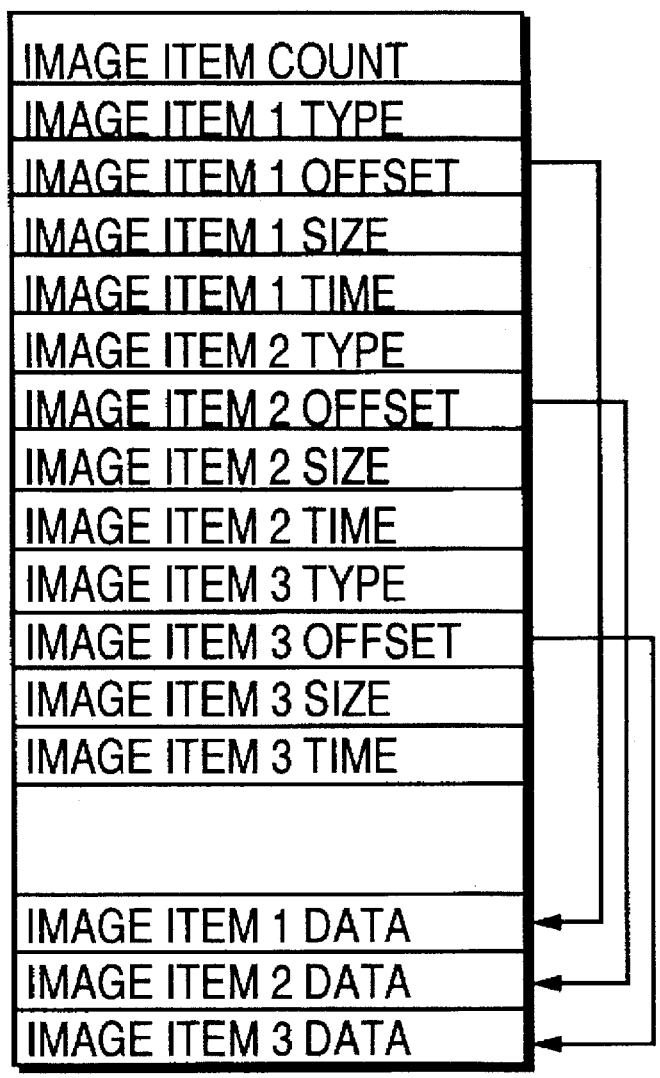
Figure 29D:
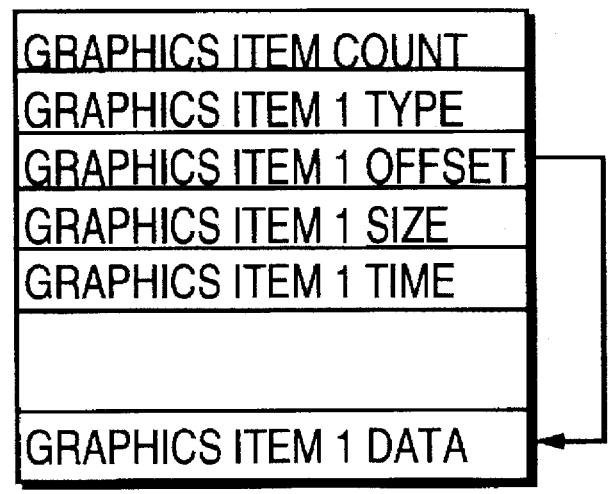
Figure 29E:
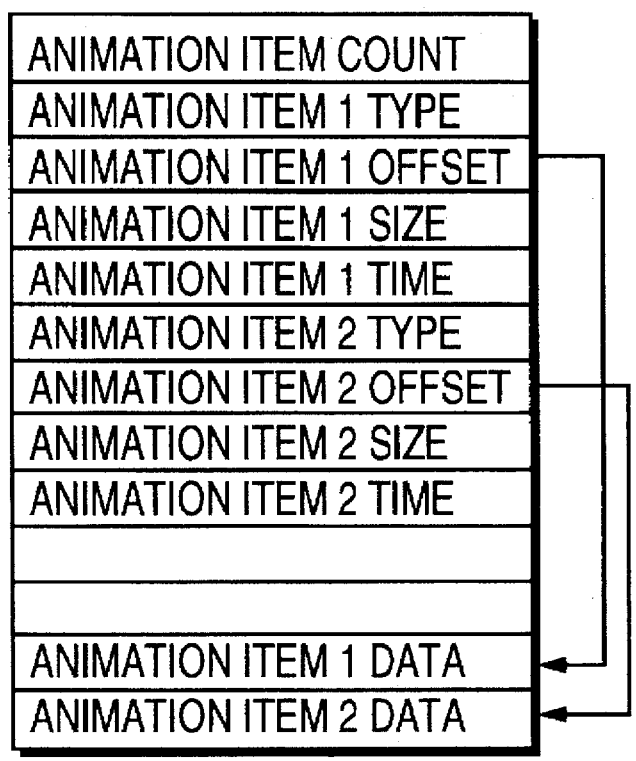
Figure 29F:
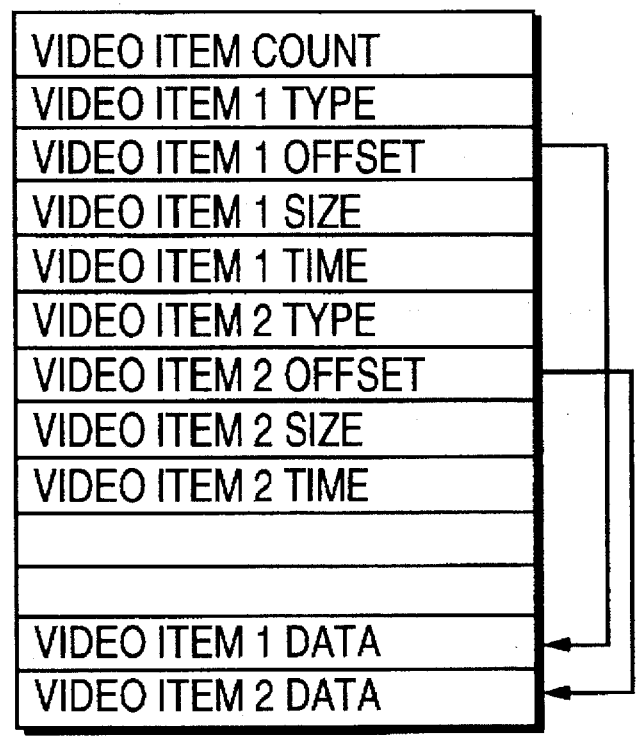

FIGS. 29a–f illustrate a target application media frame format configured in accordance with the present invention. As shown in FIG. 29a, the media frame format includes a media frame id, media frame size, and media types count. The media types count specifies a length for the various multimedia types. Specifically, the media frame format contains a sound offset, image offset, graphics offset, animation offset, and video offset fields. FIG. 29b illustrates the sound offset field containing a sound item count field. In addition, for each sound item, the sound offset field contains a sound item type, sound item offset, sound item size, and sound item time fields. The sound item offset field specifies an address for the corresponding sound item data. FIG. 29c illustrates the image offset field. The image offset field specifies an image item count to specify the length of the image item fields. For each image item, a type, offset, size and time fields are specified. The offset field specifies the starting location for the corresponding image item data. Similarly, the graphics, animation, and video multimedia types are specified as shown in FIGS. 29d, 29e, and 29f, respectively.

Figure 30:
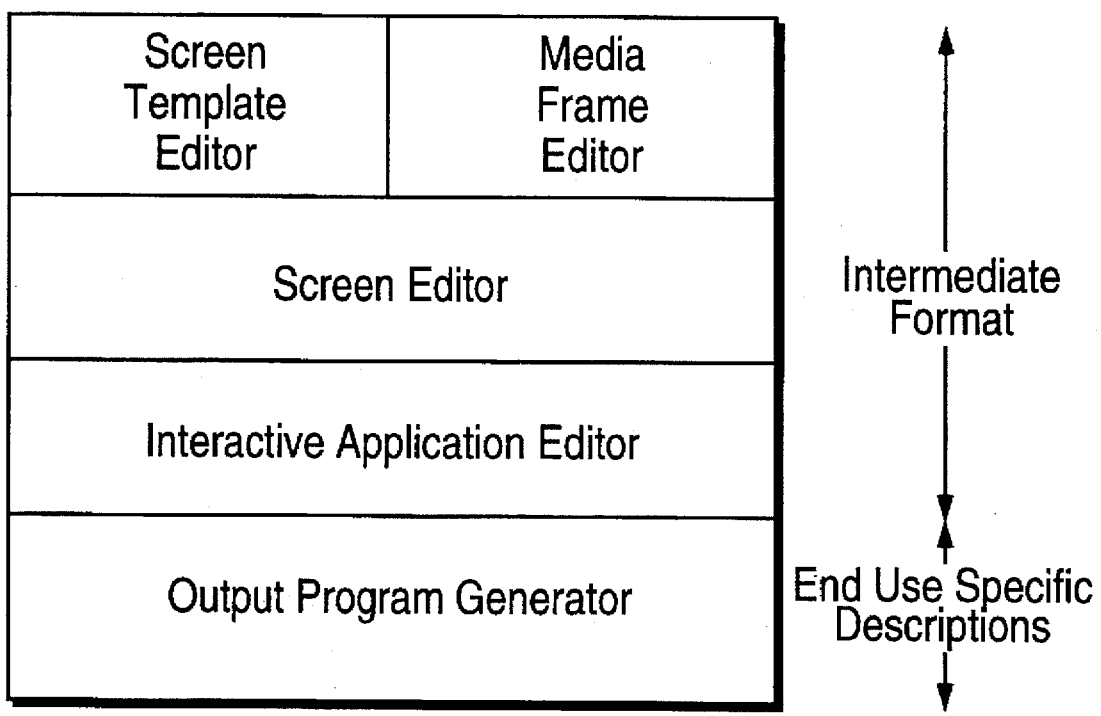
FIG. 30 illustrates a generalized output format for the interactive applications generator of the present invention.

FIG. 30 illustrates a generalized output format for the interactive applications generator of the present invention. In a preferred embodiment, the interactive applications generator stores an intermediate data format generated by each of the primary component parts. The output data format is optimized for modification and flexible editing. In addition to the primary components described above, the present invention operates in conjunction with an output program generator. The output program generator creates file server and user portions of code and media descriptions for a particular interactive presentation environment. The output format is application specific, and therefore varies, depending upon the target interactive application environment. As is well known in the art, multiple target output formats may be created from a single intermediate output format. Typically, the target output formats are optimized for performance and size. For example, target output formats may be compatible with Microsoft® modular windows, Kaleida's Script X, or other typical multimedia scripting or graphical user interface languages. In addition, as one skilled in the art will appreciate, other application specific formats may be generated from the intermediate format of the present invention.

Figure 31A:
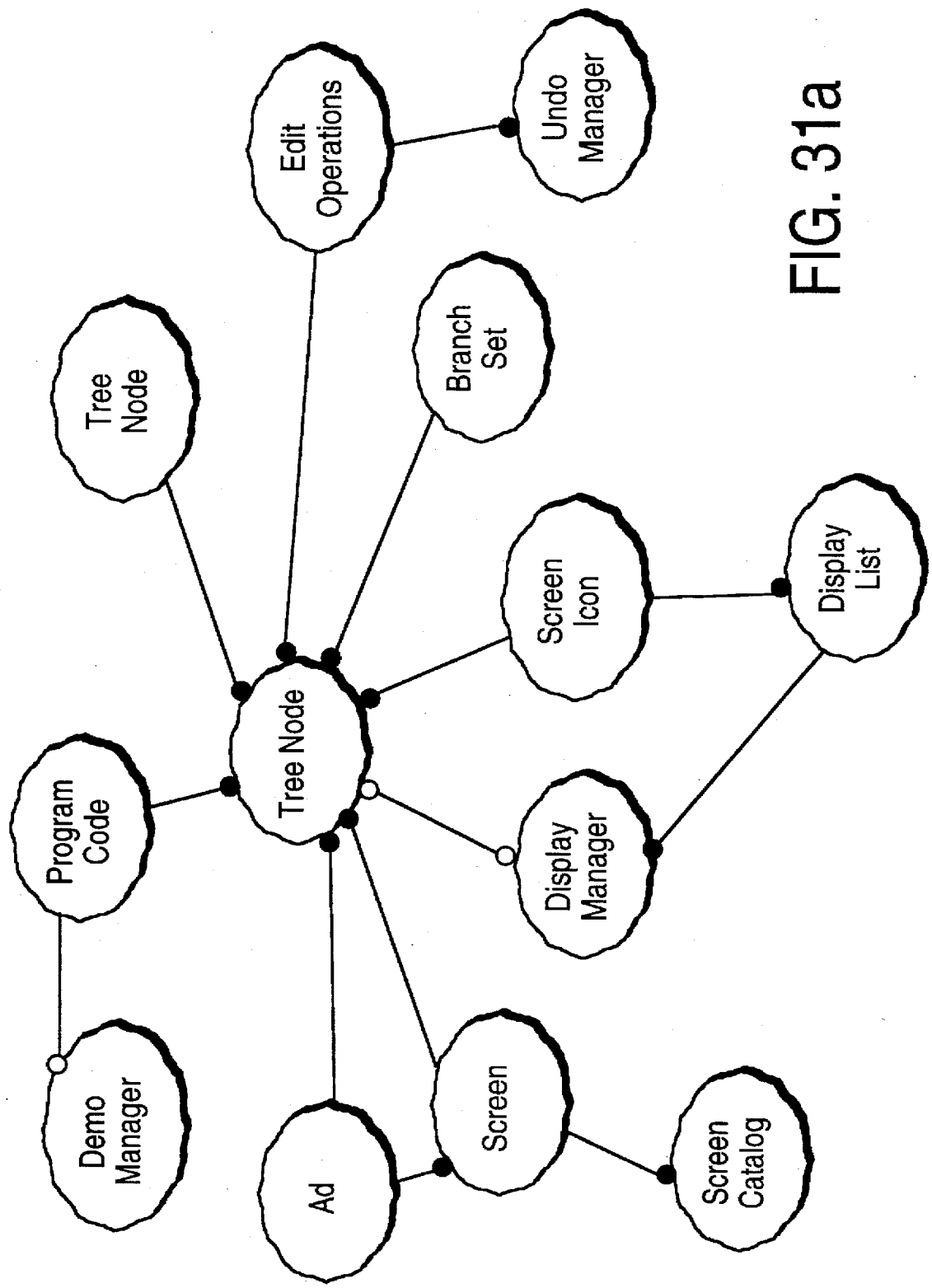
FIGS. 31a–b illustrate one implementation, in Booch notation, for the interactive applications generator.
Figure 31B:
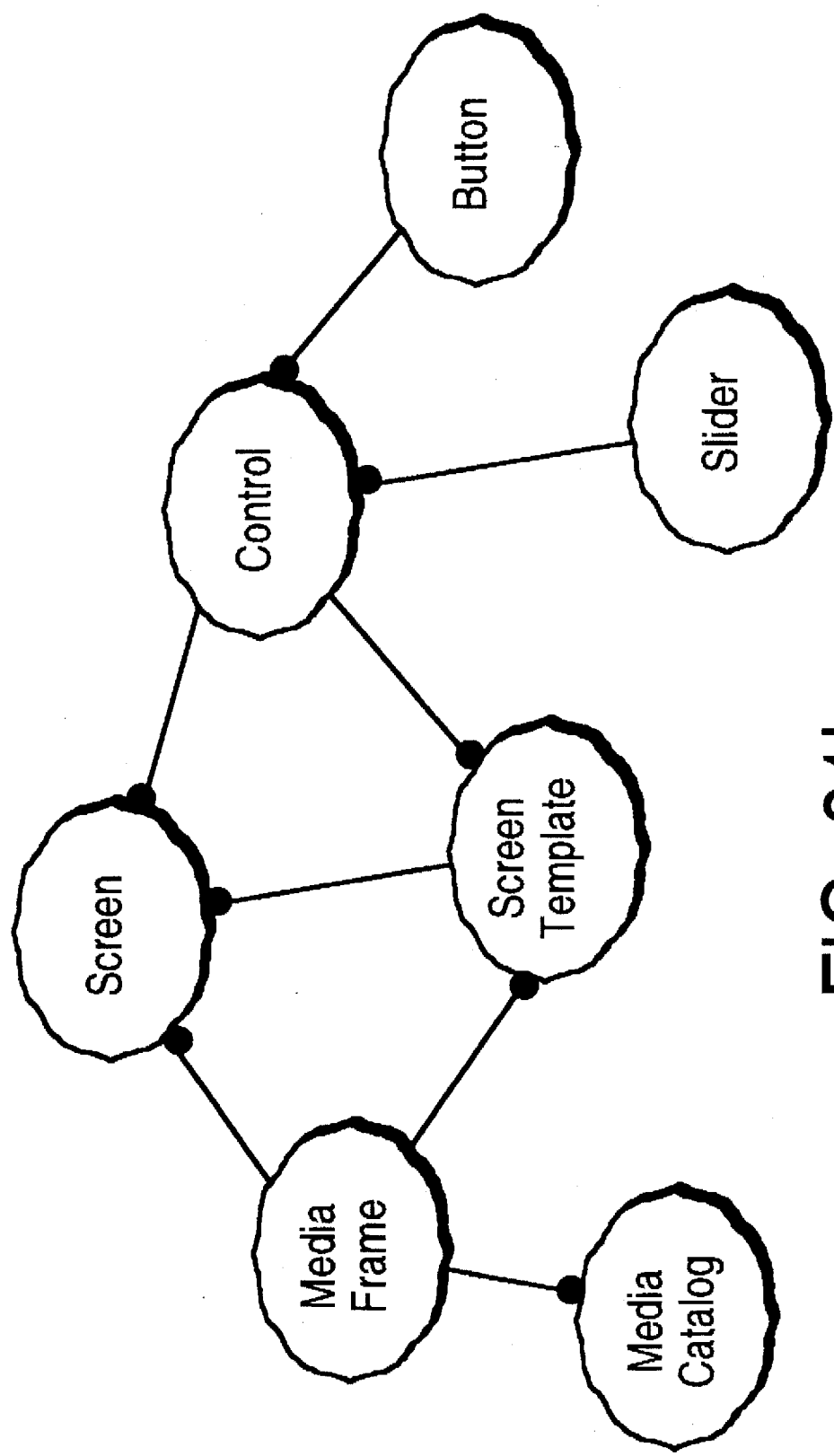

The interactive applications generator of the present invention may be implemented with software to perform the functions of the screen template editor, the media frame editor, the screen editor, and the interactive presentation editor. In one embodiment, the interactive applications generator is implemented with object-oriented computer programs. FIGS. 31a–b illustrate, in Booch notation, one implementation for the interactive applications generator. However, any programming language may be used to implement the interactive applications generator without deviating from the spirit and scope of the invention.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An apparatus for generating an interactive applications environment, said apparatus comprising:

a screen template editor for creating generic screen templates comprising a plurality of generic screen template elements;

a media frame editor for generating media frames by combining multimedia component elements in a time synchronized manner;

a screen editor for generating display screens, including assigning functionality to said display screens, for use in said interactive applications environment, said screen editor being constructed to reference generic screen templates and media frames to create a unique instance for each display screen in said interactive applications environment; and an interactive presentation editor for creating hierarchical structures for presentation of said display screens, wherein said hierarchical structure defines presentation of said display screens in said interactive presentation environment.

2. The apparatus for generating an interactive applications environment as claimed in claim 1, wherein said screen template editor comprises a screen template editor graphical user interface (GUI) for displaying a plurality of tool dialog boxes to permit a user to select said plurality of generic screen template elements, and for displaying a screen template build window for designing said screen template.

3. The apparatus for generating an interactive applications environment as claimed in claim 2, wherein said plurality of tool dialog boxes within said screen template editor GUI comprise a logos dialog box, a backgrounds and borders dialog box, controls dialog box and media frame window dialog box.

4. The apparatus for generating an interactive applications environment as claimed in claim 3, wherein said controls dialog box on said screen template editor GUI permits selection of buttons, sliders and indicators.

5. The apparatus for generating an interactive applications environment as claimed in claim 4, wherein said buttons comprise momentary, toggle, checkbox and radio button.

6. The apparatus for generating an interactive applications environment as claimed in claim 4, wherein said sliders comprise volume sliders and rotational knobs.

7. The apparatus for generating an interactive applications environment as claimed in claim 4, wherein said indicators comprise red light emitting diode (LED) indicators, yellow (LED) indicators, green (LED) indicators, circular LEDs, bargraph LEDs, semicircle meter LEDs, and seven segment numerical readout LEDs.

8. The apparatus for generating an interactive applications environment as claimed in claim 3, wherein said background and borders dialog box on said screen template editor GUI comprises a list box, for providing options to define a graphical look of said screen template, and a thumbnail sketch window for displaying a corresponding highlighted selection in said list box, and a select button to permit a user to specify background color, background texture, border color, border style, drop boxes and lines.

9. The apparatus for generating an interactive applications environment as claimed in claim 3, wherein said logos dialog box on said screen template editor GUI comprises a list box, for listing a plurality of logos currently selectable, a thumbnail sketch window for displaying a picture of a highlighted logo in said list box, and a select button to permit a user to select from said plurality of logos.

10. The apparatus for generating an interactive applications environment as claimed in claim 3, wherein said media frame windows dialog box on said screen template editor GUI comprises a list box, for listing a plurality of media frames currently selectable, a thumbnail sketch window for illustrating specific media frames, including sizing, of a media frame highlighted in said list box, and a select button to permit a user to select a media frame window location within the generic screen template, such that a dotted border comprising size and aspect ratio of said media frame selected is displayed in said screen template build window.

11. The apparatus for generating an interactive applications environment as claimed in claim 1, wherein said media frames generated by said media frame editor comprise images, graphics, animations, video clips, text, and sound clips.

12. The apparatus for generating an interactive applications environment as claimed in claim 1, wherein said media frame editor comprises a media frame editor graphical user interface (GUI) for displaying a timeline window comprising a plurality of media tracks, a time scale and a vertical cursor.

13. The apparatus for generating an interactive applications environment as claimed in claim 12, wherein said media frame editor GUI further comprises a plurality of time line edit functions including a cut, fade in, fade out, dissolve, horizontal wipe, vertical wipe, and digital wipe.

14. The apparatus for generating an interactive applications environment as claimed in claim 12, wherein said media frame editor GUI further comprises a slide bar within said timeline window to permit a user to pan the time scale and media tracks.

15. The apparatus for generating an interactive applications environment as claimed in claim 12, wherein said media frame editor GUI further comprises a media selection window, including a list box and a plurality of buttons, to permit a user to attach media frames to one of said plurality of media tracks.

16. The apparatus for generating an interactive applications environment as claimed in claim 15, wherein said media selection window comprises a thumbnail sketch window for displaying viewable media elements selected via said list box.

17. The apparatus for generating an interactive applications environment as claimed in claim 12, wherein said media frame editor GUI further comprises a run operation and a run window to permit a user to view selected media frames.

18. The apparatus for generating an interactive applications environment as claimed in claim 17, wherein said media frame editor GUI further comprises a plurality of breakpoints to play successive media frames on a selected media track between adjacent breakpoints on said run window.

19. The apparatus for generating an interactive applications environment as claimed in claim 12, wherein said media frame editor GUI further comprises a pan function to generate a series of media frames that pans across a media element.

20. The apparatus for generating an interactive applications environment as claimed in claim 12, wherein said media frame editor GUI further comprises a zoom function to generate a series of media frames that zooms in and out of a media element.

21. The apparatus for generating an interactive applications environment as claimed in claim 12, wherein said media frame editor GUI further comprises a pan and zoom function to generate a series of media frames that zooms in and out and pans across a media element.

22. The apparatus for generating an interactive applications environment as claimed in claim 1, wherein said display screens comprise menu screens and application screens, said menu screens being constructed to permit selection of another menu screen or an application screen, and said application screen comprising a graphical user interface (GUI) for a particular application program operating within said interactive presentation environment.

23. The apparatus for generating an interactive applications environment as claimed in claim 1, wherein said screen editor comprises a screen editor graphical user interface (GUI) for displaying a screen layout including a graphical representation of said generic screen template referenced by said screen editor, and comprising media frame windows and controls.

24. The apparatus for generating an interactive applications environment as claimed in claim 1, wherein said screen editor further comprises a media frame catalogue comprising a separate window and being constructed to permit a user to scroll through a catalogue of media frames so as to assign, via a drag and drop operation, a media frame to a media frame area on said screen layout.

25. The apparatus for generating an interactive applications environment as claimed in claim 1, wherein said screen editor further comprises a function library catalog comprising a separate window and being constructed to permit a user to scroll through a library of predefined functions so as to assign, via a drag and drop operation, a specific function to a control on said screen layout.

26. The apparatus for generating an interactive applications environment as claimed in claim 1, wherein said interactive presentation editor comprises an interactive presentation editor graphical user interface (GUI) comprising a plurality of screen identifier icons displayed on an output display, wherein said plurality of screen identifiers correspond to a plurality of display screens, said interactive presentation editor GUI being constructed to permit placement of said plurality of screen identifiers in a hierarchical structure.

27. The apparatus for generating an interactive applications environment as claimed in claim 26, wherein said interactive presentation editor graphical user interface (GUI) comprises a plurality of dialog boxes corresponding to said plurality of display screens to permit entry of specific display screen information, linking said corresponding display screen to a media frame and a screen template, a list of each control on said corresponding display screen, and a link to either an application screen or menu screen.

28. The apparatus for generating an interactive applications environment as claimed in claim 27, wherein said specific display screen information entered through said plurality of dialog boxes further comprises grouping information to permit group level classification of display screens.

29. The apparatus for generating an interactive applications environment as claimed in claim 26, wherein said interactive presentation editor GUI comprises:
a menu screen operation to add a new menu screen to said hierarchical structure, said menu screen operation being a drag and drop type operation permitting placement of a corresponding screen identifier, representing a menu screen selected, in any level of said hierarchical structure; and
an application screen operation to add a new application screen to said hierarchical structure, said application screen operation being a drag and drop type operation permitting placement of a screen identifier, representing a application screen selected, in any level of said hierarchical structure.

30. The apparatus for generating an interactive applications environment as claimed in claim 29, wherein said menu screen operation and said application screen operation comprises an automatic forward link to create a forward link from a parent menu screen to said selected menu screen and application screen, said automatic forward link operation being invoked upon placement of said screen identifier over a parent menu screen identifier to establish a forward link from said parent screen to said menu screen or said application screen selected.

31. The apparatus for generating an interactive applications environment as claimed in claim 29, wherein said application screen operation comprises an application group function to permit grouping of particular application screens, said interactive presentation editor GUI being constructed to display said application screens in a horizontal direction to define an order for presentation of said application screens in said interactive presentation environment.

32. The apparatus for generating an interactive applications environment as claimed in claim 26, wherein said interactive presentation editor GUI further comprises a screen catalog comprising a window and being constructed to permit a user to scroll through a library of display screens so as to select a display screen for placement in said interactive applications environment.

33. The apparatus for generating an interactive applications environment as claimed in claim 26, wherein said interactive presentation editor GUI further comprises a forward path command to establish a link from a control in a parent menu screen to a child display screen.

34. The apparatus for generating an interactive applications environment as claimed in claim 26, wherein said interactive presentation editor GUI comprises a back path command to establish link from a child display screen to exit to a screen other than a corresponding parent screen.

35. A method for generating an interactive applications environment, said method comprising the steps of:
- providing a plurality of multimedia component elements;
- generating at least one generic screen template comprising a plurality of generic screen template elements;
- generating media frames by combining said multimedia component elements in a time synchronized manner;
- generating display screens for use in said interactive applications environment, by referencing said generic screen templates and said media flames to create a unique instance for each display screen in said interactive applications environment;
- assigning functionality to said display screens; and
- generating hierarchical structures for presentation of said display screens, wherein said hierarchical structure defines presentation of said display screens in said interactive presentation environment.

36. The method as set forth in claim 35, wherein the step of generating at least one generic screen template comprises the steps of:
- displaying a plurality of tool dialog boxes to permit a user to select said plurality of generic screen template elements; and
- displaying a screen template build window for designing said screen template.

37. The method as set forth in claim 36, wherein the step of displaying a plurality of tool dialog boxes comprises the steps of:
- displaying a logos dialog box;
- displaying a background and borders dialog box;
- displaying a controls dialog box; and
- displaying a media frame window dialog box.

38. The method as set forth in claim 37, wherein the step of displaying a background and borders dialog box comprises the steps of:
- displaying a list box that provides options to define a graphical look of said screen template;
- generating a thumbnail sketch window that displays a corresponding highlighted selection in said list box; and
- displaying a select button to permit a user to specify background color, background texture, border color, border style, drop boxes and lines.

39. The method as set forth in claim 37, wherein the step of displaying a logos dialog box comprises the steps of:
- displaying a plurality of currently selectable logos;
- displaying a thumbnail sketch window that displays a picture of a highlighted logo in said list box; and
- generating a select button to permit a user to select from said plurality of logos.

40. The method as set forth in claim 37, wherein the step of displaying a media frame window dialog box comprises the steps of:
- displaying a list box of a plurality of media frames currently selectable;
- displaying a thumbnail sketch window for illustrating specific media frames, including sizing, of a media frame highlighted in said list box;
- generating a select button to permit a user to select a media frame window location within the generic screen template; and
- or displaying a dotted border comprising size and aspect ratio of said media frame selected.

41. The method as set forth in claim 35, wherein the step of providing a plurality of multimedia component elements comprises the step of providing images, graphics, animations, video clips, text, and sound clips.

42. The method as set forth in claim 35, wherein the step of generating media frames comprises the step of generating a timeline window comprising a plurality of media tracks, a time scale and a vertical cursor.

43. The method as set forth in claim 42, wherein the step of generating a timeline window comprises the step of generating a plurality of time line edit functions including a cut, fade in, fade out, dissolve, horizontal wipe, vertical wipe, and digital wipe.

44. The method as set forth in claim 42, wherein the step of generating a timeline window comprises the step of generating a slide bar within said timeline window to permit a user to pan the time scale and media tracks.

45. The method as set forth in claim 42, wherein the step of generating a timeline window comprises the step of generating a media selection window, including a list box and a plurality of buttons, to permit a user to attach media frames to one of said plurality of media tracks.

46. The method as set forth in claim 45, wherein the step of generating a media selection window comprises the step of generating a thumbnail sketch window for displaying viewable media elements selected via said list box.

47. The method as set forth in claim 42, wherein the step of generating a timeline window comprises the step of generating a run operation and a run window to permit a user to view selected media frames.

48. The method as set forth in claim 47, wherein the step of generating a timeline window comprises the step of generating a plurality of breakpoints to play successive media frames on a selected media track between adjacent breakpoints on said run window.

49. The method as set forth in claim 42, wherein the step of generating a timeline window comprises the step of generating a pan function to generate a series of media frames that pans across a media element.

50. The method as set forth in claim 42, wherein the step of generating a timeline window comprises the step of generating a zoom function to generate a series of media frames that zooms in and out of a media element.

51. The method as set forth in claim 42, wherein the step of generating a timeline window comprises the step of generating a pan and zoom function to generate a series of media frames that zooms in and out and pans across a media element.

52. The method as set forth in claim 35, wherein the step of generating display screens comprises the steps of:
- displaying menu screens to permit selection of another menu screen or an application screen; and
- generating application screens to provide a graphical user interface (GUI) for a particular application program operating within said interactive presentation environment.

53. The method as set forth in claim 35, wherein the step of generating display screens comprises the step of displaying a screen layout including a graphical representation of said generic screen template referenced comprising media frame windows and controls.

54. The method as set forth in claim 35, wherein the step of generating display screens comprises the step of generating a media frame catalogue comprising a separate window to permit a user to scroll through a catalogue of media flames so as to assign, via a drag and drop operation, a media frame to a media frame area on said screen layout.

55. The method as set forth in claim 35, wherein the step of generating display screens comprises the step of generating a function library catalog comprising a separate window to permit a user to scroll through a library of predefined functions so as to assign, via a drag and drop operation, a specific function to a control on said screen layout.

56. The method as set forth in claim 35, wherein the step of generating hierarchical structures comprises the step of generating a plurality of screen identifier icons on an output display, wherein said screen identifiers correspond to said display screens to permit placement of said plurality of screen identifiers in said hierarchical structure.

57. The method as set forth in claim 56, wherein the step of generating a plurality of screen identifier icons comprises the steps of:

displaying a plurality of dialog boxes corresponding to said display screens to permit entry of specific display screen information including text description of a corresponding display screen;

permitting a user to link said corresponding display screen to a media frame and a screen template;

displaying a list of each control on said corresponding display screen; and permitting a user to link said control to either an application screen or menu screen.

58. The method as set forth in claim 57, further comprising the step of permitting a user to group information to classify group levels of display screens.

59. The method as set forth in claim 56, wherein the step of generating a plurality of screen identifier icons on an output display comprises the steps of:

generating a menu screen operation to add a new menu screen to said hierarchical structure, said menu screen operation being a drag and drop type operation permitting placement of a corresponding screen identifier, representing a menu screen selected, in any level of said hierarchical structure; and generating an application screen operation to add a new application screen to said hierarchical structure, said application screen operation being a drag and drop type operation permitting placement of a screen identifier, representing an application screen selected, in any level of said hierarchical structure.

60. The method as set forth in claim 59, wherein the steps of generating a menu screen operation and generating an application screen operation comprises the steps of:

generating an automatic forward link to create a forward link from a parent menu screen to said selected menu screen and application screen; and invoking, upon placement of said screen identifier over a parent menu screen identifier, said automatic forward link operation to establish a forward link from said parent screen to said menu screen or said application screen selected.

61. The method as set forth in claim 59, wherein the step of generating a application screen operation comprises the steps of:

generating an application group function to permit grouping of particular application screens; and displaying said application screens, based on said application group function, in a horizontal direction to define an order for presentation of said application screens in said interactive presentation environment.

62. The method as set forth in claim 56, wherein the step of generating hierarchical structures comprises the steps of:

generating a screen catalog comprising a window and a library of display screens; and permitting a user to scroll through said library of display screens so as to select a display screen for placement in said interactive applications environment.

63. The method as set forth in claim 56, wherein the step of generating hierarchical structures further comprises the step of generating a forward path command to establish a link from a control in a parent menu screen to a child display screen.

64. The method as set forth in claim 56, wherein the step of generating hierarchical structures further comprises the step of generating a back path command to establish a link from a child display screen to exit to a screen other than a corresponding parent screen.

* * * * *

UNITED STATES PATENT AND TRADEMARK OFFICE
CERTIFICATE OF CORRECTION

PATENT NO. : 5,675,752
DATED : October 7, 1997
INVENTOR(S) : Scott et al.

It is certified that error appears in the above-identified patent and that said Letters Patent is hereby corrected as shown below:

In column 3 at line 34 delete "flames" and insert --frames--

In column 9 at line 16 delete "flames" and insert --frames--

In column 30 at line 47 delete "comers" and insert --corners--

In column 37 at line 13 delete "flames" and insert --frames--

In column 38 at line 1 delete "or"

In column 39 at line 1 delete "flames" and insert --frames--

In column 40 at line 16 delete "a application" and insert --an application--

Signed and Sealed this

Sixteenth Day of November, 1999

Attest:

Q. TODD DICKINSON

*Attesting Officer*   *Acting Commissioner of Patents and Trademarks*